United States Patent [19]

Iwanaga et al.

[11] 4,274,307
[45] Jun. 23, 1981

[54] SHOCK CONTROL ARRANGEMENT IN HYDRAULIC CONTROL SYSTEM OF AUTOMATIC POWER TRANSMISSION

[75] Inventors: Kazuyoshi Iwanaga, Yokohama; Kazuhiko Sugano, Tokyo; Kunio Ohtsuka, Yokohama, all of Japan

[73] Assignee: Nissan Motor Company, Limited, Yokohama, Japan

[21] Appl. No.: 957,781

[22] Filed: Nov. 6, 1978

[30] Foreign Application Priority Data

Aug. 30, 1978 [JP] Japan ............................ 53-105897

[51] Int. Cl.³ .............................................. B60K 41/10
[52] U.S. Cl. ............................................ 74/869; 74/868
[58] Field of Search ............... 74/867, 868, 869, 752 C

[56] References Cited

U.S. PATENT DOCUMENTS

| 2,788,678 | 4/1957 | Sheppard | 74/869 X |
|---|---|---|---|
| 3,167,970 | 2/1965 | Wagner et al. | 74/868 X |
| 3,237,476 | 3/1966 | Jondasek | 74/868 |
| 3,495,481 | 2/1970 | Ohie et al. | 74/864 |
| 3,590,663 | 7/1971 | Yamaguchi et al. | 74/752 C X |
| 3,656,372 | 4/1972 | Chana | 74/869 |
| 3,667,323 | 6/1972 | Irie | 74/864 X |
| 3,683,721 | 8/1972 | Uozumi et al. | 74/869 |
| 3,688,608 | 9/1972 | Leach | 74/869 |
| 3,813,964 | 6/1974 | Ichimura et al. | 74/864 X |
| 3,951,011 | 4/1976 | Lemon | 74/752 C |
| 3,985,063 | 10/1976 | Lemon | 91/31 |

FOREIGN PATENT DOCUMENTS

| 1905890 | 8/1969 | Fed. Rep. of Germany | 74/864 |
|---|---|---|---|
| 1780693 | 5/1975 | Fed. Rep. of Germany | 74/867 |
| 1188641 | 9/1959 | France | 74/868 |
| 937699 | 9/1963 | United Kingdom . | |
| 1308112 | 2/1973 | United Kingdom . | |
| 1315408 | 5/1973 | United Kingdom . | |
| 1439245 | 6/1976 | United Kingdom . | |
| 1501304 | 2/1978 | United Kingdom . | |
| 1509308 | 5/1978 | United Kingdom . | |

Primary Examiner—Leslie Braun
Attorney, Agent, or Firm—Schwartz, Jeffery, Schwaab, Mack, Blumenthal & Koch

[57] ABSTRACT

In an automatic power transmission having a transmission mechanism including fluid operated frictional units to be actuated to select automatic forward drive and reverse drive gear conditions and make a shift between the first, second and third gear ratios in the automatic forward drive range, a shock control arrangement is provided in the hydraulic control system for the transmission mechanism, comprising a pressure accumulator unit which takes up the fluid pressure to be applied to any of the frictional units during selection of the automatic forward drive range or reverse drive gear position or during upshifting between the aforesaid gear ratios in the automatic forward drive range, and a pressure reducing valve for eliminating or reducing the fluid pressure in one of the frictional units when a fluid pressure is being supplied to another frictional unit during upshifting between the second and third gear ratios in the automatic forward drive range.

11 Claims, 4 Drawing Figures

4,274,307

SHOCK CONTROL ARRANGEMENT IN HYDRAULIC CONTROL SYSTEM OF AUTOMATIC POWER TRANSMISSION

FIELD OF THE INVENTION

The present invention relates to an automotive automatic power transmission having a transmission mechanism to be operated by a hydraulic control system and, more particularly, to a shock control arrangement to be incorporated into the hydraulic control system of an automatic power transmission for reducing mechanical shocks to be produced during shifting to predetermined gear positions and between predetermined automatic forward drive gear ratios.

BACKGROUND OF THE INVENTION

In an automatic power transmission for an automotive vehicle, the gear ratios in the forward and reverse drive ranges of the transmission are selected by selectively actuating fluid operated frictional units including, for example, a high-and-reverse clutch, a forward drive clutch, a brake band and a low-and-reverse brake which are all operated by fluid pressure delivered from a hydraulic control system. In a known power transmission using these frictional units, the forward drive clutch in particular is maintained coupled throughout the conditions in which an automatic forward drive range is established in the transmission. When forward drive clutch alone is permitted to be operative, the first or "low" gear ratio in the automatic forward drive range is established in the transmission mechanism. If the brake band is applied with the forward drive clutch maintained in the coupled condition, then a shift is made in the transmission mechanism from the first gear ratio to the second gear ratio in the automatic forward drive range. If, furthermore, the brake band is released and the high-and-reverse clutch in turn is made operative with the forward drive clutch held coupled, there is produced in the transmission mechanism an upshift from the second gear ratio to the third or "high" gear ratio in the automatic forward drive range. When, on the other hand, both of the high-and-reverse clutch and the low-and-reverse brake are made operative, a reverse drive gear position is selected in the transmission mechanism.

Each of the frictional units thus operative is actuated to couple or apply by a control fluid pressure, unusally called line pressure, developed by a pressure regulator valve incorporated in the hydraulic control system. If the line pressure is supplied at an uncontrolled rate to any one or two of these fluid operated frictional units during shifting from the neutral gear position to the automatic forward drive range position or the reverse drive gear position, mechanical shocks tend to be created in the transmission mechanism and will give the occupants of the vehicle an unpleasant sensation.

The brake band to produce the second forward drive gear ratio is automatically operated to apply or release by means of a fluid operated band servo unit depending upon the vehicle speed under automatic forward drive range condition. If the line pressure is supplied to the band servo unit at an uncontrolled rate during shifting from the first gear ratio to the second gear ratio in the automatic forward drive range, mechanical shocks are also produced in the transmission mechanism.

In order to alleviate these shocks to be produced during selection of the automatic forward drive range position or the reverse drive gear position or upshifting between the gear ratios in automatic forward drive range, there is proposed and put to practical use a hydraulic transmission control system having incorporated therein a plurality of pressure accumulator units each of which is arranged to lessen the shocks to be produced during each of the shifts from the neutral gear position to the automatic forward drive gear position and the reverse drive gear position and the upshifts between the gear ratios in the automatic forward drive range. Installation of such a plurality of pressure accumulator units results in an enlarged and intricate construction of the control valve assembly incorporating the hydraulic transmission control system and further in an increased production cost of the transmission system as a whole.

The present invention contemplates elimination or reduction of the mechanical shocks usually concommitant with the selection of the automatic forward drive range and reverse drive gear position and the upshifting between the gear ratios in the automatic forward drive range by means of a shock control arrangement using a single pressure accumulator unit so as to provide compact and small sized construction of the transmission control valve assembly without having recourse to increasing the production cost of the transmission system having the shock control arrangement.

SUMMARY OF THE INVENTION

In accordance with the present invention, there is provided in an automatic power transmission having an automatic forward drive range condition, a reverse drive gear condition and predetermined first, second and third gear ratios in the automatic forward drive range condition and including a transmission mechanism having incorporated therein a fluid operated first frictional unit contributive to the selection of the reverse drive gear condition and the shifting from the second gear ratio to the third gear ratio in the automatic forward drive range, a fluid operated second frictional unit contributive to the shifting from the first gear ratio to the second gear ratio in the automatic forward drive range condition and a fluid operated third frictional unit contributive to the selection of the automatic forward drive range condition, and a hydraulic control system including control fluid pressure generating means for producing a control fluid pressure throughout the automatic forward drive range and reverse drive range conditions, a shock control arrangement for reducing shocks to be produced during selection of any of the automatic forward drive range and reverse drive gear conditions or upshifting between any two of the first, second and third gear ratios in the automatic forward drive range condition, comprising a pressure accumulator unit operatively intervening between the control fluid generating means and each of the first, second and third frictional units and including a fluid operated piston having a first pressure acting area to be acted upon by a fluid pressure and urge the piston to move in a first direction when the first frictional unit is to be actuated, a second pressure acting area to be acted upon by a fluid pressure and urge the piston to move in a second direction opposite to the first direction when the second frictional unit is to be actuated and a third pressure acting area to be acted upon by a fluid pressure and the piston to move in the first direction when the third frictional unit is to be actuated, and biasing means for constantly urging the piston to move in the second direction; passageway means for discharging the fluid pressure to act on the second pressure acting area; and valve means operatively intervening between the second frictional unit and the control pressure generating means and responsive to the fluid pressure to actuate the first frictional unit and act on the first pressure acting area, the valve means including a valve element which is movable into and out of a limit position providing communication between the second frictional unit and the control pressure generating means and closing the above mentioned passageway means and which responsive to the fluid pressure to actuate the first frictional unit for being urged to move away from the limit position, and biasing means for constantly urging the valve element toward the limit position thereof.

DETAILED DESCRIPTION OF THE INVENTION

Power Transmission Mechanism—General Construction

Figure 1:
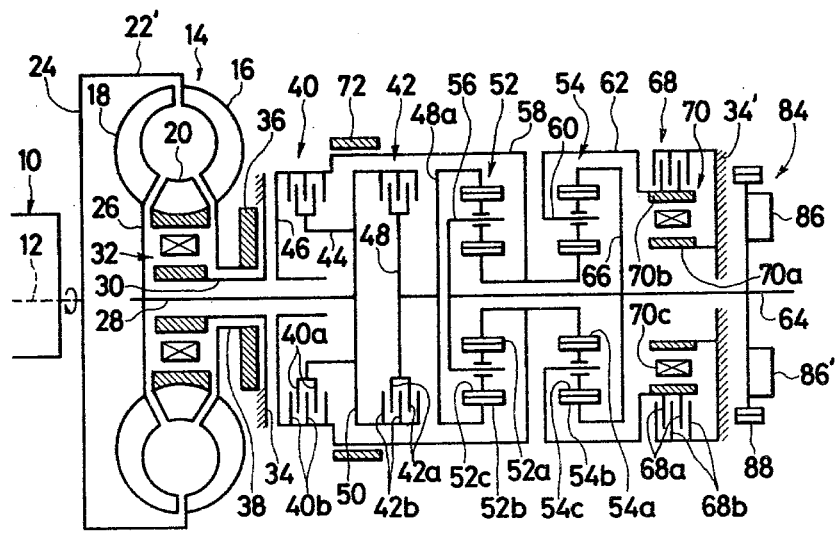
FIG. 1 is a schematic view showing a transmission mechanism which may from part of an automatic power transmission including a hydraulic control system into which a shock control arrangement provided by the present invention is to be incorporated.

Description will be hereinafter made regarding the general construction and arrangement of a representative example of an automatic power transmission mechanism to which a hydraulic control system embodying the present invention is to be applied. The transmission mechanism forms part of the power train of an automotive vehicle equipped with a power plant such as an internal combustion engine 10 having a crankshaft 12 as the power output delivering member as partially and schematically illustrated in FIG. 1 of the drawings and is operatively connected to the crankshaft 12 of the engine 10 through a hydrodynamic torque converter 14. The torque converter 14 is herein assumed to be of the three member design by way of example and is thus shown comprising a driving member or pump impeller 16, a driven member or turbine runner 18, and a reaction member or stator 20 as is well known in the art. The pump impeller 16 is connected by a converter cover 22' and a converter driving plate 24 to the crankshaft 12 of the engine 10 and is rotatable with the engine crankshaft 12 about an axis which is aligned with the axis of rotation of the crankshaft 12. The turbine runner 18 is mounted on a turbine support disc 26 which is keyed or splined to a transmission input shaft 28 having a center axis which is also aligned with the axis of rotation of the engine crankshaft 12. The stator 20 serving as the reaction member of the torque converter 14 is positioned between the pump impeller 16 and the turbine runner 18 thus arranged and is mounted on a stator support hollow shaft 30 through a torque converter one-way clutch assembly 32. The stator support hollow shaft 30 has the transmission input shaft 28 axially passed therethrough in substantially coaxial relationship and is fixedly connected to or forms part of a stationary wall structure 34. The stator 20 is permitted to rotate about the center axis of the transmission input shaft 28 in the same direction as the direction of rotation the pump impeller 16 of the torque converter 14 and accordingly as the direction of rotation of the engine crankshaft 12. Though not shown, each of the pump impeller 16, turbine runner 18 and stator 20 of the torque converter 14 has a number of vanes arranged and inclined in symmetry about the center axis of the transmission input shaft 28. Behind the torque converter 14 thus constructed and arranged is positioned a transmission oil pump assembly 36 including, though not shown, an oil pump body bolted or otherwise secured to the above mentioned stationary wall structure 34 and a drive gear keyed or splined to an oil pump support sleeve 38 coaxially surrounding and rotatable on the outer peripheral surface of the stator support hollow shaft 30 and welded or otherwise securely connected to the pump impeller 16 of the torque converter 14.

When the engine 10 is in operation, the driving power produced by the engine is delivered from the crankshaft 12 of the engine 10 to the pump impeller 16 of the torque converter 14 through the converter driving plate 24 and the converter cover 22 and is transmitted from the pump impeller 16 to the transmission input shaft 28 through the turbine runner 18 of the torque converter 14 with a torque multiplied by means of the stator 20 at a ratio which is variable with the ratio between the revolution speed of the engine crankshaft 12 driving the pump impeller 16 and the revolution speed of the transmission input shaft 28 driven by the turbine runner 18 of the torque converter 14, as is well known in the art. The pump impeller 16 of the torque converter 14 drives not only the turbine runner 18 of the torque converter but the transmission oil pump assembly 36 through the pump support sleeve 38 so that the oil pump assembly 36 delivers oil under pressure which is also variable with the revolution speed of the crankshaft 12 of the engine 10.

The power transmission mechanism herein shown is assumed to be of the three forward speed and one reverse speed type by way of example and comprises first and second or high-and-reverse and forward drive clutches 40 and 42 which are positioned in series at the rear of the transmission oil pump assembly 36. The high-and-reverse clutch 40 compreses a plurality of clutch discs 40a keyed or splined at their inner peripheral edges to a clutch hub 44 and clutch plates 40b keyed or splined at their outer peripheral edges to a front clutch drum 46 which is in part positioned between the clutches 40 and 42 as shown. Likewise, the forward drive clutch 42 comprises a plurality of clutch discs 42a keyed or splined at their inner peripheral edges to a clutch hub 48 and clutch plates 42b keyed or splined at their outer peripheral edges to a rear clutch drum 50. The clutch hub 44 for the high-and-reverse clutch 40 and the rear clutch drum 50 for the forward drive clutch 42 are integral with each other and are rotatable with the transmission input shaft 28 with the rear clutch drum 50 keyed or splined to a rear end portion of the transmission input shaft 28 which axially projects from the stator support hollow shaft 30 as shown. The clutch discs 40a of the high-and-reverse clutch 40 and the clutch plates 42b of the forward drive clutch 42 thus serve as driving friction elements and, accordingly, the clutch plates 40b of the high-and-reverse clutch 40 and the clutch discs 42a of the forward drive clutch 42 serve as driven friction elements in the clutches 40 and 42, respectively. Though not shown in the drawings, each of the clutches 40 and 42 has incorporated therein a return spring urging the clutch discs and plates of the clutch to be disengaged from one another and a clutch piston which is adapted to bring the clutch discs and plates into engagement with one another when moved by a fluid pressure developed in a fluid chamber which is formed between the piston and the clutch drum 46, as is well known in the art.

The power transmission mechanism shown in FIG. 1 further comprises first and second planatary gear assemblies 52 and 54 which are arranged in series at the rear of the forward drive clutch 42. The first planatary gear assembly 52 comprises an externally toothed sun gear 52a and an internally toothed ring gear 52b which have a common axis of rotation aligned with the center axis of the transmission input shaft 28. The clutch hub 48 for the forward drive clutch 42 has a rear extension or flange 48a to which the ring gear 52b of the first planatary gear assembly 52 is keyed or splined as diagrammatically illustrated in the drawing. The first planatary gear assembly 52 further comprises at least two planet pinions 52c each of which is in mesh with the sun and ring gears 52a and 52b and which is rotatable about an axis around the common axis of rotation of the sun and ring gears 52a and 52b. The planet pinions 52c of the first planatary gear assembly 52 are jointly connected to a pinion carrier 56. The second planatary gear assembly 54 is constructed similarly to the first planatary gear assembly 52 and thus comprises an externally toothed sun gear 54a and an internally toothed ring gear 54b which have a common axis of rotation aligned with the center axis of the transmission input shaft 28. The sun gears 52a and 54a of the first and second planatary gear assemblies 52 and 54, respectively, are jointly splined or otherwise fastened to a connecting shell 58 enclosing the forward drive clutch 42 and the first planatary gear assembly 52 therein and integral with or securely connected to the front clutch drum 46 for the high-and-reverse clutch 40. The second planetary gear assembly 54 further comprises at least two planet pinions 54c each of which is in mesh with the sun and ring gears 54a and 54b and which is rotatable about an axis around the common axis of rotation of the sun and ring gears 54a and 54b. The planet pinions 54c of the second planetary gear assembly 54 are jointly connected to a pinion carrier 60 which is keyed or splined at its outer peripheral edge to a connecting drum 62 enclosing the second planetary gear assembly 54 therein. The connecting drum 62 has a rear axial extension extending rearwardly away from the second planetary gear assembly 54 as shown. The respective sun gears 52a and 54a of the first and second planetary gear assemblies 52 and 54 are formed with axial bores through which a transmission output shaft 64 having a center axis aligned with the center axis of the transmission input shaft 28 is passed through and axially extends rearwardly away from the second planetary gear assembly 54. The transmission output shaft 64 is connected to the pinion carrier 56 of the first planetary gear assembly 52 direction at its foremost end portion and further to the ring gear 53b of the second planetary gear assembly 54 through a generally disc shaped connecting member 66 which is keyed or splined at its inner peripheral edge to an intermediate axial portion of the transmission output shaft 64 and at its outer peripheral edge to the ring gear 54b of the second planetary gear assembly 54. The clutches 40 and 42, the planetary gear assemblies 52 and 54 and the connecting members between the clutches and planetary gear assemblies are enclosed within a transmission case (not shown). The previously mentioned stationary wall structure 34 integral with or securely connected to the stator support hollow shaft 30 may be constituted by a front end portion of the transmission case.

Within a rear end portion of the transmission case is positioned a low-and-reverse brake 68. The low-and-reverse brake 68 is herein assumed to be of the multiple disc type by way of example and is, thus, shown composed of a plurality of brake discs 68a keyed or splined at their inner peripheral edges to the rear axial extension of the connecting drum 62 engaging the pinion carrier 60 of the second planetary gear assembly 54, and a plurality of brake plates 68b which are keyed or splined at their outer peripheral edges to a stationary wall structure 34'. The stationary wall structure 34' may be constituted by a rear end portion of the transmission case. Though not shown in the drawings, the low-and-reverse brake 68 has further incorporated therein a return spring urging the brake discs and plates 68a and 68b of the brake unit to be disengaged from one another and a brake piston which is adapted to bring the brake discs and plates 68a and 68b into engagement with one another when the piston is moved by a fluid pressure developed in a fluid chamber which is formed between the piston and the above mentioned stationary wall structure 34', as is well known in the art. It is apparent that the low-and-reverse brake 68 of the multiple disc type as above described may be replaced with a brake unit of the cone type which is well known in the art.

The low-and-reverse brake 68 is paralleled in effect by a transmission one-way clutch 70 which is positioned within the rear axial extension of the above mentioned connecting drum 68. The transmission one-way clutch 70 is assumed to be of the sprag type by way of example and is, thus, shown comprising a stationary inner race member 70a, a rotatable outer race member 70b and a series of spring loaded sprag segments 70c disposed between the inner and outer race members 70a and 70b. The stationary inner race member 70a is centrally bored to have the transmission output shaft 64 axially passed therethrough and is bolted or otherwise securely fastened to the stationary wall structure 34' which may form part of the transmission case. On the other hand, the rotatable outer race member 70b is keyed or splined along its outer periphery to the rear axial extension of the connecting drum 62 carrying the brake discs 68a of the low-and-reverse brake 68. The sprag segments 70c provided between the inner and outer race members 70a and 70b are arranged in such a manner that the sprag segments 70c are caused to stick to the inner and outer race members 70a and 70b and thereby lock up the rotatable outer race member 70b to the stationary inner race member 70a when the outer race member 70b is urged to turn about the center axis of the transmission output shaft 64 in a direction opposite to the direction of rotation of the crankshaft 12 of the engine 10, viz., to the direction of rotation of the transmission output shaft 64 to produce a forward drive mode of an automotive vehicle. The direction of rotation of any member rotatable about an axis coincident or parallel with the center axis of the transmission output shaft 64 will be herein referred to as forward direction if the direction of rotation of the member is identical with the direction of rotation of the transmission output shaft 64 to produce a forward drive condition in a vehicle and as reverse direction if the direction of rotation of the member is identical with the direction of rotation of the transmission output shaft 64 to produce a rearward drive condition of the vehicle. Thus, the above described transmission one-way clutch 70 is adapted to allow the connecting drum 62 and accordingly the pinion carrier 60 of the second planetary gear assembly 54 to turn in the forward direction about the center axis of the transmission output shaft 64 but prohibit the connecting drum 60 and the pinion carrier 60 from being rotated in the reverse direction about the center axis of the transmission output shaft 64. The forward direction herein referred to is identical with the direction of rotation of the crankshaft 12 of the engine 10 and accordingly with the direction of rotation of the transmission input shaft 28. It is apparent that the transmission one-way clutch 70 of the sprag type as above described may be replaced with a one-way clutch of the well known cam and roller type if desired.

Figure 2A:
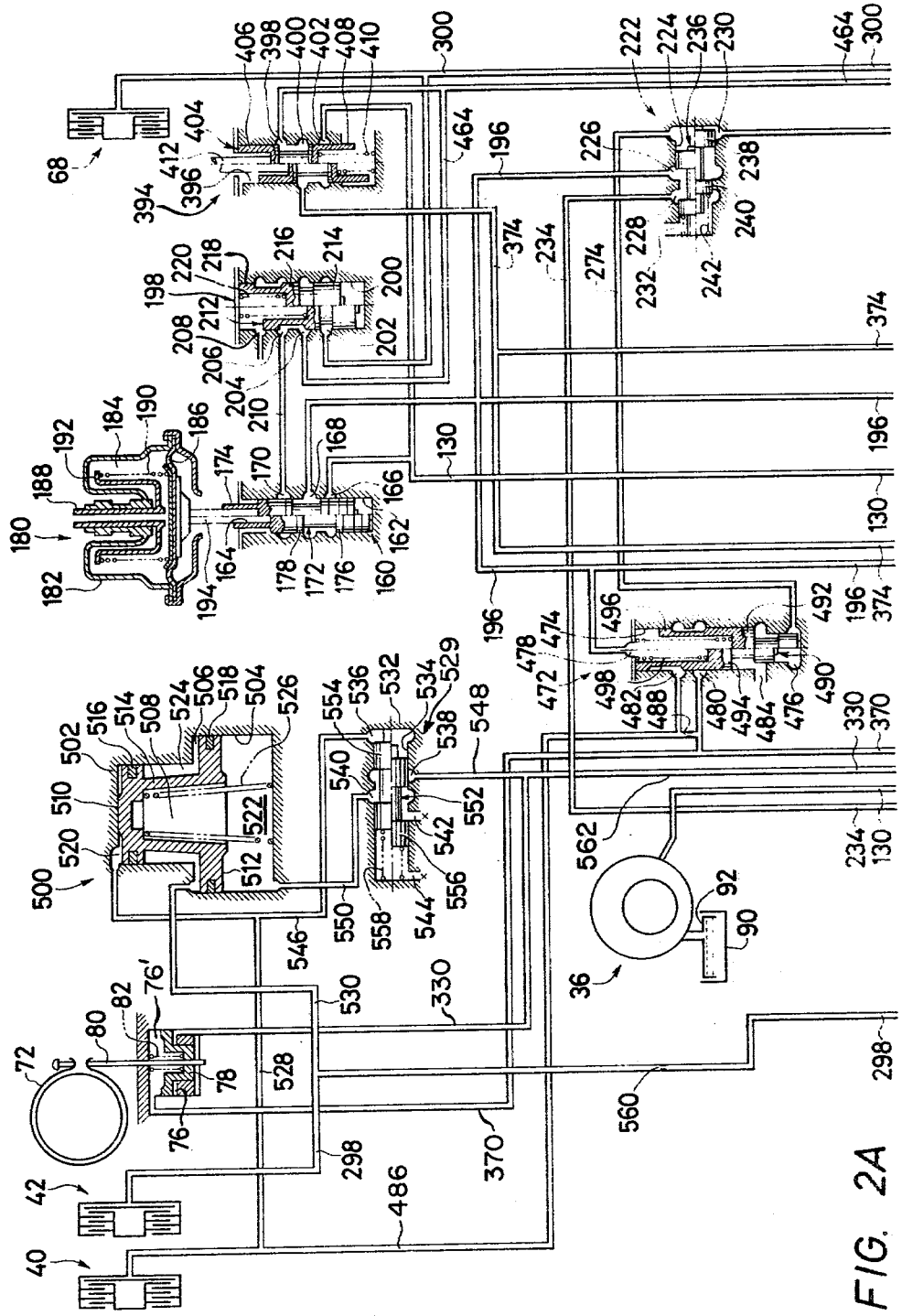
FIGS. 2A and 2B are a schematic view showing a hydraulic control system including a preferred embodiment of a shock control arrangement according to the present invention.

The power transmission mechanism shown in FIG. 1 further comprises a brake band 72 wrapped around the outer peripheral surface of an axial portion of the connecting shell 58 integral with or securely fastened to the clutch drum 46 for the high-and-reverse clutch 40. The brake band 72 is anchored at one end to the transmission casing and is at the other end connected to or engaged by a fluid operated band servo unit 74 which is illustrated at the top of FIG. 2A. Referring to FIG. 2A, the band servo unit 74 has a housing formed with brake-apply and brake-release fluid chambers 76 and 76' which are separated by a servo piston 78 connected by a piston rod 80 to the brake band 72. The servo piston 78 is axialy moved in a direction to cause the brake band 72 to be contracted and tightened upon the outer peripheral surface of the connecting shell 58 when there is a fluid pressure developed in the brake-apply fluid chamber 76 in the absence of a fluid pressure in the brake-release fluid chamber 76'. The servo piston 78 is biased to axially move in a direction to contract the brake-apply fluid chamber, via., cause the brake band 72 to be disengaged from the connecting shell 58 by means of a return spring 82 incorporated into the servo unit 74. Furthermore, the piston 78 and the housing of the servo unit 74 are designed so that the piston 78 has a differential pressure acting area effective to move the piston in the particular direction when the piston is subjected to fluid pressures on both sides thereof. When a fluid pressure is built up in the brake-release fluid chamber 76', the servo piston 78 is axially moved in a direction to cause the brake band 72 to expand and disengage from the connecting shell 58 regardless of the presence or absence of a fluid pressure in the brake-apply fluid chamber 76 of the servo unit 74.

Turning back to FIG. 1, the output shaft 64 of the power transmission mechanism thus constructed and arranged projects rearwardly from the transmission case and has mounted thereon a transmission governor assembly 84 consisting of primary and secondary governor valves 86 and 86' which are arranged in diametrically opposed relationship to each other across the center axis of the transmission output shaft 64. Indicated at 88 is a transmission output shaft locking gear which forms part of a parking lock assembly to lock the transmission output shaft 64 during parking of the vehicle and which is mounted together with a transmission oil distributor (not shown) on the transmission output shaft 64. Though not shown in the drawings, the transmission output shaft 64 is connected at the rear end thereof to the final drive mechanism of the vehicle and thus makes up the power train between the internal combustion engine 10 and the driving road wheels of the vehicle, as well known in the art.

Power Transmission Mechanism—Operation

The high-and-reverse and forward drive clutches 40 and 42, the low-and-reverse brake 68, one-way clutch 70 and brake band 72 of the power transmission mechanism having the construction hereinbefore described are operated in accordance with schedules indicated in Table I.

In Table I, the sign "o" indicates that for each of the high-and-reverse, forward-drive and one-way clutches the clutch in question is in a coupled condition and for the low-and-reverse brake 68 the brake is in a condition applied. As to the brake band 72, the sign "o" in the column under "Applied" indicates that the brake band 72 is actuated to lock up the connecting shell 58 and the sign "o" in the column under "Released" indicates that the brake band 72

TABLE 1

| Gear Positions | Clutches | | Low/Rev Brake 68 | One-way Clutch 70 | Brake Band 72 | |
|---|---|---|---|---|---|---|
| | High/Rev 40 | Forward 42 | | | Applied | Released |
| "P" | | | o | | | |
| "R" | o | | o | | | o |
| "N" | | | | | | |
| "D" D₁ | | o | | o | | |
| D₂ | | o | | | o | |
| D₃ | o | o | | | (o) | o |
| "2" | | o | | | o | |
| "1" | | o | o | | | | is released from the disconnecting shell 58. The sign "o" enclosed in the parentheses means that there is a fluid pressure developed in the brake-apply chamber 76 of the servo unit 74 (FIG. 2A) but the brake band 72 is released from the connecting drum 58 with a fluid pressure also developed in the brake-release chamber 76' of the servo unit 74.

The parking, reverse drive and neutral gear positions and the automatic forward drive and manual first and second forward drive ranges as indicated in the leftmost column of Table I are selectively established in the transmission mechanism by manipulating a manually operated transmission gear shift lever (not shown) which have positions "P", "R", "N", "D", "2" and "1" respectively corresponding to the above mentioned gear positions and ranges.

When, now, the transmission gear shift lever is in the parking gear position "P" or the neutral gear position "N", both of the high-and-reverse and forward drive clutches 40 and 42 in the transmission mechanism are held in the uncoupled conditions thereof so that the driving connection between the transmission input and output shafts 28 and 64 is interrupted and as a consequence the transmission output shaft 64 is maintained at rest even though the engine 10 may be in operation delivering its power output from the crankshaft 12. Under these conditions, either the parking gear position or the neutral gear position is established in the transmission mechanism depending upon whether the transmission gear shift lever is in the parking gear position "P" or in the neutral gear position "N". If the transmission gear shift lever is in the parking gear position "P", the low-and-reverse brake 68 is held in the condition applied so that the connecting drum 62 and accordingly the pinion carrier 60 of the second planetary gear assembly 54 are locked to the transmission case. During parking of the vehicle, the transmission output shaft locking gear 88 mounted on the governor 84 is engaged by a locking pawl of the above mentioned parking lock assembly so that the transmission output shaft 64 is locked up to the transmission case.

When the transmission gear shift lever is manually moved into the automatic forward drive range position "D" with the engine 10 operating, the forward drive clutch 42 is caused to couple. The power output delivered from the crankshaft 12 of the engine 10 to the transmission input shaft 28 through the torque converter 14 is transmitted through the forward drive clutch 42 and the clutch hub 48 to the internally tooth ring gear 52b of the first planetary gear assembly 52. The ring gear 52b of the first planetary gear assembly 52 is driven to rotate in the forward direction about the center axis of the transmission output shaft 64 and thereby causes the externally toothed sun gear 52a of the planetary gear assembly 52 to rotate in the opposite direction about the center axis of the shaft 64 through the planet pinions 52c each of which is rotated in the same direction as the ring gear 52b about its own axis of rotation. The externally toothed sun gear 54a of the second planetary gear assembly 54 is rotated with the sun gear 52a of the first planetary gear assembly 52 in the reverse direction about the center axis of the transmission output shaft 64 and causes the internally toothed ring gear 54b of the second planetary gear assembly 54 to turn in the forward direction about the center axis of the transmission output shaft 64. Under these conditions, the individual planet pinions 54c of the second planetary gear assembly 54 are caused to rotate in the forward direction about the respective axes of rotation thereof and therefore attempt to turn in the reverse direction about the center axis of the transmission output shaft 64. The revolution of the pinion carrier 60 of the second planetary gear assembly 54 is, however, prohibited by the one-way clutch 70 connected to the pinion carrier 60 by the connecting drum 62 with the result that the pinion carrier 60 is locked to the transmission case and act as reaction elements for the ring gear 54b which drives the transmission output shaft 64 to rotate in the forward direction about the center axis thereof. The transmission output shaft 64 is connected to the pinion carrier 56 of the first planetary gear assembly 52 so that the planet pinions 52c of the first planetary gear assembly 52 is rotated about the center axis of the transmission output shaft 64 in the same direction as the direction of rotation of the ring gear 52b of the planetary gear assembly 52 but at a revolution speed which is lower with a certain ratio than the revolution speed of the ring gear 52b on which the planet pinions 52c are rolling, thereby creating the first or "low" gear ratio ($D_1$) in the automatic forward drive range in the transmission mechanism.

If the vehicle is thereafter sped up and the vehicle speed reaches a certain level, the band servo unit 74 for the brake band 72 is actuated by a fluid pressure developed in the brake-apply fluid chamber 76 of the servo unit 72 (FIG. 2A) and causes the brake band 72 to be tightened around the connecting shell 58 which is keyed or splined to the respective sun gears 52a and 54a of the first and second planetary gear assemblied 52 and 54.

The sun gear 52a of the first planetary gear assembly 52 now acts as a reaction element for the planet pinions 52c which are being driven to turn in the forward direction about the center axis of the transmission output shaft 64 by the ring gear 52b rotating with the transmission input shaft 28 through the forward drive clutch 42 which is kept coupled. The driving torque carried over to the ring gear 52b of the first planetary gear assembly 52 through the forward drive clutch 42 is therefore transmitted to the transmission output shaft 64 by means of the planet pinions 52c of the first planetary gear assembly 52 and the associated pinion carrier 56. Under these conditions, the individual planet pinions 52c of the first planetary gear assembly 52 are caused to rotate in the forward direction about the respective axes of rotation thereof and thus roll on the internally toothed ring gear 52b of the planetary gear assembly 52 while rotating in the forward direction about the center axis of the transmission output shaft 64. The transmission output shaft 64 is thus rotated in the forward direction about the center axis thereof at a speed higher than that achieved under the first forward drive gear condition but lower with a certain ratio than the revolution speed of the ring gear 52b of the first planetary gear assembly 52, thereby producing the second or "intermediate" gear ratio "$D_2$" in the automatic forward in the transmission mechanism. Under the second gear ratio condition thus established, the transmission output shaft 64 drives the ring gear 54b of the second planetary gear assembly 54 to rotate in the forward direction about the center axis of the shaft 64 and thereby causes the planet pinions 54c of the planetary gear assembly 54 to turn about the center axis of the transmission output shaft 64 in the same direction as the direction of rotation of the ring gear 54b. Thus, the pinion carrier 60 of the second planetary gear assembly 54 and accordingly the connecting drum 62 are also rotated in the forward direction about the center axis of the transmission output shaft 64 and cause the outer race member 70b of the transmission one-way clutch 70 to run idle around the inner race member 70a of the clutch 70.

As the vehicle speed further increases, a fluid pressure is developed in the brake-release fluid chamber 76' of the band servo unit 72 (FIG. 2A) and causes the brake band 72 to be released from the connecting shell 58 and, substantially at the same time, the high-and-reverse clutch 40 is actuated to couple. The power output delivered from the crankshaft 12 of the engine 10 to the transmission input shaft 28 is now transmitted on the one hand to the respective sun gears 52a and 54a of the first and second planetary gear assemblied 52 and 54 through the high-and-reverse clutch 40 and the connecting shell 58 released from the brake band 72 and on the other hand to the ring gear 52b of the first planetary gear assembly 52 by way of the forward drive clutch 42 and the clutch hub 48. It therefore follows that the sun gear 52a and the ring gear 52b of the first planetary gear assembly 52 are interlocked together so that the sun and ring gears 52a and 52b and the planet pinions 52c of the first planetary gear assembly 52 as well as the transmission output shaft 64 connected to the planet pinions 52c by the pinion carrier 56 are driven to rotate as a single unit in the forward direction about the center axis of the transmission output shaft 64. The transmission output shaft 64 is thus rotated in the forward direction about the center axis thereof at a speed substantially equal to the revolution speed of the transmission input shaft 28, thereby providing the third of "high" gear ratio ($D_3$) in the automatic forward drive range in the transmission mechanism. Under the third forward drive gear ratio condition thus established, the transmission input shaft 28 driven by the turbine runner 18 of the torque converter 14 is rotated at a speed substantially equal to the revolution speed of the engine crankshaft 12 driving the pump impeller 16 of the torque converter 14 and, as a consequence, there occurs no torque multiplication by the torque converter 14, which thus functions merely as a fluid coupling.

When the manually operated transmission gear shift lever is moved into the reverse drive gear position "R", the high-and-reverse clutch 40 and the low-and-reverse brake 68 are actuated in the transmission mechanism illustrated in FIG. 1. With the high-and-reverse clutch 40 thus coupled, the power output delivered from the crankshaft 12 of the engine 10 to the transmission input shaft 28 by way of the torque converter 14 is transmitted through the clutch 40, front clutch drum 46 and connecting shell 58 to the sun gears 52a and 54a of the first and second planetary gear assemblies 52 and 54, respectively, causing the sun gears 52a and 54a to rotate in the forward direction about the center axis of the transmission output shaft 64. The low-and-reverse brake 68 being actuated to lock the connecting drum 62 to the transmission case, the pinion carrier 60 of the second planetary gear assembly 54 is held stationary with respect to the transmission case, with the result that the planet pinions 54c of the second planetary gear assembly 54 are driven by the sun gear 54a of the second planetary gear assembly 54 for rotation in the reverse direction about their respective axes of rotation. This causes the ring gear 54b of the second planetary gear assembly 54 and accordingly the transmission output shaft 64 to rotate in the reverse direction about the center axis thereof at a speed which is lower with a certain ratio than the revolution speed of the sun gears 52a and 54a of the planetary gear assemblies 52 and 54 and accordingly of the transmission input shaft 28, establishing the reverse drive gear condition in the transmission mechanism.

When the transmission gear shift lever is in the manual second forward drive range position "2", the forward drive clutch 42 and the brake band 72 are actuated in combination and, as a consequence, the transmission output shaft 64 is driven to rotate in the forward direction about the center axis thereof by means of the pinion carrier 56 of the first planetary gear assembly 52 so as to produce the second or "intermediate" gear ratio between the transmission input and output shafts 28 and 64 as in the second gear ratio condition produced with the transmission gear shift lever held in the automatic forward drive range position "D".

Under the condition in which the transmission gear shift lever is moved into the manual first forward drive range position "1", the low-and-reverse brake 68 as well as the forward drive clutch 42 is actuated to lock the pinion carrier 60 of the second planetary gear assembly 54. The transmission output shaft 64 is driven to rotate in the forward direction about the center axis thereof by the ring gear 54b of the second planetary gear assembly 54 having the pinion carrier 60 held stationary with respect to the transmission case so as to produce the first or "low" gear ratio between the transmission input and output shafts 28 and 64, as in the first gear ratio condition produced with the transmission gear shift lever held in the automatic forward drive range position "D". While the pinion carrier 60 of the second planetary gear assembly 54 is locked to the transmission case by the action of the transmission one-way clutch 70 under the first gear ratio condition produced in the automatic forward drive range, the pinion carrier 60 is locked to the transmission case by means of the low-and-reverse brake 68 under the manual first forward drive range condition. During the manual first forward drive range condition, therefore, a driving torque can be transmitted backwardly from the ring gear 54b to the sun gear 54a through the planet pinions 54c in the second planetary gear assembly 54 and, for this reason, the engine can be braked upon by the inertia of the vehicle.

Figure 2B:
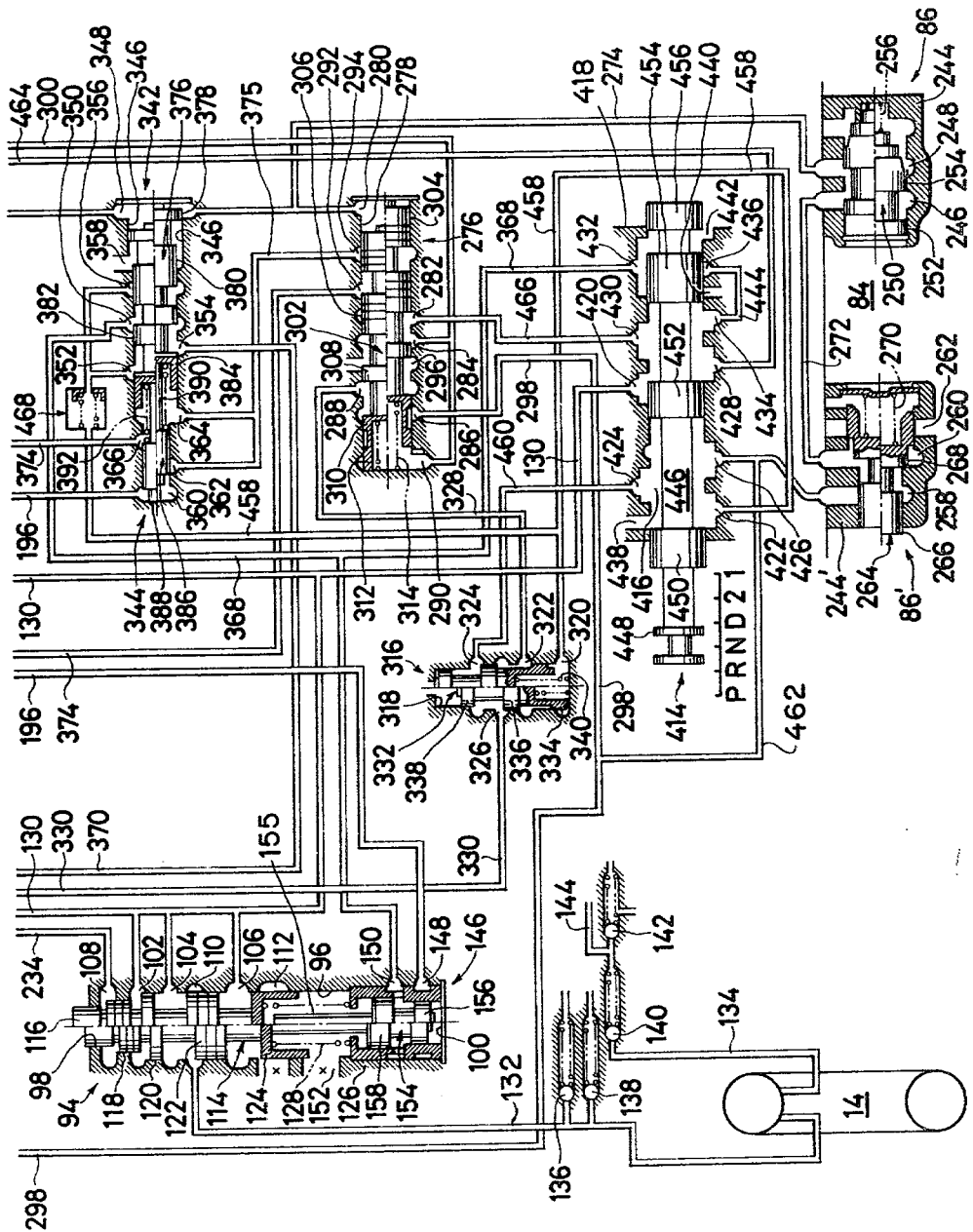

In accordance with the present invention, the clutches and brakes incorporated in the transmission mechanism thus constructed and arranged are actuated selectively by means of a hydraulic control system illustrated in FIGS. 2A and 2B. It should however be borne in mind that the transmission mechanism hereinbefore described with reference to FIG. 1 is merely illustrative of a representative example of a transmission mechanism to which the hydraulic control system according to the present invention is applicable and that the hydraulic control system illustrated in FIGS. 2A and 2B is compatible with any power transmission mechanism including clutches and brakes which are to be actuated in accordance with the schedules indicated in Table 1.

Hydraulic Control System—Arrangement

Referring to FIGS. 2A and 2B, the hydraulic control system for use with the power transmission mechanism illustrated in FIG. 1 is supplied with fluid under pressure from the transmission oil pump assembly 36 which has a suction port communicating with a transmission oil reservoir 90 having an oil strainer 92 installed therein. Though not shown in the drawings, the oil reservoir 90 is provided below a transmission control valve body bolted or otherwise securely attached to the bottom of the transmission case as is well known in the art. The oil strainer 92 is adapted to remove dust from the fluid to be sucked in by the transmission oil pump assembly 36 from the oil reservoir 90 during operation of the vehicle.

The transmission oil assembly 36 is driven by the pump impeller 16 (FIG. 1) of the torque converter 14 as previously noted and delivers at its fluid discharge port a fluid pressure which is variable with the revolution speed of the engine crankshaft driving the pump impeller of the torque converter 14. The fluid pressure delivered from the transmission oil pump assembly 36 is thus subject to fluctuations responsive to various operating conditions of the engine. In order to supress such fluctuations in the fluid pressure delivered from the transmission oil pump assembly 36, the hydraulic control system shown in FIG. 2 comprises a pressure regulator valve 94 which is operative to develop a line pressure Pl which remains substantially constant at low engine speeds and increases as the engine speed is increased within a certain range. When the vehicle speed increases beyond a certain level, the line pressure Pl decreases as the engine speed increases, as will be discussed in more detail as the description proceeds.

The pressure regulator valve 94 comprises an elongated valve chamber 96 which is formed in the above mentioned transmission control valve body and which is contiguous at one axial end to a bore 98 also formed in the control valve body. The valve chamber 96 is closed at the other axial end by an end wall 100 formed by the control valve body or constituted by any plate member attached to the control valve body. The valve chamber 96 has first, second and third line pressure ports 102, 104 and 106, a modified throttle pressure port 108, a torque converter fluid supply port 110 and a drain port 112. With the valve chamber 96 thus arranged is mounted a pressure regulator valve spool 114 which is axially slidable in the valve chamber 96 and which has an axial extension 116 slidably received in the above mentioned bore 98 adjacent to the valve chamber 96. The valve spool 114 has first, second, third and fourth circumferential lands 118, 120, 122 and 124 which are arranged in this sequence away from the extension 116 of the valve spool 114. The circumferential lands 118, 120, 122 and 124 are axially spaced apart from each other and thus form a circumferential groove between every adjacent two of them. The lands of the valve spool 114 have substantially equal cross sectional areas except for the first circumferential land 118 which is smaller in cross sectional area than the remaining lands 120, 122 and 124 as shown. The lands of the valve spool 114 are, furthermore, arranged in such a manner that the individual grooves formed between the first, second, third and fourth circumferential lands 118, 120, 122 and 124 are at all times open to the first, second and third line pressure ports 102, 104 and 106, respectively, and the annular outer end face of the first circumferential land 118 having the extension 116 axial projecting therefrom is constantly subjected to a fluid pressure developed in the modified throttle pressure port 108. The valve spool 114 thus configured is movable within the valve chamber 96 between a first axial position closing the torque converter fluid supply port 110 and the drain port 112 by the third and fourth circumferential lands 122 and 124, respectively, thereof as indicated by the right half of the valve spool 114, and a second axial portion having the grooves between the third and fourth circumferential lands 122 and 124 open to the torque converter fluid supply port 110 and the drain port 112, respectively, as indicated by the left half of the valve spool 114. When the valve spool 114 is in the second axial position thereof, communication is provided between the second line pressure port 104 and the torque converter fluid supply port 110 through the groove between the second and third circumferential lands 120 and 122 and between the third line pressure port 106 and the drain port 112 through the groove between the third and fourth circumferential lands 122 and 124. Such communication is blocked when the valve spool 114 is in the first axial position thereof.

Within the valve chamber 96 is further provided a sleeve 126 which is fixedly held in place adjacent to the previously mentioned closed end wall 100 of the valve chamber 96 and which has an annular end wall confronting the fourth circumferential land 124 of the valve spool 114. A preloaded helical compression spring 128 is positioned between the sleeve 126 and the valve spool 114 and is seated at one end on the annular end wall of the sleeve 126 and received at the other end in a blind axial bore formed in the fourth land 124. The pressure regulator valve spool 114 is, thus, biased to move toward the first axial position thereof by means of the spring 128. During operation of the pressure regulator valve 94, the force of the spring 128 thus acting on the valve spool 114 opposes the force resulting from a fluid pressure developed in the first line pressure port 102 and thus acting on the differential pressure acting area between the first and second circumferential lands 118 and 120 of the valve spool 114 and, in the presence of a fluid pressure in the modified throttle pressure port 108 in addition to the fluid pressure in the first line pressure port 102, the force produced by the fluid pressure thus acting on the annular outer end face of the first circumferential land 118 as well.

The first, second and third line pressure ports 102, 104 and 106 of the pressure regulator valve 94 are all in constant communication with the fluid discharge port of the transmission oil pump 36 through a line pressure circuit 130, while the drain port 112 is open to the fluid reservoir 90. If the force of the spring 128 of the pressure regulator valve 94 is overcome by the force resulting from the fluid pressure developed in the first line pressure port 102 or by the sum of the forces resulting from the fluid pressures developed in the line and modified throttle pressure ports 102 and 108, the valve spool 114 of the pressure regulator valve 94 is moved toward the second axial position thereof and allows the fluid in the line pressure circuit 130 to be discharged into the oil reservoir 90 by way of the third line pressure port 106 and the drain port 112 through the groove between the third and fourth circumferential lands 122 and 124 of the valve spool 114. An excess of fluid pressure which may be developed in the line pressure circuit 130 is in this fashion relieved through the drain port 112 of the pressure regulator valve 94 until the fluid pressure in the line pressure circuit 130 is reduced to a certain level at which the force produced by the fluid pressure acting on the valve spool 114 from the first line pressure port 102 or the sum of the forces resulting from the fluid pressures acting on the valve spool 114 from the line and modified throttle pressure ports 102 and 108, respectively, is equalized with the opposing force of the spring 128. When such a level is reached by the fluid pressure in the line pressure circuit 130, the valve spool 114 of the pressure regulator valve 94 is moved toward the first axial position thereof and blocks the communication between the ports 106 and 112 by the fourth circumferential land 124 thereof. If, conversely, the force or the sum of the forces thus exerted on the valve spool 114 against the action of the spring 128 is overcome by the force of the spring 128, then the valve spool 114 is moved toward the first axial position thereof with the result that the fluid confined in the line pressure circuit 130 with the drain port 112 closed by the fourth circumferential land 124 of the valve spool 114 is urged to compress. This causes the fluid pressure in the line pressure circuit 130 to rise until the force or the sum of the forces exerted on the valve spool 114 against the action of the spring 128 becomes equal to the force of the spring 128. In the absence of a fluid pressure in the modified throttle pressure port 108, the valve spool 114 of the pressure regulator valve 94 is in these manners repeatedly moved back and forth or caused to "hunt" between the first and second axial positions thereof in an attempt to assume an equilibrium axial portion in which the force produced by the fluid pressure acting on the differential pressure acting area between the lands 118 and 120 of the valve spool 114 is substantially balanced with the opposing force of the spring 128. The fluid pressure in the line pressure circuit 130 constantly communicating with the first line pressure port 102 of the pressure regulator valve 94 is therefore maintained at a substantially constant level or the line pressure Pl dictated by the force of the spring 128, irrespective of the fluctuations which may occur in the fluid pressure developed at the fluid discharge port of the transmission oil pump assembly 36. When there is a fluid pressure developed in the modified throttle pressure port 108, not only the force resulting from the line pressure Pl acting on the differential pressure acting area of the valve spool 114 but a force produced by the fluid pressure acting on the annular outer end face of the first circumferential land 118 of the valve spool 114 oppose the force of the spring 128 with the result that the line pressure Pl acting on the differential area of the valve spool 114 is reduced or "cut down" to a level which is dictated or variable with the fluid pressure built up in the throttle pressure port 108.

The torque converter fluid supply port 110 of the pressure regulator valve 94 thus constructed and arranged is in constant communication with the torque converter 14 through a torque converter fluid supply circuit 132 and, past the torque converter 14, further with a torque converter fluid discharge circuit 134. The torque converter fluid supply circuit 132 is shown provided with a converter inlet pressure relief valve 136 and a front transmission unit lubricating fluid supply valve 138 and, likewise, the torque converter fluid discharge circuit 134 is shown provided with a converter outlet pressure relief valve 140 and a rear transmission unit lubricating fluid drain-back valve 142. The converter inlet pressure relief valve 136 is adapted to be open and discharge the fluid from the torque converter fluid supply circuit 132 when the pressure of the fluid in the converter fluid supply circuit 132 is higher than a predetermined value. The front transmission unit lubricating fluid supply valve 138 is arranged in parallel, in effect, with the converter inlet pressure relief valve 136 and is operative to pass the converter fluid to the front unit of the transmission mechanism at a limited rate for lubricating the various slidable members and structures forming part of or incorporated into the front transmission unit. On the other hand, the converter outlet pressure relief valve 140 is disposed between the torque converter fluid discharge circuit 134 and a rear transmission unit lubricating fluid circuit 144 and is operative to pass the fluid from the converter fluid discharge circuit 134 to the rear unit of the transmission mechanism through the lubricating fluid circuit 144 when the fluid pressure in the torque converter fluid discharge circuit 134 is higher than a predetermined value. The rear transmission unit lubricating fluid drain-back valve 142 is arranged in parallel, in effect, with the above mentioned rear transmission unit lubricating fluid circuit 144 and is adapted to be open and discharge the fluid from the lubricating fluid circuit 144 when the pressure of the fluid to be passed to the rear transmission unit by way of the fluid circuit 144 is higher than a predetermined value.

Reverting to the pressure regulator valve 94, the sleeve 126 providing a spring seat for the spring 128 of the regulator valve 94 forms part of a line pressure booster valve 146 which is adapted to reduce the line pressure Pl under predetermined operational conditions of the vehicle as will be described in more detail. Thus, the valve chamber 96 having the sleeve 126 accommodated therein further has a throttle pressure port 148, a line pressure port 150 and a drain port 152, which are located at greater spacings from the closed end wall 100 of the valve chamber 96. The sleeve 126 is formed with a cutout located adjacent to the end wall 100 of the valve chamber 96 and open to the throttle pressure port 148 and an opening located in an intermediate axial portion of the sleeve 126 and open to the line pressure port 150 as shown. The drain port 152 is located intermediate between the annular end wall of the sleeve 126 and the drain port 112 of the pressure regulator valve 94 and is open to the transmission oil reservoir 90. The sleeve 126 further has a stepped axial bore having one end at the closed axial end wall 100 of the valve chamber 96 and open at the other end to the drain port 152 through an aperture in the annular end wall of the sleeve 126. A valve spool 154 is in part positioned and axially movable within this stepped axial bore in the sleeve 126 and is formed with first and second circumferential lands 156 and 158 which are axially slidable on the stepped inner peripheral surfaces, respectively, of the sleeve 126 between the closed end wall 100 of the valve chamber 96 and the annular end wall of the sleeve 126. The lands 156 and 158 of the valve spool 154 are axially spaced apart from each other and thus form a circumferential groove therebetween. The second circumferential land 158 is larger in cross sectional area than the first land circumferential 156 so that a differential pressure acting area is provided between the opposite annular end faces of the lands 156 and 158. The valve spool 154 further has an axial extension projecting outwardly from the second circumferential land 158 toward the internal end face of the fourth land 124 of the valve spool 114 of the pressure regulator valve 94 through the aperture in the annular end wall of the sleeve 126, as shown.

When there is a fluid pressure developed in the thorttle pressure port 148 of the line pressure booster valve 146 thus constructed and arranged, the fluid pressure acts on the end face of the first land 156 of the line pressure booster valve spool 154 through the above mentioned cutout in the sleeve 126 and forces the valve spool 154 to axially move away from the closed end wall 100 of the valve chamber 96 and brings the axial extension 155 of the valve spool 154 into abutting and thereafter pressing engagement at its leading end with the internal end face of the fourth land 124 of the pressure regulator valve spool 114 as indicated by the left half of the valve spool 154 of the line pressure booster valve 146. Under these conditions, the force of the spring 128 acting on the valve spool 114 of the pressure regulator valve 94 is reinforced by the force thus applied to the valve spool 114 from the valve spool 154 of the pressure booster valve 146 so that the line pressure Pl acting on the differential pressure acting area of the valve spool 114 of the pressure regulator valve 94 through the first line pressure port 102 of the valve 94 is augmented or "boosted" by a value which is proportional to the fluid pressure acting on the end face of the first circumferential land 156 of the valve spool 154 of the line pressure booster valve 146 irrespective of the presence or absence of a fluid pressure in the throttle pressure port 108 of the pressure regulator valve 94. Under predetermined conditions of the vehicle (as when the transmission gear shift lever is in the reverse drive gear position "R" as will be discussed), a fluid pressure (line pressure) is developed in the line pressure port 150 in addition to the fluid pressure developed in the throttle pressure port 148 of the booster valve 146 and acts on the differential pressure acting area between the first and second circumferential lands 156 and 158 of the line pressure booster valve 146. Under these conditions, the line pressure Pl acting on the differential pressure acting area of the valve spool 114 of the pressure regulator valve 94 is opposed not only by the force of the spring 128 and the force resulting from the fluid pressure acting on the outer end face of the first circumferential land 156 of the valve spool 154 of the line pressure booster valve 146 but by the fluid pressure acting on the differential pressure acting area of the booster valve spool 154 and so that the line pressure Pl developed by the pressure regulator valve 94 is further increased or "boosted".

The fluid pressure to be introduced into the throttle pressure port 148 of the line pressure booster valve 146 is developed by a vacuum operated transmission throttle valve 160 which is shown at an upper part of FIG. 2A.

The transmission throttle valve 160 is provided in an elongated valve chamber 162 formed in the previously mentioned transmission control valve body (not shown) and which is closed at one axial end and contiguous at the other axial end to an axial bore 164 aligned with the valve chamber 162 and open to the outside of the transmission control valve body. The valve chamber 162 has a line pressure port 166, a throttle pressure port 168 and a throttle back-up pressure port 170, which are arranged in this sequence away from the closed axial end of the valve chamber 162. Within the valve chamber 162 thus formed is mounted a throttle valve spool 172 which is axially slidable in the valve chamber 162 and which has an axial extension 174 axially slidable through the above mentioned axial bore 164 and projecting outwardly from the bore 164. The valve spool 172 has first and second circumferential lands 176 and 178 which are also arranged in this sequence away from the closed axial end of the valve chamber 162. The circumferential lands 176 and 178 are substantially equal in cross sectional area and are axially spaced apart from each other so as to form therebetween a circumferential groove which is constantly open to the throttle pressure port 168 irrespective of the axial position of the valve spool 172 within the valve chamber 162. As indicated by dotted lines in the drawing, the throttle valve spool 172 is further formed with a diametrical passageway which is open at its opposite ends to the above mentioned groove between the first and second dircumferential lands 176 and 178 and an axial passageway leading from the diametrical passageway and open at the outer axial end of the first circumferential land 176 located adjacent to the closed axial end of the valve chamber 162. The throttle valve spool 172 thus configured is movable in the valve chamber 162 between a first axial position closest to the closed axial end of the valve chamber 162 and having the groove between the lands 176 and 178 open not only to the throttle pressure port 168 but to the line pressure port 166 as indicated by the left hand of the valve spool 172 and a second axial position spaced away from the closed axial end of the valve chamber 162 and closing the line pressure port 166 by the first circumferential land 176 thereof as indicated by the right half of the valve spool 172. The throttle back-up pressure port 170 is closed completely by the second circumferential 178 of the valve spool 172 when the valve spool 172 is in the first axial position thereof. When the valve spool 172 is in the second axial position thereof, the second circumferential land 178 of the valve spool 172 is located to be on the point of forming a clearance between the throttle back-up pressure port 170 and the groove between the lands 176 and 178 of the valve spool 172.

The transmission throttle valve 160 thus constructed and arranged is operated in accordance with the variation in the driving torque of the engine 10 (FIG. 1) valve actuating by means comprised of a vacuum responsive diaphragm assembly 180 which is responsive to the vacuum developed in the intake manifold (not shown) of the engine. As is well known in the art, the vacuum developed in the intake manifold of an internal combustion engine varies with the opening degree of the throttle valve in the carburetor (not shown) of the engine and accordingly with the amount of load exerted on the engine and is, therefore, representative of the driving torque delivered from the output shaft of the engine.

In FIG. 2A, the diaphragm assembly 180 is shown comprising a casing 182 formed with a vacuum chamber 184 which is defined in part by a flexible diaphragm element 186 secured along its outer skirt to the casing 182. The vacuum chamber 184 is in constant communication with the intake manifold of the engine through a conduit 188 which is open at one end into the vacuum chamber 184 and which is in part secured to the casing 182. The diaphragm element 186 is urged to move with respect to the casing 182 in a direction to expand the vacuum chamber 184 by suitable biasing means which is shown comprising a preloaded helical compression spring 190 positioned within the vacuum chamber 184 and seated at one end on a spring seat disc fast on the inner face of the diaphragm element 186 and at the other end on a spring retaining element 192 secured to the casing 182. An elongated push rod 194 is fastened at one end to the outer face of the diaphragm element 186 and axially projects in a direction opposite to the vacuum chamber 184 so as to be axially movable back and forth as the vacuum chamber 184 is contracted and expanded. The push rod 194 is connected at the other end thereof to the above described axial extension 174 of the valve spool 172 of the transmission throttle valve 160 so that the throttle valve spool 172 is axially moved between the first and second axial positions thereof as the diaphragm element 186 of the assembly 180 is moved in the directions to produce expansion and constraction, respectively, of the vacuum chamber 184 in the casing 182. In the absence of a vacuum in the vacuum chamber 184, the diaphragm element 186 is held in a position producing maximum expansion of the vacuum chamber 184 by the force of the compression spring 190 acting on the diaphragm element 186 as shown in the drawing. If there is no fluid pressure developed in the throttle pressure port 168 of the throttle valve 160, the throttle valve spool 172 is held in the first axial position closing both of the line pressure port 166 and the throttle back-up pressure port 170 as indicated by the left hand of the valve spool 172. When there is a fluid pressure developed in the throttle pressure port 168, the fluid pressure is conducted through the diametrical and axial passageway in the valve spool 172 to the closed axial end of the valve chamber 162 and acts on the outer end face of the first circumferential land 176 of the valve spool 172, which is consequently urged to axially move away from the first axial position thereof with a force produced by the fluid pressure thus acting on the outer end face of the land 176. If, under these conditions, a vacuum is developed in the vacuum chamber 184 of the diaphragm assembly 180, the diaphragm element 186 is forced to move against the force of the compression spring 190 in the direction to contract the vacuum chamber 184 so that the throttle valve spool 172 connected to the diaphragm element 186 by the push rod 194 is allowed to move toward the second axial position thereof. If, in this instance, the valve spool 172 is moved beyond the second axial position thereof, a clearance is provided between the throttle back-up pressure port 170 and the circumferential groove between the lands 176 and 178 of the valve spool 172 and allows the fluid in the throttle pressure port 168 to the enter the throttle back-up pressure port 170 through such a clearance. When this occurs, the fluid pressure in the throttle pressure port 168 is diminished by a value proportional to the amount of fluid allowed into the throttle back-up pressure port 170 from the throttle pressure port 168. Thus, the valve spool 172 of the throttle valve 160 assumes an equilibrium axial position when the force of the spring 190 urging the valve spool 172 to move toward the first axial position thereof by means of the push rod 194 is equally balanced with the sum of the force produced by the vacuum developed in the vacuum chamber 184 of the diaphragm assembly 180 and the force produced by the fluid pressure acting on the outer end face of the first circumferential land 176 of the valve spool 172 of the throttle valve 160. If the vacuum in the vacuum chamber 184 is increased under these conditions, the valve spool 172 is further moved beyond the second axial position thereof and causes enlargement of the clearance between the throttle back-up pressure port 170 and the groove between the lands 176 and 178 of valve spool 172 and gives rise to a further decrease in the fluid pressure in the throttle pressure port 168 of the throttle valve 160. If, conversely, the vacuum in the vacuum chamber 184 of the diaphragm assembly 180 is reduced under the above described condition, the valve spool 172 of the throttle valve 160 is moved back toward the second axial position thereof and thus reduced the above mentioned clearance, giving rise to an increase in the fluid pressure in the throttle pressure port 168. As the vacuum in the vacuum chamber 184 is further reduced, the throttle valve spool 172 is moved past the second axial position toward the first axial position thereof and provides communication between the line and throttle pressure ports 166 and 168 as indicated by the left half of the valve spool 172. Under these conditions, the fluid pressure in the line pressure port 166 is introduced into the throttle pressure port 168 through the groove between the lands 176 and 178 of the valve spool 172 and causes the fluid pressure in the throttle pressure port 168 toward the level of the fluid pressure in the line pressure port 166 until the valve spool 172 reaches an equilibrium axial position close to the first axial position thereof. The throttle back-up pressure port 170 is drained off except under predetermined conditions as will be described later so that the fluid pressure allowed to enter the port 170 from the throttle pressure port 168 when the valve spool 172 is moved into an axial position past the second axial position thereof is discharged to the transmission oil reservoir 90. The line pressure port 166 is in constant communication with the previously described line pressure circuit 130, while the throttle pressure port 168 is in constant communication with the throttle pressure port 148 of the line pressure booster valve 146 through a throttle pressure circuit 196.

The fluid pressure developed in the throttle pressure port 168 of the throttle valve 160 and accordingly in the throttle pressure circuit 196 above mentioned is, thus, variable with the vacuum developed in the vacuum chamber 184 of the diaphragm assembly 180 and accordingly with the driving torque delivered from the engine in operation and is herein referred to as throttle pressure and denoted by Pt. The throttle pressure Pt increases and decreases with an increase and a decrease, respectively, in the output torque of the engine, as is well known in the art.

Under predetermined conditions, there is developed in the throttle back-up pressure port 170 of the throttle valve 160 a fluid pressure which is higher than the throttle pressure Pt developed by the throttle valve 160 per se in the above described manners. Such a fluid pressure, herein referred to as throttle back-up pressure, is developed by a throttle back-up valve 198 illustrated beside the throttle valve 160.

The throttle back-up valve 198 is provided in an elongated valve chamber 200 formed in the transmission control valve body and closed at both axial ends thereof. The valve chamber 200 has first and second line pressure ports 202 and 204, a throttle back-up pressure port 206 and a drain port 208, which are arranged in this sequence away from one axial end of the valve chamber 200. The throttle back-up pressure port 206 is in constant communication with the throttle back-up pressure port 170 of the above described throttle valve 160 through a fluid passageway 210. Within the valve chamber 200 thus formed is mounted a valve spool 212 which is axially slidable in the valve chamber 200. The valve spool 212 has first, second and third circumferential lands 214, 216 and 218 which are axially spaced apart from each other so as to form a circumferential groove between every adjacent two of them. The groove formed between the first and second circumferential lands 214 and 216 of the valve spool 212 is open selectively to the first or second line pressure port 202 or 204 depending upon the axial position of the valve spool 212 within the valve chamber 200, while the groove formed between the second and third circumferential lands 216 and 218 is constantly open to the throttle back-up pressure port 206 without respect to the axial position of the valve spool 212 and is isolated from or open to the drain port 208 depending upon the axial position of the valve spool 212 within the valve chamber 200. The valve spool 212 is thus movable within the valve chamber 200 between a first axial position having the groove between the first and second circumferential lands 214 and 216 open to the first line pressure port 202 and the groove between the second and third circumferential lands 216 and 218 open to both the second line pressure port 204 and the throttle back-up pressure port 206 as indicated by the left half of the valve spool 212, and a second axial position having the groove between the first and second circumferential lands 214 and 216 open to the second line pressure port 204 and the groove between the second and third circumferential lands 216 and 218 open to both the throttle back-up pressure port 206 and the drain port 208 as indicated by the right half of the valve spool 212. The lands of the throttle back-up valve spool 212 have substantially equal cross sections except for the third circumferential land 218 which is slightly larger in cross section than the remaining lands 214 and 216. Between the second and third circumferential lands 216 and 218 of the valve spool 212 is therefore formed a differential pressure acting area so that, when there is a fluid pressure developed in the circumferential groove between these lands 216 and 218, the valve spool 212 is urged to move toward the second axial position thereof. As indicated by dotted lines, the valve spool 212 is further formed with a diametrical passageway which is open at both ends to the groove between the first and second circumferential lands 214 and 216 and an axial passageway leading from the diametrical passageway and open at the outer axial end of the first circumferential land 214 of the valve spool 212. When there is a fluid pressure developed in the groove between the first and second circumferential lands 214 and 216 of the valve spool 212 therefore, the fluid pressure is conducted through these diametrical and axial passageways in the valve spool 212 and acts on the outer end face of the first circumferential land 214 of the valve spool 212, urging the valve spool 212 to move toward the second axial position thereof. In the presence of a fluid pressure acting on the differential pressure acting area between the lands 216 and 218 of the valve spool 212, the valve spool 212 is urged to move toward the second axial position thereof by the sum of the force thus produced by the fluid pressure acting on the differential pressure acting area of the valve spool 212 and the force of the fluid pressure produced by the fluid pressure acting on the end face of the first circumferential land 214 of the valve spool 212. The force or the sum of the forces thus urging the valve spool 212 to move toward the second axial position thereof is opposed by the force of a preloaded compression spring 220 which is seated at one end on a wall surface defining one axial end of the valve chamber 200 and at the other end thereof on an internal end face formed in the third circumferential land 218 of the valve spool 212 as shown.

In the absence of a fluid pressure in any of the pressure ports 202, 204 and 206 of the throttle back-up valve 198, the valve spool 212 of the valve 198 is maintained in the first axial position by the force of the spring 220 so that the first line pressure port 202 is open to the groove between the first and second circumferential lands 214 and 216 and the second line pressure port 204 and the throttle back-up pressure port 206 are jointly open to the groove between the second and third circumferential lands 216 and 218 as indicated by the left half of the valve spool 212. If a fluid pressure is developed in the second line pressure port 204, the fluid pressure acts on the differential pressure acting area between the second and third circumferential lands 216 and 218 of the valve spool 212, which is therefore moved away from the first axial position closing the second line pressure port 204 by the second circumferential land 216 thereof. When the valve spool 212 is in this axial position, the third circumferential land 218 of the valve spool 212 forms a small clearance between the drain port 208 and the groove between the second and third circumferential lands 216 and 218, allowing fluid to leak from the back-up throttle pressure port 206 into the drain port 208 at a limited rate through such a clearance. In the throttle back-up pressure port 206 is therefore developed a fluid pressure which is lower than the line pressure Pl in the port 204 by the valve spool 212 attempting to stay in an equilibrium axial position in which the force resulting from the fluid pressure acting on the differential pressure acting area between the lands 216 and 218 is equally balanced with the force of the spring 220. The fluid pressure thus developed in the throttle back-up pressure port 206 of the throttle back-up valve 198 is herein referred to as throttle back-up pressure and is directed through a fluid pressure passageway 210 to the throttle back-up pressure port 170 of the transmission throttle valve 160. When the valve spool 212 of the throttle back-up valve 198 is held in the above mentioned equilibrium axial position establishing the throttle back-up pressure in the port 206 of the valve 198, the groove between the first and second circumferential lands 214 and 216 is open to the first line pressure port 202 of the throttle back-up valve 198. If a fluid pressure is developed in the first line pressure port 202, the fluid pressure is passed through the radial and axial passageways in the valve spool 212 and acts on the outer end face of the first circumferential land 214 of the valve spool 212. This causes the valve spool 212 to axially move into the second axial position thereof against the force of the spring 220. When the valve spool 212 is moved to the second axial position thereof, the first line pressure port 202 is closed by the first circumferential land 214 of the valve spool 212 and, in turn, the second line pressure port 204 is open to the groove between the first and second circumferential lands 214 and 216 and maintains the fluid pressure acting on the end face of the land 214. The valve spool 212 is held in the second axial position thereof until the second line pressure port 204 of the throttle back-up valve 198 is drained off. When the valve spool 212 is moved into the second axial position thereof, the throttle back-up pressure which has been developed in the throttle back-up port 206 of the throttle back-up valve 198 and accordingly in the throttle back-up pressure port 170 of the throttle valve 160 is discharged to the transmission oil reservoir 90 through the drain port 208 of the throttle back-up valve 198.

While the throttle pressure port 148 of the line pressure booster valve 146 is in constant and direct communication with the throttle pressure port 168 of the throttle valve 160 through the throttle pressure circuit 196, the throttle pressure port 108 of the pressure regulator valve 94 is communicable with the throttle pressure port 168 of the throttle valve 160 across a pressure modifier valve 222 which is shown below the throttle back-up valve 198.

The pressure modifier valve 222 is adapted to reduce and modify the line pressure Pl in response to a vehicle speed higher than a predetermined value and is provided in an elongated valve chamber 224 formed in the previously mentioned transmission control valve body. The valve chamber 224 is closed at both axial ends and has a throttle pressure inlet port 226 and a modified pressure outlet port 228 which are located between the axial ends of the valve chamber 224, a governor pressure port 230 located at one axial end of the valve chamber 224 and a drain port 232 located at the other axial end of the valve chamber 224. The throttle pressure inlet port 226 is in constant communication with the throttle pressure circuit 196, and the modified pressure outlet port 228 is in constant communication with the modified pressure port 108 of the pressure regulator valve 94 through a fluid passageway 234. The governor pressure port 230 communicates with the governor pressure circuit 274. Within the valve chamber 224 thus formed is mounted a valve spool 236 which is axially slidable in the valve chamber 224 between the axial ends of the chamber. The valve spool 236 has first and second circumferential lands 238 and 240 which are axially spaced apart from each other and which thus form therebetween a circumferential groove which is constantly open to the throttle pressure inlet port 226 irrespective of the axial position of the valve spool 236 within the valve chamber 224. The valve spool 236 is axially movable in the valve chamber 224 between a first axial position providing communication between the modified pressure outlet port 228 and the drain port 232 as indicated by the lower half of the valve spool 236, and a second axial position blocking the communication between the ports 228 and 232 and, in turn, providing communication between the throttle pressure inlet and modified pressure outlet ports 226 and 228 through the circumferential groove between the lands 238 and 240 as indicated by the upper half of the valve spool 236. The valve spool 236 is urged to move toward the first axial position thereof by means of a preloaded helical compression spring 242 which is seated at one end on a wall surface located at one axial end of the valve chamber 224 adjacent to the drain port 232 and at the other axial end on the outer end face of the second circumferential land 240 as shown. The first circumferential land 238 of the valve spool 236 is larger in cross sectional area than the second circumferential land 240 of the spool so that a differential pressure acting area is formed between the first and second circumferential lands 238 and 240 of the valve spool. When there is a fluid pressure developed in the groove between the first and second circumferential lands 238 and 240 of the valve spool 236, therefore, the valve spool 236 is urged to move toward the first axial position thereof not only by the force of the spring 242 but by a force produced by the fluid pressure thus acting on the differential pressure acting area of the valve spool 236. If a governor pressure Pg continuously variable with vehicle speed is developed in the governor pressure port 230 under these conditions as will be described later, the forces thus urging the valve spool 236 to move toward the first axial position of the spool are opposed by a force which is produced by the governor acting on the outer end face of the first circumferential land 238 and urging the valve spool 236 to move toward the second axial position thereof. In an attempt to assume an equilibrium axial position between the first and second axial position thereof, the valve spool 236 of the pressure modifier valve 222 is thus operative to develop in the modified pressure outlet port 228 a modified throttle pressure with which the force resulting from the governor pressure Pg acting on the first circumferential land 238 of the valve spool 236 is substantially equally balanced with the sum of the force of the spring 242 and the force produced by the modified throttle pressure acting on the differential pressure acting area between the first and second circumferential lands 238 240 of the valve spool 236. The modified throttle pressure thus appearing at the modified pressure outlet port 228 of the pressure modifier valve 222 is continuously variable not only with the throttle pressure Pt and accordingly the opening degree of the carburetor throttle valve but also with the governor pressure Pg and accordingly the road speed of the vehicle. The modified throttle pressure produced by the pressure modifier valve 222 in this manner is passed through the fluid passageway 234 to the modified throttle pressure port 108 of the pressure regulator valve 94 and serves to reduce the line pressure Pl depending upon a predetermined relationship between the road speed of the vehicle and the opening degree of the carburetor throttle valve. The above mentioned predetermined relationship is dictated by the force of the spring 242 and the differential between the respective cross sectional areas of the first and second circumferential lands 238 and 240 of the valve spool 236 of the pressure modifier valve 222. The fluid pressure to be developed in the governor pressure port 230 of the pressure modifier valve 222 above described is variable with the road speed of the vehicle and is developed by the transmission governor assembly 84 which is illustrated in FIG. 2B at a lower part of the drawing.

As previously noted, the transmission governor assembly 84 is mounted on the output shaft 64 (FIG. 1) of the power transmission mechanism and consists of the primary and secondary governor valves 86 and 86'. As is well known in the art, the primary governor valve 86 is a sort of "on-off" type valve and is adapted to be open when the revolution speed of the transmission output shaft is higher than a predetermined value, while the secondary governor valve 86' is a sort of proportioning valve which delivers an output pressure continuously variable with the revolution speed of the transmission secondary governor valves of these natures as well known in the art and may be readily modified by those skilled in the art, only important features of the constructions herein shown will be hereinafter described.

The primary and secondary governor valves 86 and 86' are built into a common valve body which is shown to be split into two valve body portions 244 and 244' having the primary and secondary governor valves 86 and 86', respectively, accommodated therein. The valve body portions 244 and 244' are usually mounted on the transmission output shaft in diametrically opposed relationship to each other across the center axis of the shaft, though not shown in the drawings. The valve body portion 244 for the primary governor valve 86 is formed with a valve chamber having fluid inlet and outlet ports 246 and 248. Within the valve chamber is provided a valve spool 250 axially slidable in the valve chamber and having first and second circumferential lands 252 and 254 which are axially spaced apart from each other and which form therebetween a circumferential groove which is constantly open to the fluid inlet port 246. The valve spool 250 is urged to move toward the transmission output shaft by a preloaded compression spring 256. When the transmission output shaft is held at rest, the valve spool 250 is maintained in an axial position closest to the transmission output shaft by the force of the spring 256 so that the fluid outlet port 248 is closed by the second circumferential land 254 of the valve spool 250, as indicated by the lower half of the valve spool 250. On the other hand, the valve body portion 244' for the secondary governor valve 86' is formed with a valve chamber having not only fluid inlet and outlet ports 258 and 260 but a drain port 262. Within the valve chamber is provided a weighted valve spool 264 axially slidable in the valve chamber and having a first circumferential land 266 and a second circumferential land 268. The lands 266 and 268 are axially spaced from each other and have formed therebetween a circumferential groove which is open to the fluid inlet port 258 or the fluid outlet port 260 depending upon the axial position of the valve spool 264 within the valve chamber. The valve spool 264 is urged to move away from the transmission output shaft by a preloaded compression spring 270. The second circumferential land 268 is larger in cross sectional area than the first circumferential land 266 so that a differential pressure acting area is formed between the lands 266 and 268. The fluid outlet port 260 of the secondary governor valve 86' is in constant communication with the fluid inlet port 246 of the primary governor valve 86 through a passageway 272 formed in the governor valve body constructed by the valve body portions 244 and 244'. In the fluid inlet port 258 of the secondary governor valve 86' is developed the line pressure Rl when the transmission gear shift lever is in the automatic or manual forward drive range position "D", "2" or "1" as will be described later. When the transmission output shaft is held at rest with the engine also held at rest, there is no fluid pressure developed in the fluid inlet port 258 of the secondary governor valve 86' so that the valve spool 264 of the secondary governor valve 86' is held in an axial position remotest from the transmission output shaft by the force of the spring 270 as indicated by the lower half of the valve 86'. When valve spool 264 is held in this axial position, the fluid inlet port 258 is open to the circumferential groove between the lands 266 and 268 and the fluid outlet port 260 and the drain port 262 are closed by the second circumferential land 268 of the spool 264.

When the engine is started under these conditions and thereafter the transmission gear shift lever is moved to any of the above mentioned positions, the line pressure Pl developed by the pressure regulator valve 94 is introduced by way of the forward drive clutch actuating fluid circuit 298 into the fluid inlet port 258 of the secondary governor valve 86' and acts on the differential pressure acting area between the lands 266 and 268 of the valve spool 264. The valve spool 264 of the secondary governor valve 86' is therefore urged to move toward the transmission output shaft against the force of the spring 270 with the result that the valve spool 264 is maintained in an axial position in which the groove between the lands 266 and 268 is located to be open to the fluid outlet port 260 as indicated by the upper half of the governor valve 86', with the force of the spring 270 equally balanced by the force produced by the fluid pressure acting on the differential pressure acting area of the valve spool 264. When the transmission output shaft is being driven for rotation about the center axis thereof, the force thus urging the valve spool 264 to move toward the transmission output shaft is opposed not only by the force of the spring 270 but a centrifugal force created in the weighted valve spool 264 accommodated in the valve body portion 244' revolving with the shaft. The valve spool 264 is therefore moved within the valve chamber in an attempt to assume as equilibrium axial position in which the fluid pressure acting on the differential pressure acting area of the spool 264 is equalized with the sum of the force of the spring 270 and the centrifugal force exerted on the valve spool 264. A fluid pressure varying with the centrifugal force produced in the valve spool 264 and accordingly with the angular velocity of the transmission output shaft about the center axis thereof is in this fashion developed in the fluid outlet port 260 of the secondary governor valve 86'. The fluid pressure thus developed by the secondary governor valve 86' is referred to as governor pressure and is herein denoted by Pg. The governor pressure Pg is continuously variable with the revolution speed of the transmission output shaft and accordingly with the road speed of the vehicle. When the transmission output shaft is being rotated about the center axis thereof, a centrifugal force is also produced in the weighted valve spool 250 of the primary governor valve 86 and urges the valve spool 250 to move radially away from the transmission output shaft against the force of the spring 256. Until the revolution speed of the transmission output shaft reaches a predetermined value, however, the centrifugal force thus exerted on the primary governor valve spool 250 is overcome by the force of the spring 256 so that the valve spool 250 is maintained in situ within the valve body portion 244 revolving with the transmission output shaft. Under these conditions, the governor pressure Pg directed from the fluid outlet port 260 of the secondary governor valve 86' to the fluid inlet port 246 of the primary governor valve 86 through the passageway 272 is precluded from being passed to the fluid outlet port 248 of the primary governor valve 86 by the second circumferential land 254 of the primary governor valve spool 250 closing the port 248. When the above mentioned predetermined value is reached by the revolution speed of the transmission output shaft, the force of the spring 256 of the primary governor valve 86 is overcome by the centrifugal force exerted on the valve spool 250 and allows the valve spool 250 to move radially away from the transmission output shaft. Communication is now established between the fluid inlet and outlet ports 246 and 248 of the primary and secondary governor valves 86 and 86' through the circumferential groove between the lands 252 and 254 of the valve spool 250, with the result that the governor pressure Pg which has been developed in the fluid inlet port 246 is allowed into the fluid outlet port 248 of the primary governor valve 86. The primary governor valve 86 is thus operative to pass the governor pressure Pg therethrough when the governor pressure Pg is higher than the predetermined value. The governor pressure Pg delivered from the fluid outlet port 248 of the primary governor valve 86 is distributed by way of a governor pressure circuit 274 to transmission gear shift valves incorporated into the hydraulic control system.

The transmission gear shift valves provided in the hydraulic control system herein shown comprises a first-second gear shift valve 276 for automatically controlling shifts between the first and second forward drive gear positions in the automatic forward drive range "D" or in the manual first forward drive range "1". The first-second gear shift valve 276 is provided in an elongated valve chamber 278 formed in the previously mentioned transmission control valve body and closed at both axial ends thereof. The valve chamber 278 has a governor pressure port 280, first line pressure inlet and outlet ports 282 and 284, second line pressure inlet and outlet ports 286 and 288, a line pressure feedback port 290, a first-gear trigger port 292, a first-gear holding port 294, and a drain port 296. The governor pressure port 280 and the line pressure feedback port 290 are located at the opposite axial ends, respectively, of the valve chamber 278. The first-gear trigger and holding ports 292 and 294 are located next to the governor pressure port 280 with the port 294 located between the other two, and the second line pressure inlet and outlet ports 286 and 288 are located next to the feedback port 290 with the port 286 located between the other two. The first line pressure inlet and outlet ports 282 and 284 are located next to the first-gear trigger port 292 and the second line pressure outlet port 288, respectively, with the drain port 296 located between the first and second line pressure outlet ports 284 and 288 as shown. The governor pressure port 280 is in constant communication with the governor pressure circuit 278. The second line pressure inlet port 286 is in constant communication with a forward drive clutch actuating fluid circuit 298 leading from the third fluid outlet port 426 of the gear position selector valve 414 to the fluid chamber for the forward drive clutch 42. The first line pressure outlet port 284 and the line pressure feedback port 290 are jointly in constant communication with the fluid chamber for the low-and-reverse brake 68 through a brake actuating fluid circuit 300.

Within the valve chamber 278 of the first-second gear shift valve 276 is mounted a valve spool 302 which is axially movable in the valve chamber and which is formed with first, second, third fourth and fifth circumferential lands 304, 306, 308, 310 and 312. The lands 304, 306, 308, 310 and 312 are axially spaced apart from each other with the first and fifth circumferential lands 304 and 312 located to the opposite axial ends of the valve spool 302 and thus form a circumferential groove between every adjacent two of the lands. The groove between the second and third circumferential lands 306 and 308 and the groove between the third and fourth circumferential lands 308 and 310 are constantly open to the first and second line pressure outlet ports 284 and 288, respectively, irrespective of the axial position of the valve spool 302 within the valve chamber 278. The valve spool 302 thus configured is movable within the valve chamber 278 between a first axial position closing the first control port 292 by the second circumferential land 306 and providing communication between the first line pressure inlet and outlet ports 282 and 284 through the groove between the second and third circumferential lands 306 and 308 and communication between the second line pressure outlet port 288 and the drain port 296 through the groove between the third and fourth circumferential lands 308 and 310 as indicated by the lower half of the valve spool 302, and a second axial position closing the second control port 294 by the first circumferential land 304 and providing communication between the first line pressure outlet port 284 and the drain port 296 and communication between the second line pressure inlet and outlet ports 286 and 288 as indicated by the upper half of the valve spool 302. When the valve spool 302 is in the first axial position thereof, the groove between the fourth and fifth circumferential lands 310 and 312 of the valve spool is open to the second line pressure inlet port 286.

The second, third and fourth circumferential lands 306, 308 and 310 have substantially equal cross sectional areas which are smaller than the first circumferential land 304 and larger than the fifth circumferential land 312. Differential pressure acting areas are thus formed between the first and second circumferential lands 304 and 306 and between the fourth and fifth circumferential lands 310 and 312. The valve spool 302 thus constructed is urged to move toward the first axial position thereof by means of a preloaded helical compression spring 314 which is seated at one end of a wall surface at one axial end of the valve chamber 278 and at the other end on an internal end face formed in the valve spool 302.

When the vehicle is at a halt with the transmission output shaft held at rest or being driven rearwardly with the reverse drive gear position "R" selected, there is no fluid pressure developed in the governor pressure port 280. Under these conditions, the valve spool 302 of the first-second gear shift valve 276 is maintained in the first axial position thereof by the force of the spring 314 in the absence of a fluid pressure in the governor pressure port 280. If, in this instance, the transmission gear shift lever is in the parking or reverse drive gear position "P" or "R", there is a line pressure Pl developed in the first-gear holding port 294 and, through the first line pressure inlet and outlet ports 282 and 284, in the line pressure feedback port 290 so that the force of the spring 314 holding the valve spool 302 in the first axial position thereof is reinforced by the force resulting from the line pressure developed in the line pressure feedback port 290 and the force produced by the line pressure acting on the differential pressure acting area between the first and second circumferential lands 304 and 306 of the valve spool 302 from the first-gear holding port 294.

When the transmission gear shift lever is then moved to the automatic forward drive range position "D" and the vehicle is started, the line pressure which has been developed in the line pressure feedback port 290 is discharged through the low-and-reverse brake actuating fluid circuit 300 and, in turn, the line pressure is developed in the second line pressure inlet port 286 through the forward drive clutch actuating fluid circuit 298. The line pressure which has been developed in the first-gear holding port 294 is replaced with a fluid pressure which is lower than the line pressure Pl. Under these conditions, the valve spool 302 is urged to hold the first axial position not only by the force of the spring 314 but by the sum of the force resulting from the line pressure acting on the differential pressure acting area between the fourth and fifth circumferential lands 310 and 312 and the force resulting from the fluid pressure acting on the differential pressure acting area between the first and second circumferential lands 304 and 306. The forces thus urging the valve spool 302 to stay in the first axial position thereof is opposed by a force which is produced by the governor pressure Pg developed in the governor pressure port 280 and acting on the outer end face of the first circumferential land 304 of the valve spool 302 with the transmission output shaft being driven for rotation in the forward direction. Until the vehicle speed reaches a certain value, however, the force thus produced by the governor pressure acting on the valve spool 302 is overcome by the opposing forces being exerted on the spool as above described so that the valve spool 302 is held in situ. When the vehicle speed increases beyond such a value, the force resulting from the governor pressure Pg acting on the end face of the land 304 overcomes the opposing forces and causes the valve spool 302 to move toward the second axial position thereof as the governor pressure increases with the vehicle speed. When the valve spool 302 is thus axially displaced away from the first axial position thereof, the groove between the fourth and fifth circumferential lands 310 and 312 of the valve spool 302 is isolated from the second line pressure inlet port 286 by the fourth circumferential land 310, which accordingly cuts off the line pressure which has been acting on the differential pressure acting area between the fourth and fifth circumferential lands 310 and 312 of the valve spool 302. Only the force of the spring 314 and the force resulting from the fluid pressure acting on the differential pressure acting area between the first and second circumferential lands 304 and 306 oppose the force resulting from the governor pressure acting on the end face of the first circumferential land 304 and, therefore, allows the valve spool 302 to move at a stroke into the second axial position thereof. The valve spool 302 being thus moved to the second axial position thereof, communication is provided between the second line pressure inlet and outlet ports 286 and 288 through the groove between the third and fourth circumferential lands 308 and 310 of the valve spool 302 with the result that the line pressure Pl which has been introduced into the second line pressure inlet port 286 through the forward drive clutch actuating fluid circuit 298 is passed to the second line pressure outlet port 288.

The line pressure Pl admitted to the port 288 of the first-second gear shift valve 276 is directed to the brake-apply fluid chamber 76 of the servo unit 74 for the brake band 72 through a second-gear position lock valve 316 which is adapted to hold the brake band 72 applied when the manual forward drive range "2" is selected. The second-gear position lock valve 316 comprises an elongated valve chamber 318 formed in the transmission control valve body. The valve chamber 318 has a control port 320, first and second line pressure inlet ports 322 and 324, and a line pressure outlet port 326. The control port 320 is open at an open axial end of the valve chamber 318, and the second line pressure inlet port 324 is open adjacent to the other axial end of the valve chamber 318. The first line pressure inlet port 322 and the line pressure outlet port 326 are located intermediate between and respectively closer to these ports 320 and 324 as shown. The first line pressure inlet port 322 is in communication with the second line pressure outlet port 288 of the above described first-second gear shift valve 276 through a fluid passageway 328. The line pressure outlet port 326 of the second-gear position lock valve 316 is in constant communication with the brake-apply fluid chamber 76 of the band servo unit 74 of the brake band 72 through a band actuating fluid circuit 330. On the other hand, the control port 320 of the second-gear position lock valve 316 is in constant communication with the gear position selector valve 414 through a fluid passageway 458 as shown.

Within the valve chamber 318 thus formed is mounted a valve spool 332 which is axially slidable in the valve chamber 318 and which has first, second and third circumferential lands 334, 336 and 338 arranged in this sequence away from the first control port 320. The lands 334, 336 and 338 of the valve spool 332 are axially spaced apart from each other and thus form circumferential grooves therebetween. The groove between the first and second circumferential lands 334 and 336 is constantly open to the line pressure inlet 322 irrespective of the axial position of the valve spool 332 and is permitted to be open to the line pressure outlet port 326 depending upon the axial position of the valve spool 332 within the valve chamber 318. On the other hand, the groove between the second and third circumferential lands 336 and 338 is constantly open to the second line pressure inlet port 324 irrespective of the axial position of the valve spool 332 within the valve chamber 318 and is permitted to be open to the line pressure outlet port 326 depending upon the axial position of the valve spool 332 within the valve chamber 318. The valve spool 332 is thus movable within the valve chamber 318 between a first axial position providing communication between the first line pressure inlet port 322 and the line pressure outlet port 326 through the groove between the first and second circumferential lands 334 and 336 and having the groove between the second and third circumferential lands 336 and 338 open to the second line pressure inlet port 324 but isolated from the line pressure outlet port 326 as indicated by the right half of the valve spool 332, and a second axial position providing communication between the second line pressure inlet port 324 and the line pressure outlet port 326 through the groove between the second and third circumferential lands 336 and 338 and having the groove between the first and second circumferential lands 334 and 336 open to the first line pressure inlet port 322 but isolated from the line pressure outlet port 326 as indicated by the left half of the valve spool 332. The valve spool 332 is urged to move within the valve chamber 318 toward the first axial position thereof by means of a preloaded helical compression spring 340 which is shown seated at one end on a wall surface at one axial end of the valve chamber 318 and at the other end thereof on an internal end face formed in the valve spool 332. The first and second circumferential lands 334 and 336 of the valve spool 332 are substantially equal in cross sectional area to each other but are larger in cross sectional area than the third circumferential land 338 so that there is a differential pressure acting area formed between the second and third circumferential lands 336 and 338 of the valve spool 332.

In each of the ports 320, 322, 324 and 326 thus arranged of the second-gear position lock valve 316 is to be developed a line pressure Pl under predetermined conditions. In the absence of a fluid pressure in each of these ports 320, 322, 324 and 326, particularly in the second line pressure inlet port 324, the valve spool 326 is held in the first axial position thereof by the force of the spring 340. When there is a line pressure developed in the second line pressure inlet port 324 in the absence of a fluid pressure in the control port 320, the force of the spring 340 urging the valve spool 332 to move toward the first axial position thereof is overcome by the force resulting from the line pressure acting on the differential pressure acting area between the second and third circumferential lands 336 and 338 of the valve spool 332 and allows the valve spool 332 to move into the second axial position thereof. When the valve spool 332 is thus moved into the second axial position thereof, communication is provided between the first line pressure inlet port 322 and the line pressure outlet port 326 so that, if there is a line pressure developed in the first line pressure inlet port 322 under this condition, the line pressure is passed over to the band actuating fluid circuit 330 through the line pressure outlet port 326 of the second-gear position lock valve 316. Under conditions in which the line pressure is developed in the control port 320 as well as the second line pressure inlet port 324, the force urging the valve spool 332 to move toward the second axial position thereof is opposed not only by the force of the spring 340 but by the force resulting from the line pressure thus developed in the control port 320 and is therefore overcome by the sum of the opposing forces. The valve spool 332 is now moved back from the second axial position into the first axial position thereof and provides communication between the first line pressure inlet port 322 and the line pressure outlet port 326. If, under these conditions, the line pressure is present in the second line pressure outlet port 288 of the first-second gear shift valve 276 as previously described, the line pressure is directed through the fluid passageway 328 to the first line pressure inlet port 322 of the first-gear position lock valve 316 and is passed through the line pressure outlet port 326 of the lock valve 316 to the band actuating fluid circuit 330.

The transmission gear shift valves of the hydraulic control system embodying the present invention further comprise a second-third gear shift valve 342 which is arranged in series with a pressure modulator valve 344 cooperative with the gear shift valve 342. The second-third gear shift valve 342 and the pressure modulator valve 344 are provided in a common elongated valve chamber 346 which is formed in the previously mentioned transmission control valve body and which is closed at both axial ends. The valve chamber 346 has for the second-third gear shift valve 342 a governor pressure port 348, first and second line pressure inlet ports 350 and 352, a line pressure outlet port 356, a second-gear holding port 354, and a downshift port 358 and, for the pressure modulator valve 344, a throttle pressure inlet port 360, first and second throttle pressure relief ports 362 and 364, and a control port 366. The governor pressure port 348 for the second-third gear shift valve 342 is located adjacent to one closed axial end of the valve chamber 346 and the throttle pressure inlet port 360 for the pressure modulator valve 344 is located adjacent to the other closed axial end of the valve chamber 346. The second-gear holding port 354 and the first and second line pressure inlet ports 350 and 352 are arranged in this sequence away from the governor pressure ports 348 with the line pressure outlet port 354 located intermediate between the line pressure inlet ports 350 and 352 and with the downshift port 358 located intermediate between the second-gear holding port 354 and the governor pressure port 348 as shown. The first throttle pressure relief port 362 for the pressure modulator valve 344 is located between the throttle pressure inlet port 360 and the control port 366 for the pressure modulator valve 344, while the second throttle pressure relief port 364 is located axially between the control port 366 for the pressure modulator valve 344 and the second line pressure inlet port 352 for the second-third gear shift valve 342. The governor pressure port 348 for the second-third gear shift valve 342 is in constant communication with the previously described governor pressure circuit 274. The first line pressure inlet port 350 of the second-third gear shift valve 342 is in constant communication through a fluid circuit 368 with the line pressure port 150 of the line pressure booster valve 146. The line pressure outlet port 356 of the second-third gear shift valve 342 is in constant communication with the brake-release fluid chamber 76′ of the band servo unit 74 through a band releasing and high-and-reverse clutch actuating fluid circuit 370 having an orifice 372 incorporated therein. The orifice 372 is located in the fluid circuit 370 so that a flow of fluid directed toward or away from the fluid chamber of the high-and-reverse clutch 40 is passed through the orifice 372 but a flow of fluid to be directed toward or away from the brake-release fluid chamber 76′ of the band servo unit 74 is not passed through the orifice 372 as will be described in more detail. On the other hand, the throttle pressure port 360 of the pressure modulator valve 344 is in constant communication with the throttle pressure circuit 196 leading from the port 168 of the previously described transmission throttle valve 180. The first and second throttle pressure relief ports 362 and 364 of the pressure modulator valve 344 are in communication with each other and further communicate jointly through a fluid passageway 375 with the first-gear holding port 294 of the first-second gear shift valve 276 as shown.

Within the valve chamber 346 thus formed is slidably mounted a valve spool 376 which forms part of the second-third gear shift valve 342 and which is axially movable in the valve chamber 346. The valve spool 376 is formed with first, second, third and fourth circumferential lands 378, 380, 382 and 384 which are arranged in this sequence away from the governor pressure port 348. The lands 378, 380, 382 and 384 are axially spaced apart from each other with the first and fourth circumferential lands 378 and 384 located at the opposite axial ends of the spool 376 and have a circumferential groove formed between every adjacent two of the lands. The groove between the first and second circumferential lands 378 and 380 is constantly open to the drain port 358 irrespective of the axial position of the valve spool 376 within the valve chamber 346. The groove between the second and third circumferential lands 380 and 382 is open to the first line pressure inlet port 350 or the second-gear holding port 356 depending upon the axial position of the valve spool 376 within the valve chamber 346. The groove between the third and fourth circumferential lands 382 and 384 is open to both of the first line pressure inlet port 350 and the line pressure outlet port 354 or to both of the second line pressure inlet port 352 and the line pressure outlet port 354 depending upon the axial position of the valve spool 376 within the valve chamber 346. The valve spool 376 of the second-third gear shift valve 342 is, thus, movable within the valve chamber 346 between a first axial position having the groove between the second and third circumferential lands 380 and 382 open to the second-gear holding port 356 and providing communication between the first line pressure inlet port 350 and the line pressure outlet port 354 through the groove between the third and fourth circumferential lands 382 and 384 as indicated by the lower half of the valve spool 376, and a second axial position having the groove between the second and third circumferential lands 380 and 382 open to the second-gear holding port 356 and providing communication between the second line pressure inlet port 352 and the line pressure outlet port 354 through the groove between the third and fourth circumferential lands 382 and 384 of the valve spool 376 as indicated by the upper half of the valve spool 376. The second-gear holding port 356 is closed by the second circumferential land 380 of the valve spool 376 when the valve spool 376 is in the second axial position thereof, and the second line pressure inlet port 352 is closed by the fourth circumferential land 384 when the valve spool 376 is in the first axial position thereof. The first, second and third circumferential lands 378, 380 and 382 are larger in cross section in this sequence and the fourth circumferential land 384 is substantially equal in cross section to the third circumferential land 382, as shown. A differential pressure acting area is thus formed between the second and third circumferential lands 380 and 382. A differential pressure acting area is also provided between the first and second circumferential lands 378 and 380 but such an area is not acted upon by a fluid pressure because the groove between the lands 378 and 380 is constantly open to the drain port 358 as above noted. The fourth circumferential land 384 of the valve spool 376 is formed with a bore which is open at the outer axial end of the land 384 and closed by an internal end face in the land 384.

On the other hand, the pressure modulator valve 344 comprises a valve plunger 386 which is axially slidable within the valve chamber 346 and which has one axial end adjacent to the throttle pressure inlet port 360. The valve plunger 386 has an outer axial extension 388 axially projecting opposite to the valve spool 376 of the second-third gear shift valve 342 and an inner axial extension 390 axially projecting into the above mentioned bore in the fourth circumferential land 384 of the valve spool 376 of the second-third gear shift valve 342. The outer axial extension 388 of the valve plunger 386 is engageable at its leading end with a closed wall surface of the valve chamber 346 adjacent to the throttle pressure inlet port 360 for the pressure modulator valve 344, while the inner axial extension 390 of the valve plunger 386 is engageable at its leading end with the internal end face in the fourth circumferential land 384 of the second-third gear shift valve spool 376. The valve plunger 386 thus formed with the outer and inner axial extensions 388 and 390 has axially outer and inner circumferential edges. The valve plunger 386 thus constructed is axially movable within the valve chamber 346 between a limit axial position having the outer axial extension 388 bearing at its leading end against the above mentioned closed end wall surface of the valve chamber 346 as indicated by the upper half of the valve plunger 386, and an equilibrium axial position displaced a certain distance away from the closed end wall surface of the valve chamber 346 as indicated by the lower half of the valve plunger 386. The valve plunger 386, the first throttle pressure relief port 362 and the control port 366 of the pressure modulator valve 344 are arranged so that, when the valve plunger 386 is in the above mentioned equilibrium axial position thereof, there are established along the axially outer and inner circumferential edges of the valve spool 386 a slight clearance between the throttle pressure inlet port 360 and the first throttle pressure relief port 362 and a clearance between the control port 366 and the space between the valve plunger 386 and the valve spool 376 of the second-third gear shift valve 342.

The valve spool 376 of the second-third gear shift valve 342 and the valve plunger 386 of the pressure modulator valve 344 thus constructed and arranged are urged to be axially spaced apart from each other within the valve chamber 346 by means of a preloaded helical compression spring 392 which is seated at one end on the internal end face within the fourth land 384 of the valve spool 376 and at the other end on the annular face of the valve plunger 386 forming the above mentioned axially inner circumferential edge.

When the vehicle is at a halt with the transmission output shaft held at rest or being driven rearwardly with the reverse drive gear position "R" selected in the transmission system, there is no fluid pressure developed in the governor pressure port 348 of the second-third gear shift valve 342. The valve spool 376 of the second-third gear shift valve 342 is therefore maintained in the first axial position thereof by the force of the spring 392. If, under these conditions, a fluid pressure is developed in the throttle pressure inlet port 360, a force is exerted on the valve plunger 386 of the modulator valve 344 by the fluid pressure in the throttle pressure port 360 and urges the valve plunger 386 to move away from the above mentioned limit position thereof toward the valve spool 376 of the second-third gear shift valve 342. If such a force is smaller than the force of the spring 392 and the control port 366 is held in a condition drained off, the valve plunger 386 of the modulator valve 344 is moved away from the limit position thereof to a certain axial position having the axially outer circumferential edge of the plunger located past the first throttle pressure relief port 362 and thereby allowing the throttle pressure inlet port 360 to be open to the first throttle pressure relief port 362. The fluid in the throttle pressure inlet port 360 is therefore admitted through the first and second throttle pressure relief ports 362 and 364 into an open space between the valve plunger 386 and the valve spool 376 of the second-third gear shift valve 342. The first throttle pressure relief port 362 being fully open, the control port 366 is fully closed by the valve plunger 386 so that there is developed a fluid pressure in the space and, in cooperation with the spring 392, urges the valve plunger 386 to move back toward the initial limit axial position thereof. When the valve plunger 386 thus moved back toward the initial limit axial position thereof reaches another certain position, the first throttle pressure relief port 362 is fully closed and, in turn, there is a clearance formed between the control port 366 and the space between the valve spool and plunger 376 and 386 past the axially inner circumferential edge of the valve plunger 386 with the result that the fluid pressure which has been developed in the space between the valve spool and plunger 376 and 386 is discharged through the control port 366 in the drained condition. The fluid pressure in the throttle pressure inlet port 360 will for a second time force the valve plunger 386 to move away from the limit axial position thereof for forming a clearance between the throttle pressure inlet port 360 and the first throttle pressure relief port 362 past the axially outer circumferential edge of the valve plunger 386. In this fashion, the valve plunger 386 of the pressure modulator valve 344 attempts to remain stable in the previously mentioned equilibrium axial position maintaining a slight clearance between the throttle pressure inlet port 360 and the first throttle pressure relief port 362 and a clearance between the control port 366 and the space between the valve spool and plunger 376 and 386. The fluid pressure admitted from the throttle pressure inlet port 360 into space between the valve spool and plunger 376 and 386 through the first and second throttle pressure relief ports 362 and 364 is partially discharged through the clearance formed at the control port 360 and as a consequence there is developed in the space between the valve spool and plunger 376 and 386 a fluid pressure which is lower than the fluid pressure in the throttle pressure inlet port 360 by a substantially fixed value which is dictated by the force of the spring 392.

The fluid pressure developed between the valve spool 376 of the second-third gear shift valve 342 and the valve plunger 386 of the pressure modulator valve 344 by the action of the pressure modulator valve 344 when the valve spool 376 of the gear shift valve 342 is in the first axial position thereof as above described is, thus, continuously variable with and lower by a predetermined value than the throttle pressure Pt developed in the throttle pressure inlet port 360. The "modulated" throttle pressure developed between the second-third gear shift valve 342 and the pressure modulator valve 344 acts not only on the valve plunger 386 of the pressure modulator valve 344 but on the valve spool 376 of the gear shift valve 342 so that the valve spool 376 is urged to stay in the first axial position thereof not only by the force of the spring 392 but by the force resulting from the modulated throttle pressure acting thereon.

When, under these conditions, the transmission gear shift lever is moved to the automatic drive range position "D" and the vehicle is started, the governor pressure Pg developed in the governor pressure circuit 274 increases as the vehicle speed increases with the accelerator pedal depressed. When the vehicle speed reaches a first predetermined value, the governor pressure Pg causes the first-second gear shift valve 276 to move into the second axial position effecting in the transmission mechanism shown in FIG. 1 an upshift from the first gear ratio ($D_1$) to the second gear ratio ($D_2$) in the automatic forward drive range (D) of the transmission system.

When any of the forward drive gear-ratio conditions is established in the transmission system, a line pressure Pl is developed in the second line pressure inlet port 352 and accordingly the line pressure outlet port 354 of the second-third gear shift valve 342 as will be described in more detail. The line pressure thus developed in the second line pressure inlet port 352 of the second-third gear shift valve 342 acts on the differential pressure acting area between the second and third circumferential lands 380 and 382 of the valve spool 376 of the gear shift valve 342 with the result that the valve spool 376 is urged to stay in the first axial position thereof not only by the force of the spring 392 and the force produced by the modulated throttle pressure as above described but by the force resulting from the line pressure Pl thus acting on the differential pressure acting area of the valve spool 376. The governor pressure Pg urging the valve spool 376 of the second-third gear shift valve 342 from the governor pressure port 348 of the valve 342 at the point of time when the valve spool 302 of the first-second gear shift valve 276 is moved into the second position thereof is therefore overcome by the sum of the opposing forces exerted by the spring 392, the line pressure in the second line pressure inlet port 352 and modulated throttle pressure developed between the second-third gear shift valve 342 and the pressure modulator valve 344.

When the vehicle speed increasing with the accelerator pedal kept depressed reaches a second predetermined value, the force resulting from the governor pressure Pg acting on the valve spool 376 of the second-third gear shift valve 342 overcomes the opposing forces being exerted on the valve spool 376, which is accordingly caused to move away from the first axial position thereof against such opposing forces. At a point of time when the valve spool 376 thus moved toward the second axial position reaches an axial position closing the second-gear holding port 356 by the second circumferential land 380 of the spool 376, the force resulting from the line pressure which has been acting on the differential pressure acting area between its second and third circumferential lands 380 and 382 from the port 350 is eliminated. The governor pressure Pg acting on the valve spool 376 of the second-third gear shift valve 342 is now opposed only by the force of the spring 392 and the modulated throttle pressure which is present between the valve spool 376 of the second-third gear shift valve 342 and the valve plunger 386 of the pressure modulator valve 344. The valve spool 376 of the second-third gear shift valve 342 is therefore moved at a stroke into the second axial position thereof upon movement of the valve spool 376 to the above mentioned axial position closing the second-gear holding port 356 of the gear shift valve 342. The valve spool 376 of the second-third gear shift valve 342 being thus moved into the second axial position thereof, there is provided communication between the second line pressure inlet and outlet ports 352 and 354 of the gear shift valve 342 so that the line pressure Pl which has been developed in the line pressure inlet port 352 is passed to the line pressure outlet port 354 through the groove between the third and fourth circumferential lands 382 and 384 of the valve spool 376, thereby effecting in the transmission mechanism shown in FIG. 1 an upshift from the second gear ratio ($D_2$) to the third gear ratio ($D_3$) in the automatic forward drive range "D". When the valve spool 376 of the second-third gear shift valve 342 is in these manners moved to the second axial position thereof, the valve plunger 386 of the pressure modulator valve 344 is forcibly moved back to the first axial position thereof with the inner axial extension 390 bearing at its leading end against the internal end face in the valve spool 376 of the second-third gear shift valve 342 and with the outer axial extension 388 bearing at its end against the end wall surface of the valve chamber 346 adjacent to the throttle pressure port 360 of the pressure modulator valve 344. With the valve plunger 386 of the pressure modulator valve 344 thus held in the second axial position thereof, the first throttle pressure relief port 362 is completely closed by the valve plunger 386 and at the same time the control port 366 is kept open, establishing communication between the second throttle pressure relief port 364 and the control port 366. If, in this instance, the control port 36 is in a condition drained off, the modulated throttle pressure which has been present between the second-third gear shift valve 342 and the pressure modulator valve 344 is now discharged through the control port 366. Under these conditions, the governor pressure Pg acting on the valve spool 376 of the second-third gear shift valve 342 is opposed only by the throttle pressure Pt acting on the valve plunger 386 of the pressure modulator valve 344 so that the valve spool 376 of the second-third gear shift valve 342 is permitted to move back to the first axial position thereof when the governor pressure Pg is reduced to a level which is lower than the value at which the value spool 376 has been initiated into motion to move from the first axial position to the second axial position thereof. This means that a downshift from the third gear ratio ($D_3$) to the second gear ratio ($D_2$) in the automatic forward drive range "D" occurs at a vehicle speed lower than the vehicle speed at which an upshift is to be made from the second gear ratio ($D_2$) to the third gear ratio ($D_3$) in the automatic forward drive range "D" if the throttle pressure Pt and accordingly the opening degree of the carburetor throttle valve are kept unchanged. More precisely, an upshift between the second and third gear ratios in the automatic forward drive range takes place when the vehicle speed is increased and/or the opening degree of the carburetor throttle valve is reduced with respect to a first predetermined relationship between the vehicle speed and the carburetor throttle valve opening degree, while a downshift therebetween is effected when the vehicle speed is reduced and/or the opening degree of the carburetor throttle valve is increased with respect to a second predetermined relationship between the vehicle speed and the carburetor throttle valve opening degree. The first predetermined relationship above mentioned is dictated by the force of the spring 392 and the ratios between the first, second, third and fourth circumferential lands 378, 380, 382 and 384 of the valve spool 376 of the gear shift valve 342 and the cross sectional area of the valve spool 376 of the pressure modulator valve 344, while the second predetermined relationship above mentioned is dictated simply by the ratio between the cross sectional area of the first circumferential land 378 of the gear shift valve spool 376 and the cross sectional area of the pressure modulator valve plunger 386 in the absence of a fluid pressure in the first line pressure inlet port 350 of the gear shift valve 342 under forward drive gear conditions of the transmission system. As will be discussed later, a fluid pressure (line pressure) is to be developed in this port 350 of the valve 342 only under a reverse drive gear condition of the transmission system.

The control port 366 of the pressure modulator valve 344 is used not only for the purpose of releasing an excess of throttle pressure therethrough when the second-third gear shift valve 342 is in the second gear ratio condition and discharging the modulated throttle pressure therethrough when the gear shift valve 342 is in the third gear ratio condition as above described but for the purpose of forcibly moving the valve spool 376 of the second-third gear shift valve 342 back to the first axial position and accordingly making a forced downshift from the third ratio to the second gear ratio in the automatic forward drive range when the accelerator pedal is depressed throughout its distance of stroke as will be discussed in more detail. A similar function is obtainable in the first-second gear shift valve 276. In the case of the first-second gear shift valve 276, a line pressure Pl is developed in the first-gear trigger port 292 when the accelerator pedal is depressed all the way down. If the valve spool 302 of the first-second gear shift valve 276 is in the second axial position thereof when the line pressure is thus introduced into the port 292, the line pressure acts on the differential pressure acting area between the first and second circumferential lands 304 and 306 of the valve spool 302, which is therefore forced to move from the second axial position to the first axial position thereof even though the governor pressure Pg opposing such movement of the valve spool 302 may be at a considerably high level.

In order to cope with kickdown conditions which are to be brought about when the accelerator pedal is fully depressed, the hydraulic control system shown in FIG. 2 further includes a solenoid operated kickdown valve 394 comprising an elongated valve chamber 396 which is formed in the body structure of the transmission control valve assembly. The valve chamber 396 is closed at one axial end and closed at the other and has first, second and third line pressure ports 398, 400 and 402 arranged in this sequence away from the open axial end of the valve chamber 396 as shown. The second line pressure port 400 is in constant communication with the above mentioned first gear trigger port 292 and line pressure port and 366 of the first-second and second-third gear shift valves 276 and 342, respectively, through the previously mentioned fluid circuit 374 joining the ports 288 and 366, while the third line pressure port 402 of the kickdown valve 394 is in constant communication with the line pressure circuit 130. The valve chamber 396 thus formed has accommodated therewithin a valve spool 404 which is axially slidable in the valve chamber 396. The valve spool 404 is formed with first and second lands 406 and 408 which are axially spaced apart from each other to form therebetween a circumferential groove which is constantly open to the second line pressure port 400 irrespective of the axial position of the valve spool 404 within the valve chamber 396. The valve spool 404 is axially movable within the valve chamber 396 between a first axial position spaced apart from the closed axial end of the valve chamber 396 and a second axial position close to the closed axial end of the valve chamber 396. When the valve spool 404 is in the first axial position thereof, communication is provided between the first and second line pressure ports 398 and 400 through the groove between the lands 406 and 408 of the valve spool 404 and closing the third line pressure port 402 by the second circumferential land 408 as indicated by the right half of the valve spool 404. When the valve spool 404 is in the second axial position, communication is provided between the second and third line pressure ports 402 and 404 through the groove between the lands 406 and 408 of the valve spool 404 and the first line pressure port 398 is closed by the first circumferential land 406 as indicated by the left half of the valve spool 404. The valve spool 404 is urged to move toward the first axial position thereof by means of a preloaded helical compression spring 410 which is shown seated at one end of a wall surface defining the closed axial end of the valve chamber 396 and at the other end on an internal end face formed in the second circumferential land 408 of the valve spool 404. The valve spool 404 thus constructed and arranged is connected to an actuating plunger 412 which axially projects out of the transmission control valve body through the open axial end of the valve chamber 396 and which is connected to or integral with a ferromagnetic core of a solenoid unit (not shown) mounted on the transmission case. Though not shown in the drawings, the solenoid unit has a coil connected to a d.c. power source across a normally open switch which is located in conjunction with the accelerator pedal of the vehicle and and which is arranged in such a manner as to close when the accelerator pedal is depressed throughout its full distance of stroke, as is well known in the art.

When the switch for the solenoid unit thus arranged is open and as a consequence the solenoid unit remains inoperative, the valve spool 404 of the kickdown valve 394 is held in the first axial position thereof and provides communication between the first and second line pressure ports 398 and 400. If a fluid pressure is developed in the first line pressure port 398, the fluid pressure is passed from the first line pressure port 398 to the second line pressure port 400 and is directed to the first gear trigger port 292 and live pressure port and 366 of the first-second and second-third gear shift valves 276 and 342, respectively, through the fluid circuit 374. When the transmission gear shift lever is in the automatic forward drive range position "D", however, the first line pressure port 398 of the kickdown valve 394 is drained off so that there obtains no fluid pressure in each of the first gear trigger port 292 and live pressure port and 366 of the first-second and second-third gear shift valves 276 and 342, respectively.

When the automatic forward drive range condition is established, the line pressure Pl is introduced into the third line pressure port 402 as will be described later. If the accelerator pedal is fully depressed during this condition, the solenoid unit for the kickdown valve 394 is energized and causes the valve spool 404 of the valve 394 to move from the first axial position to the second axial position against the force of the spring 410, closing the first line pressure port 398 and providing communication between the second and third line pressure ports 400 and 402 of the kickdown valve 394. The line pressure Pl which has been introduced into the third line pressure port 402 is passed to the second line pressure port 400 and is directed to the first-gear trigger port 292 of the first-second gear shift valve 276 and the control post 366 of the pressure modulator valve 442. The line pressure thus developed in the control port 366 of the pressure modulator valve 344 lends itself to forcibly causing the valve spool 376 of the second-third gear shift valve 342 to stay in or move into the first axial position thereof and is passed through the second throttle pressure relief port 364 of the pressure modulator valve 344 and by way of the passageway 374 to the first-gear holding port 294 of the first-second gear shift valve 276. The line pressure being developed in the first-gear trigger and holding ports 292 and 294 of the first-second gear shift valve 276, the valve spool 302 of the valve 276 is urged to move toward or stay in the first axial position thereof.

The line pressure Pl developed by the pressure regulator valve 94 is distributed selectively to the various control valves hereinbefore described and to the fluid chambers of the transmission clutches and brakes through a manually operated transmission gear position selector valve 414. The gear position selector valve 414 is provided in an elongated valve chamber 416 which is formed in a well portion 418 of the transmission control valve body and which is open at both axial ends thereof. The wall portion 418 of the transmission control valve body is further formed with a line pressure inlet port 420; first, second, third, fourth and sixth line pressure outlet ports 422, 424, 426, 428, 430 and 432; first and second bypass ports 434 and 436; and first, second and third drain ports 438, 440 and 442. The pressure inlet port 420 is in constant communication with the line pressure circuit 130, and the drain ports 438, 440 and 442 are open to the transmission oil reservoir 90. The first and second bypass ports 434 and 436 are in constant communication with each other through a bypass passageway 444. The first and third drain ports 438 and 442 are located adjacent to the opposite axial ends, respectively, of the valve chamber 416 and the first to fifth line pressure outlet ports 422, 424, 426, 428 and 430 are arranged in this sequence away from the first drain port 422 toward the third drain port 442 as shown. The first and second bypass ports 434 and 436 are located between the fifth line pressure outlet port 432 and the third drain port 442 with the second drain port 440 located between the bypass ports 434 and 436. The sixth line pressure outlet port 432 is located substantially aligned with the second bypass port 436 which is located between the second and third drain ports 440 and 442. The line pressure inlet port 420 is located between the fifth line pressure outlet port 430 and the first bypass port 434.

A valve spool 446 has a yoke 448 engaged by the transmission gear shift lever through a suitable mechanical linkage (not shown) and is formed with first, second, third and fourth circumferential lands 450, 452, 454 and 456 which are shown to be arranged in this sequence rightwardly of the yoke 448 shown formed at the left axial end of the valve spool 446. The yoke 448 and the circumferential lands 450, 452, 454 and 456 are axially spaced apart from each other and thus form a circumferential groove between every adjacent two of them. The valve spool 446 thus configured is axially movable through the valve chamber 416 between a parking gear position "P", a reverse drive gear position "R", a neutral gear position "N", an automatic forward drive range position "D", a manual second forward drive range position "2" and a manual first forward drive range position "1" which correspond to their respective counterpart positions of the transmission gear shift lever. When the valve spool 446 of the transmission gear selector valve 414 thus constructed and arranged is in the parking gear position "P", the first, second and third line pressure outlet ports 422, 424 and 426 are open to the first drain port 438 through the groove between the yoke 448 and the first circumferential land 450 of the valve spool 446; the fourth and fifth pressure outlet ports 428 and 430 are in communication with the line pressure inlet port 420 through the groove between the second and third circumferential lands 452 and 454 of the valve spool 446; the first bypass port 434 is closed by the third circumferential land 454 of the valve spool 446; and the sixth line pressure outlet port 432 is open to the second drain port 440 through the groove between the third and fourth circumferential lands 454 and 456 and to the third drain port 442 past the fourth circumferential land 456 of the valve spool 446. When the valve spool 446 is in the reverse drive gear position "R", the first, second and third line pressure outlet ports 422, 424 and 426 are open to the first drain port 438 through the groove between the yoke 448 and the first circumferential land 450 of the valve spool 446; the fourth and fifth line pressure outlet ports 428 and 430 and the first bypass port 434 are in communication with the line pressure inlet port 420 through the groove between the second and third circumferential lands 452 and 424; the second and third drain ports 440 and 442 are closed by the third and fourth circumferential lands 454 and 456, respectively, of the valve spool 446; and the sixth line pressure outlet port 432 and the second bypass port 436 are open to each other through the groove between the third and fourth circumferential lands 454 and 456 of the valve spool 446 so that the sixth line pressure outlet port 432 is in communication with the line pressure inlet port 420 through the bypass passageway 444 joining the first and second bypass ports 434 and 436. When the valve spool 446 is in the neutral gear position "N", the first, second and third line pressure outlet ports 422, 424 and 426 are open to the first drain port 438; the fourth and fifth line pressure outlet ports 428 and 430 and the first bypass port 434 are in communication with the line pressure inlet port 420 through the groove between the second and third circumferential lands 452 and 454 of the valve spool 446; the second bypass port 436 and the second drain port 440 are closed by the third circumferential land 454 of the valve spool 446; and the sixth line pressure outlet port 432 is open to the third drain port 442 through the groove between the third and fourth circumferential lands 454 and 456 of the valve spool 446 as shown in FIG. 2. When the valve spool 446 is in the automatic forward drive range position "D", the first drain port 438 is closed by the first circumferential land 450 of the valve spool 446; the first, second and third line pressure outlet ports 422, 424 and 426 are in communication with the line pressure inlet port 420 through the groove between the first and second circumferential lands 450 and 452 of the valve spool 446; the fourth, fifth and sixth line pressure outlet ports 428, 430 and 432 and the first bypass port 434 are open to the second drain port 440; and the second bypass port 436 and the third drain port 442 are closed by the fourth circumferential land 456 of the valve spool 446. When the valve spool 446 is in the manual second forward drive range position "2", the first drain port 438 and the first line pressure outlet port 422 are in communication with each other through the groove between the yoke 448 and the first circumferential land 450 of the valve spool but isolated from the line pressure inlet port 420 by the first circumferential land 450 of the valve spool 446; the second, third and fourth line pressure outlet ports 424, 426 and 428 are in communication with the line pressure inlet port 420 through the groove between the first and second circumferential lands 450 and 452 of the valve spool 446; the fifth and sixth line pressure ports 430 and 432 and the first and second bypass ports 434 and 436 are open to the second drain port 440 through the groove between the second and third circumferential lands 454 and 456 of the valve spool 446; and the third drain port 442 is closed by the third circumferential land 454 of the valve spool 446. When the valve spool 446 is in the manual first forward drive range position "1", the first and second line pressure outlet ports 422 and 424 are open to the first drain port 438 through the groove between the yoke 448 and the first circumferential land 450 of the valve spool 446 but are isolated from the line pressure inlet port 420 by the first circumferential land 450 of the valve spool 446; the third, fourth and fifth line pressure outlet ports 426, 428 and 430 are in communication with the line pressure inlet port 420 through the groove between the first and second circumferential lands 450 and 452 of the valve spool 446; the first bypass port 434 is closed by the second circumferential land 452 of the valve spool 446; and the sixth line pressure outlet port 432 and the second bypass port 436 are open to the second and third drain ports 440 and 442 through the groove between the second and third circumferential lands 452 and 454 of the valve spool 446.

Thus, the first line pressure outlet port 422 is open to the line pressure inlet port 420 only when the valve spool 446 is in the automatic forward drive range position "D", and is in communication with the control port 320 of the second-gear position lock valve 316 and further with the second line pressure inlet port 352 and accordingly the second-gear holding port 356 of the second-third gear shift valve 342 through a fluid circuit 458. The second line pressure outlet port 424 of the gear position selector valve 414 is open to the line pressure inlet port 420 of the valve 414 when the valve spool 446 of the selector valve 414 is either in the automatic forward drive range position "D" or in the manual second forward drive range position "2", and is in communication with the second line pressure inlet port 324 of the second-gear position lock valve 316 through a fluid passageway 460. The third line pressure outlet port 426 is open to the line pressure inlet port 420 when the valve spool 446 is in any one of the automatic and manual forward drive range positions "D", "2" and "1", and is in communication with the clutch actuating fluid circuit 298 and through a fluid passageway 462 with the fluid inlet port 258 of the secondary governor valve 86' of the transmission governor assembly 84. The fourth line pressure outlet port 428 is open to the line pressure inlet port 420 when the valve spool 446 is in any one of the positions except for the automatic forward drive range "D", and is in communication with the second line pressure inlet port 204 of the throttle back-up valve 198 and the first line pressure port 398 of the solenoid operated kickdown valve 394 through a fluid circuit 464. The fifth line pressure outlet port 430 is open to the line pressure inlet port 420 when the valve spool 446 is in any one of the parking gear position "P", reverse drive gear position "R", neutral gear position "N" and manual first forward drive range "1", and is in communication with the first line pressure inlet 282 of the first-second gear shift valve 276 through a fluid circuit 466. The sixth line pressure outlet port 432 is open to the line pressure inlet port 420 only when the valve spool 446 is in the reverse drive gear position "R", and is in communication with the line pressure port 150 of the line pressure booster valve 146 and the first line pressure port 350 of the second-third gear shift valve 342 through the previously mentioned fluid circuit 368. The fluid circuit 458 providing communication from the first line pressure outlet port 422 of the gear position selector valve 414 to the second line pressure inlet port 352 and the second-gear holding port 356 of the second-third gear shift valve 342 is provided with an orifice check valve 468 which is adapted to restrict the flow of fluid to be passed from the gear position selector valve 414 to the ports 352 and 356 of the gear shift valve 342 and allow fluid to be discharged from the ports 352 and 356 back to the gear position selector valve 414 without being subjected to such restriction for the reasons to be explained later.

The throttle pressure Pt delivered from the transmission throttle valve 160 to the throttle pressure circuit 196 as above described is further directed to a second-third gearshift timing valve 472 which is adapted to retard the timings with which the high-and reverse clutch 40 is to be coupled and uncoupled as compared with the timings at which the brake band 72 is to be released and applied, respectively, under predetermined conditions in which the vehicle speed is low as compared with the torque output being delivered from the engine when shifting is to be effected between the second and third gear ratios in any of the forward drive ranges.

The second-third gearshift timing valve 472 comprises an elongated valve chamber 474 formed in the transmission control valve body. The valve chamber 474 has a governor pressure port 476 which is open at one axial end of the valve chamber 474, a throttle pressure port 478 open to the valve chamber 474 at the other axial end of the valve chamber 474, line pressure inlet and outlet ports 480 and 482 located intermediate between and respectively closer to the governor and throttle pressure ports 476 and 478, and a drain port 484 located between the governor pressure port 476 and the line pressure inlet port 480, as shown. The governor pressure port 476 is in constant communication with the governor pressure circuit 274, and the throttle pressure port 478 is in constant communication with the above mentioned throttle pressure circuit 196. The line pressure inlet port 480 is in constant communication with the previously described band releasing fluid circuit 370 and through a high-and-reverse clutch actuating fluid circuit 486 and a calibrated orifice 488 provided in the passageway 486 with the fluid chamber for the high-and-reverse clutch 40. The line pressure outlet port 482 is in communication with the high-and-reverse clutch actuating fluid circuit 486 without passing through the orifice 488. The valve chamber 474 thus formed has axially slidably mounted therein a valve spool 490 having first, second and third circumferential lands 492, 494 and 496 of which the first and third circumferential lands 492 and 496 are located adjacent to the governor and throttle pressure ports 476 and 478, respectively, the lands 492, 494 and 496 being axially spaced apart from each other for forming a circumferential groove between adjacent two of them. The groove formed between the first and second circumferential lands 492 and 494 is constantly open to the drain port 484 irrespectively of the axial position of the valve spool 490 within the valve chamber 474, while the groove formed between the second and third circumferential lands 494 and 496 is constantly open to the line pressure outlet port 482 irrespectively of the axial position of the valve spool 490 within the valve chamber 474 and is permitted to be open to the line pressure inlet port 480 depending upon the axial position of the valve spool 490 within the valve chamber 474. The valve spool 490 is, thus, axially movable within the valve chamber 474 between a first axial position providing communication between the line pressure inlet and outlet ports 480 and 482 through the groove between the second and third circumferential lands 494 and 496 as indicated by the right half of the valve spool 490, and a second axial position closing the line pressure inlet port 480 by the second circumferential land 494 as indicated by the left half of the valve spool 490. The valve spool 490 is formed with an axial blind bore open toward the throttle pressure port 478 and is urged to move toward the first axial position thereof by means of a preloaded helical compression spring 498 which is shown seated at one end on an internal end face at the bottom of the above mentioned axial blind bore in the valve spool 490 and at the other end on an annular internal end face of the valve chamber 474 adjacent to the throttle pressure port 478. With the second-third gearshift timing valve 472 thus constructed and arranged, the valve spool 490 is permitted to stay in the first axial position thereof when the force resulting from the governor pressure Pg to be developed in the governor pressure port 476 is overcome by the sum of the force of the spring 498 and the force produced by the throttle pressure Pt to be developed in the throttle pressure pore 478. In other words, the valve spool 490 of the gearshift timing valve 472 is held in the first axial position thereof when the vehicle speed at a given instant is relatively low as compared with the opening degree of the carburetor throttle valve at the particular instant with respect to a predetermined relationship between the vehicle speed and the opening degree of the carburetor throttle valve. Such a relationship is dictated by the force of the spring 498 and the ratio between the respective cross sectional areas of the first and third circumferential lands 492 and 494. In the shown arrangement, the first circumferential land 492 of the valve spool 490 is assumed to be smaller in cross sectional area than the third circumferential land 496 which has a cross sectional area substantially equal to that of the second circumferential land 494. As the vehicle speed increases as compared with the opening degree of the carburetor throttle valve and accordingly with the torque output being delivered from the engine, the force resulting from the governor pressure Pg developed in the governor pressure port 476 overcomes the sum of the force of the spring 498 and the force produced by the throttle pressure Pt developed in the throttle pressure port 478 and causes the valve spool 490 to move from the first axial position toward the second axial position thereof, providing communication between the line pressure inlet and outlet ports 480 and 482. Thus, the communication between the line pressure inlet and outlet ports 480 and 482 of the second-third gearshift timing valve 472 is provided when the vehicle speed at a given point of time is at a relatively high level as compared with the opening degree of the carburetor throttle valve at the particular point of time which respect to the above described predetermined relationship between the vehicle speed and the opening degree of the carburetor throttle valve. When communication is provided between the line pressure inlet and outlet ports 480 and 482 of the second-third gearshift timing valve 472, the orifice 488 provided in the high-and-reverse clutch actuating fluid circuit 488 is bypassed by the passageway formed between these ports 480 and 482 so that, if a line pressure fluid is present across this orifice 488, the fluid is permitted to pass through the timing valve 472 without being subjected to the flow restriction by the orifice 488. When the communication between the line pressure inlet and outlet ports 480 and 482 of the gearshift timing valve 472 is blocked, the fluid present across the orifice 488 is caused to flow at a restricted rate therethrough.

Hydraulic Control System—Operation

Throughout the condition in which the engine is in operation delivering power output from the crankshaft thereof, the pressure regulator valve 94 is operative to produce a line pressure Pl in the line pressure circuit 130 and the line pressure Pl thus developed in the circuit 130 is distributed to the line pressure inlet port 420 of the manually operated gear position selector valve 414. The line pressure Pl is also supplied through the line pressure circuit 130 to the transmission throttle valve 160, which is therefore operative to produce a throttle pressure Pt in the throttle pressure circuit 196. The throttle pressure Pt thus developed in the throttle pressure circuit 196 is distributed to the throttle pressure port 360 of the second-third gear shift valve 342 and to the throttle pressure inlet port 226 of the pressure modifier valve 222. The throttle pressure in the throttle pressure circuit 196 is further directed to the throttle pressure port 148 of the line pressure booster valve 146 and maintains the line pressure Pl at an elevated level.

The line pressure Pl introduced into the line pressure inlet port 420 of the manually operated gear position selector valve 414 is selectively distributed through any one or ones of the line pressure outlet ports 422, 424, 426, 428, 430 and 432 of the selector valve any one or ones of the fluid chambers for the clutches 40 and 42 and the brake 68 and the brake-apply and brake-apply and brake-release fluid chambers 76 and 76' of the band servo unit 74 depending upon the axial position selected of the valve spool 446 of the gear position selector valve 414. As previously described in detail, the valve spool 446 of the gear position selector valve 414 of the hydraulic control system embodying the present invention is adapted to provide communication between the line pressure inlet port 420 and each of the first, second, third, fourth, fifth and sixth line pressure outlet ports 420, 422, 424, 426, 428, 430 and 432 of the valve 414 in accordance with the schedules which are indicated in Table 2 below.

TABLE 2

| Gear Positions | Port 422 | Port 424 | Port 426 | Port 428 | Port 430 | Port 432 |
|---|---|---|---|---|---|---|
| "P" | x | x | x | o | o | x |
| "R" | x | x | x | o | o | o |
| "N" | x | x | x | o | o | x |
| "D" | o | o | o | x | x | x |
| "2" | x | o | o | o | x | x |
| "1" | x | x | o | o | o | x |

In table 2, the sign "o" indicates that the line pressure outlet port in question is in a condition communicating with the line pressure inlet port 420 so that a line pressure Pl is developed in the particular line pressure outlet port, while the sign "x" indicates that the line pressure outlet port in question is in a condition isolated from the line pressure inlet port 420 by any one or ones of the yoke 448 and the circumferential lands 450, 452, 454 and 456 of the valve spool 446 and drained off through any one or ones of the drain ports 438, 440 and 442.

Under a condition in which the valve spool 446 of the manually operated gear position selector valve 414 is in the neutral gear position "N" as shown in FIG. 2B, the first, second, third and sixth line pressure outlet ports 422, 424, 426 and 432 are drained off and the fourth and fifth line pressure outlet ports 428 and 430 are permitted to be open to the line pressure inlet port 420 of the gear position selector valve 414. The line pressure Pl thus appearing at the fourth line pressure outlet port 428 is directed through the fluid passageway 464 to the second line pressure port 204 of the throttle back-up valve 198 and causes the throttle back-up valve to develop a throttle back-up pressure in the port 206 thereof as previously described. The throttle back-up pressure is passed to the transmission throttle valve 160, which is therefore caused to deliver the throttle backup pressure in the throttle pressure circuit 196. The line pressure developed in the fluid passageway 464 is further directed through the first and second line pressure ports 398 and 400 of the solenoid operated kickdown valve 394 and the fluid circuit 374 to the first-gear trigger port 292 of the first-second gear shift valve 276 and the control port 366 of the pressure modulator valve 344. The line pressure developed in the first-gear trigger port 292 of the first-second gear shift valve 276 causes the valve spool 302 of the valve 276 to move into the first axial position thereif if the valve happens to be in the second axial position thereof. The line pressure developed in the control port 366 of the pressure modulator valve 344 acts, in cooperation with the force of the spring 392, on the valve spool 376 of the second-third gear shift valve 342 and the valve plunger 386 of the pressure modulator valve 344 so that the valve spool and plunger 376 and 386 are forced to be spaced apart from each other and are held in the respective first axial positions thereof. The valve plunger 386 of the pressure modulator valve 344 being held in the limit axial position thereof, communication is provided between the control port 366 and the second throttle pressure relief port 364 of the modulator valve 344 so that the line pressure developed in the control port 366 is passed through the fluid passageway 374 to the first-gear holding port 294 of the first-second gear shift valve 276 having the valve spool 302 held in the first axial position thereof as above described and holds the valve spool 302 in the first axial position thereof. Thus, the first-second and second-third gear shift valves 276 and 342 are maintained in the respective first and second gear ratio conditions thereof when the transmission gear shift lever is in the neutral gear position "N".

On the other hand, the line pressure Pl appearing in the fifth line pressure outlet port 430 of the manually operated gear position selector valve 414 is directed through the fluid passgeway 466 to the first line pressure inlet port 282 of the first-second gear shift valve 276 and imparts an additional force urging the valve spool 302 to stay in the first axial position thereof.

With the first, second, third and sixth line pressure outlet ports 422, 424, 426 and 432 of the manually operated gear position selector valve 414 drained off as above mentioned, there is no fluid pressure developed in the fluid chambers for the clutches 40 and 42 and the brake 68 and the brake-apply and brake-release fluid chambers 76 and 76' of the band servo unit 74 so that all the frictional units of the transmission mechanism shown in FIG. 1 are held inoperative and, as a consequence, the driving torque being delivered from the turbine runner 18 of the torque converter 14 to the transmission input shaft 28 is not permitted to reach the transmission output shaft 28. Under these conditions, vehicle is held at a standstill with the engine operating at idle.

When, now, the transmission gear shift lever is manually moved from the neutral gear position "N" to the automatic forward drive range position "D" thereof, the valve spool 446 of the manually operated gear position selector valve 414 is moved into the corresponding position providing communication between the line pressure inlet port 420 and each of the first, second and third line pressure outlet ports 422, 424 and 426 and holding the fourth and fifth line pressure outlet ports 428 and 430 isolated from the line pressure inlet port 420 and drained off through the second drain port 438 of the gear position selector valve 414. The fourth and fifth line pressure outlet ports 428 and 430 of the gear position selector valve 414 being drained off, there is now no fluid pressure developed in the first line pressure inlet port 282 and the first-gear trigger port 292 of the first-second gear shift valve 276, the control port 366 of the pressure modulator valve 344 and accordingly the first-gear holding port 294 of the first-second gear shift valve 276. In the absence of a fluid pressure in the second line pressure port 204 of the throttle back-up valve 198, there is no throttle back-up pressure developed in the port 206 of the valve 198 so that the valve spool 212 is allowed to move back into the previously mentioned extreme axial position thereof by the force of the spring 220 and provides communication between the throttle back-up pressure port 206 and the drain port 208 thereof. Under these conditions, the transmission throttle valve 160 is enabled to develop a throttle pressure Pt in the throttle pressure circuit 196.

The third line pressure inlet port 426 of the manually operated gear position selector valve 414 being now held in communication with the line pressure inlet port 420 of the selector valve 414, the line pressure Pl developed in the line pressure circuit 130 is passed through the forward drive clutch actuating fluid circuit 298 to the fluid chamber for the forward drive clutch 42 and causes the clutch 42 to couple. The driving torque which has been delivered from the torque converter 14 to the transmission input shaft 28 is transmitted via the first and second planateary gear assemblies 52 and 54 to the transmission output shaft 64 with the one-way clutch 70 held in play in the power transmission mechanism shown in FIG. 1, thereby producing in the transmission mechanism the first or "low" gear ratio ($D_1$) in the automatic forward drive range "D".

The line pressure Pl developed in the forward drive clutch actuating circuit 298 is also directed to the fluid inlet port 258 of the secondary governor valve 86' of the transmission governor assembly 84, which is accordingly made operative to produce in the governor pressure circuit 274 a governor pressure Pg which is continuously variable with vehicle speed. The governor pressure Pg in the circuit 274 is distributed to the respective governor pressure ports 280 and 348 of the first-second and second-third gear shift valves 276 and 342 and urges the respective valve spools 302 and 376 of the gear shift valves 276 and 342 to move away from the first axial positions thereof. The governor pressure Pg is further directed through the circuit 274 to the governor pressure port 230 of the pressure modifier valve 222 and urges the valve spool 236 of the modifier valve 222 to move away from the first axial position thereof against the force of the spring 242 and the force produced by the throttle pressure Pt acting on the differential pressure acting area between the first and second circumferential lands 238 and 240 of the valve spool 236. The valve spool 236 of the pressure modifier valve 222 is therefore conditioned to stay in an equilibrium axial position between the first and second axial positions thereof as previously described and develops a modified throttle pressure in the modified pressure port 228 thereof. The modified throttle pressure is directed through the fluid passageway 234 to the modified throttle pressure port 108 of the pressure regulator valve 94 and lessens the line pressure Pl depending upon the predetermined relationship between the vehicle speed and the opening degree of the carburetor throttle valve.

When the manually operated gear position selector valve 414 is in the automatic forward drive range position "D", not only the third line pressure outlet port 426 but also the first and second line pressure outlet port 422 and 424 of the gear selector valve 414 are permitted to communicate with the line pressure inlet port 420 of the valve 414 so that the line pressure Pl developed in the line pressure circuit 130 is distributed through the passageways 458 and 460 to the control port 320 and the second line pressure inlet port 324 of the second-gear position lock valve 316, respectively, and further through the passageway 458 and the one-way orifice check valve 468 to the second line pressure port 352 and second-gear holding port 356 of the second-third gear shift valve 342. The line pressure developed in the control port 360 of the second-gear lock valve 316 is effective, in cooperation with the force of the spring 340, for holding the valve spool 332 of the lock valve 316 to stay in the first axial position thereof isolating the second line pressure inlet port 324 from the line pressure outlet port 326 of the lock valve 316 against the force resulting from the line pressure acting on the differential pressure acting area between the second and third circumferential lands 336 and 338 of the valve 316 from the line pressure port 324. The line pressure developed in the second-gear holding port 356 of the second-third gear shift valve 342 acts on the differential pressure acting between the second and third circumferential lands 380 and 382 of the valve spool 376 held in the first axial position thereof and urges the valve spool 376 to stay in situ against the force produced by the governor pressure Pg acting on the first circumferential land 378 of the valve spool 376. The force thus produced by the governor pressure Pg in the second-third gear shift valve 342 is opposed not only by the force resulting from the line pressure acting on the differential area between the lands 380 and 382 of the valve spool 376 but by the force of the spring 392 and the force produced by the modulated throttle pressure developed between the valve spool 376 of the gear shift valve 342 and the valve plunger 386 of the pressure modulator valve 344 with the control port 366 of the pressure modulator valve 344 drained off through the fluid passageway 374, the first and second line pressure ports 398 and 400 of the solenoid operated kickdown valve 394 and the fluid passageway 464 leading from the fourth line pressure outlet port 428 of the manually operated gear position selector valve 414. The modulated throttle pressure developed in the pressure modulator valve 344 is directed through the second throttle pressure relief port 364 of the modulator valve 344 to the second-gear holding port 294 of the first-second gear shift valve 276 having the valve spool 302 in the first axial positions thereof as previously described and reinforces the force of the spring 314 urging the valve spool 302 to stay in the first axial position thereof. The line pressure developed in the forward drive clutch actuating circuit 298 is also directed to the second line pressure inlet port 286 of the first-second gear shift valve 276 but is cut off between the fourth and fifth circumferential lands 310 and 312 of the valve spool 302 held in the first axial position thereof as indicated by the lower half of the spool 302.

As the vehicle speed is increased and exceeds a predetermined value, the force exerted on the valve spool 302 of the first-second gear shift valve 276 by the governor pressure Pg developed in the governor pressure port 280 of the gear shift valve 276 overcomes the sum of the force of the spring 314 and the force produced by the modulated throttle pressure acting on the differential pressure acting area between the first and second circumferential lands 278 and 280 of the valve spool 302 and causes the valve spool 302 to move away from the first axial position thereof. At an instant when the valve spool 302 thus moving toward the second axial position thereof is moved past an axial position closing the first-gear holding port 294, the force resulting from the modulated throttle pressure acting on the differential pressure acting area between the lands 378 and 380 is eliminated and as a consequence the force resulting from the governor pressure Pg acting on the valve spool 302 is opposed only by the force of the spring 314. Upon reaching the above mentioned axial position, therefore, the valve spool 302 is allowed to move fast into the second axial position thereof. Communication is now provided between the second line pressure inlet and outlet ports 286 and 288 of the first-second gear shift valve 276 so that the line pressure which has been directed to the second line pressure inlet port 286 is passed through the second line pressure outlet port 288 of the gear shift valve 276 to the first line pressure inlet port 322 of the second-gear position lock valve 316. The second-gear position lock valve 316 is maintained in a condition having the valve spool 332 in the first axial position partly by the force of the spring 340 and partly by the force exerted on the valve spool 332 by the line pressure directed to the control port 320 of the valve 316 from the first line pressure outlet port 422 of the manually operated gear position selector valve 414 as previously noted. Communication being thus established between the first line pressure inlet port 322 and the line pressure outlet port 326 of the second-gear position lock valve 316, the line pressure developed in the first line pressure inlet port 322 of the valve 316 is passed through the line pressure outlet port 326 of the valve 316 to the band actuating fluid circuit 330 and by way of the fluid circuit 330 to the brake-apply fluid chamber 76 of the band servo unit 74. The brake band 72 being now applied with the forward drive clutch 42 kept coupled, a shift is made in the transmission mechanism shown in FIG. 1 from the first gear ratio ($D_1$) to the second gear ratio ($D_2$) in the automatic forward drive range "D".

As the vehicle speed is further increased and reaches a level at which the force exerted on the valve spool 376 of the second-third gear shift valve 342 by the governor pressure Pg acting on the valve spool 376 overcomes the sum of the force of the spring 392, the force resulting from the modulated throttle pressure obtaining between the valve spool 376 and the valve plunger 386 of the pressure modulator valve 344 and the force resulting from the line pressure acting on the differential pressure acting area between the lands 380 and 382 of the valve spool 376 from the second-gear holding port 356 of the second-third gear shift valve 342, the valve spool 376 of the gear shift valve 342 is caused to move away from the first axial position thereof. At an instant the valve spool 376 thus moving toward the second axial position thereof reaches an axial position closing the second-gear holding port 356 by the second circumferential land 380 thereof, the valve spool 376 is liberated from the force which has been exerted thereon by the line pressure in the second-gear holding port 356 and is allowed by move fast into the second axial position thereof against the force of the spring 392 and the force resulting from the modulated throttle pressure acting on the valve spool 376. Fluid communication is now provided between the second line pressure inlet port 352 and the line pressure outlet port 354 of the second-third gear shift valve 342 and allow the line pressure to flow from the second line pressure inlet port 352 to the line pressure outlet port 354 of the gear shift valve 342 and through the port 354 to the band releasing fluid circuit 370 leading to the brake-release fluid chamber 76' of the band servo unit 74. Since, in this instance, the line pressure fluid to be admitted to the second line pressure inlet port 352 is subjected to a flow restriction in the one-way orifice check valve 468 provided in the fluid passageway branched from the fluid passageway 458 leading from the first line pressure outlet port 422 of the manually operated gear position selector valve 414, the fluid in the passageway 458 is allowed to flow at a restricted rate into the second line pressure inlet port 352 of the second-third gear shift valve 342. In the brake-release fluid chamber 76' of the band servo unit 74 is therefore developed a fluid pressure which increases at a relatively low, limited rate at an incipient stage and thereafter at an exponentially increasing rate toward the level of the line pressure Pl with the result that the brake 72 which has been maintained in the applied condition is caused to release initially at a relatively low, limited rate and thereafter at an exponentially increasing rate until the band 72 is fully released. The fluid pressure thus developed in the band releasing fluid circuit 370 is also directed to the line pressure inlet port 480 of the second-third gearshift timing valve 472. If, in this instance, the vehicle speed being produced is low as compared with the opening degree of the carburetor throttle valve with respect to the previously mentioned predetermined relationship between the vehicle speed and the carburetor throttle valve opening degree, the force being exerted on the valve spool 490 of the second-third gearshift timing valve 472 by the governor pressure Pg in the port 476 of the timing valve 472 is overcome by the sum of the force of the spring 498 and the force being exerted on the valve spool 470 by the throttle pressure Pt and allows the valve spool 470 to stay in the first axial position thereof providing communication between the line pressure inlet and outlet ports 480 and 482 of the timing valve 472. Under these conditions, the fluid pressure developed in the band releasing fluid circuit 370 is passed through the line pressure inlet and outlet ports 480 and 482 of the second-third gearshift timing valve 472 to the high-and-reverse clutch actuating fluid circuit 486. The fluid pressure to be passed to the high-and-reverse clutch actuating fluid circuit 486 being thus permitted to bypass the orifice 488 provided in the circuit 486, the fluid to be directed to the fluid chamber of the high-and-reverse clutch 40 is not subjected to the flow restriction due to the orifice 488 so that the high-and-reverse clutch 40 is enabled to couple at a relatively high rate. If, on the other hand, the vehicle speed being produced when the second-third gear shift valve 342 is brought into the third gear ratio condition is high as compared with the opening degree of the carburetor throttle valve with respect to the above mentioned predetermined relationship between these two parameters, the valve spool 490 of the second-third gearshift timing valve 472 is moved into the second axial position thereof and maintains the line pressure inlet port 480 of the timing valve 472 closed by the second circumferential land 494 thereof. The bypass communication between the line pressure inlet and outlet ports 480 and 482 of the second-third gearshift timing valve 472 being thus blocked, the fluid pressure to be pressed from the band releasing fluid circuit 370 to the high-and-reverse clutch actuating fluid circuit 486 is compelled to pass through the orifice 488 in the fluid circuit 486 so that the high-and-reverse clutch 40 is caused to couple initially at a relatively low rate and thereafter at an exponentially increasing rate. The brake band 72 being released and the high-and-reverse cutch 40 being thus coupled with the forward drive clutch 42 still maintained in the coupled condition, there is produced in the transmission mechanism shown in FIG. 1 an upshift from the second gear ratio ($D_2$) to the third gear ratio ($D_3$) in the automatic forward drive range "D". Thus, the second-third gearshift timing valve 472 lends itself to alleviating snocks to be produced when an upshift is to be made between the second and third gear ratios in the transmission mechanism under conditions in which the vehicle speed is relatively high in comparison with the driving torque being delivered from the engine.

When the second-third gear shift valve 342 is in the third gear ratio condition, the valve spool 376 of the gear shift valve 342 is held in the second axial position thereof and accordingly the valve plunger 386 of the pressure modulator valve 344 is held in the previously mentioned limit axial position thereof as indicated by the upper halves of the valve spool and plunger 376 and 386. Under these conditions, the valve spool 376 of the second-third gear shift valve 342 is subjected only to the force produced by the governor pressure Pg in the governor pressure port 348 of the gear shift valve 342 and the force transmitted to the valve spool 376 from the pressure modulator valve plunger 386 which is acted upon by the throttle pressure Pt in the throttle pressure port 360 of the pressure modulator valve 344. If the vehicle speed is reduced and/or the accelerator pedal is depressed to increase the opening degree of the carburetor throttle valve so that the previously described second predetermined relationship is established between these parameters under these conditions, the force produced by the throttle pressure Pt acting on the valve plunger 386 of the pressure modulator valve 344 overcomes the force produced by the governor pressure Pg acting on the valve spool 376 of the second-third gear shift valve 342 and causes the valve spool 376 to move toward the first axial position thereof. At a point of time when the valve spool 376 thus moving toward the first axial position thereof reaches an axial position in which the groove between the first and second circumferential lands 378 and 380 of the valve spool 376 is open to the second-gear holding port 356 of the gear shift valve 342, the valve spool 376 is subjected to an additional force produced by the line pressure acting on the differential pressure acting area between these lands 378 and 380 and is caused to move fast into the first axial position thereof, isolating the line pressure outlet port 354 from the second line pressure inlet port 352 and permitting the former to be open to the first line pressure inlet port 350. When the manually operated gear position selector valve 414 is in the automatic forward drive range position "D", the sixth line pressure outlet port 432 of the selector valve 414 is drained off through the third drain port 442 of the selector valve 414 so that the first line pressure inlet port 350 of the second-third gear shift valve 342 is drained off through the fluid circuit 368 and the sixth line pressure outlet port 432 of the gear position selector valve 414. When communication is provided between the first line pressure inlet port 350 and the line pressure outlet port 354 of the second-third gear shift valve 342 as above described, the line pressure which has been developed in the brake-release fluid chamber 76' of the band servo unit 74 is discharged through the band releasing fluid circuit 370, the ports 356 and 350 of the second-third gear shift valve 342, the fluid circuit 206 and the sixth line pressure outlet port 432 of the manually operated gear position selector valve 414. Under the conditions in which the previously described second predetermined relationship is established between the vehicle speed and the opening degree of the carburetor throttle valve, the force being exerted on the valve spool 490 of the first-second gearshift timing valve 472 by the governor pressure Pg acting on the valve spool 490 is overcome by the sum of the force of the spring 498 and the force resulting from the throttle pressure Pt acting on the valve spool 490, which is accordingly held in the first axial position thereof providing communication between the line pressure inlet and outlet ports 480 and 482 of the gearshift timing valve 472. The fluid pressure which has been developed in the fluid chamber of the high-and-reverse clutch 40 is therefore allowed to by-pass the orifice 488 in the high-and-reverse clutch actuating fluid passageway 486 through the line pressure outlet and inlet ports 482 and 480 of the second-third gearshift timing valve 472 and thereby enables the high-and-reverse clutch 40 to uncouple at a relatively high rate. The fluid pressure being discharged from each of the brake-release fluid chamber 76' of the band servo unit 74 and the fluid chamber of the high-and-reverse clutch 40, the brake band 72 is applied for a second time and the high-and-reverse clutch 40 is uncoupled. With the forward drive clutch 42 kept coupled, a shift is now made in the transmission mechanism from the third gear ratio (D$_3$) to the second gear ratio (D$_2$) in the automatic forward drive range "D". When the second-third gear shift valve 342 restores the second gear ratio condition thereof, a modulated throttle pressure is developed in the pressure modulator valve 344.

If the vehicle further slows down and as a consequence the vehicle speed is reduced to a predetermined value, the force exerted on the valve spool 302 of the first-second gear shift valve 276 by the governor pressure Pg in the governor pressure port 280 of the gear shift valve 276 is overcome by the force of the spring 314 with the result that the valve spool 302 is caused to move from the second axial position back into the first position thereof. In the course of movement from the second axial position to the first axial position of the valve spool 302, the first circumferential land 304 of the valve spool 302 opens up the first-gear holding port 294 of the gear shift valve 276 so that the valve spool 302 is moved fast into the first axial position thereafter by an additional force resulting from the modulated throttle pressure acting on the differential pressure acting area between the first and second circumferential lands 304 and 306 of the valve spool 302 from the first-gear holding port 294 of the valve 276. With the valve spool 302 of the first-second gear shift valve 276 thus returned to the first axial position thereof, the second line pressure outlet port 288 of the gear shift valve 276 is isolated from the second line pressure port 286 and permitted to be open to the drain port 296 of the valve 276. The line pressure which has been developed in the brake-apply fluid chamber 76 of the band servo unit 74 is now discharged through the band actuating fluid circuit 330, past the line pressure outlet port 326 and the first line pressure inlet port 322 of the second-gear position lock valve 316 and by way of the fluid passageway 328 and the second line pressure outlet port 288 and the drain port 296 of the first-second gear shift valve 276. The brake band 72 being thus released, only the forward drive clutch 42 remains operative in the transmission mechanism shown in FIG. 1 and, in cooperation with the one-way clutch 70, produces in the transmission mechanism shown in FIG. 1 the first gear ratio (D$_1$) in the automatic forward drive range "D".

By manipulating the transmission gear shift lever into the manual second forward drive range position "2", the manually operated gear position selector valve 414 is moved to the corresponding axial position providing communication from the line pressure inlet port 420 to the second, third and fourth line pressure outlet ports 424, 426 and 428 of the selector valve 414 and causing the first line pressure outlet port 422 to be drained off through the first drain port 438 of the valve 414. The first line pressure outlet port 422 of the gear position selector valve 414 being drained off, there is no fluid pressure developed in the control port 320 of the second-gear position lock valve 316, which is accordingly held in a condition having the valve spool 332 maintained in the second axial position by the force resulting the line pressure acting on the differential pressure acting area between the second and third circumferential lands 336 and 338 of the valve spool 332 against the force of the spring 340. In the second-gear position lock valve 316 is now provided communication between the second line pressure port 324 and the line pressure outlet port 326 so that the line pressure developed in the second line pressure outlet port 424 of the gear position selector valve 414 is directed through the fluid passageway 460, past the line pressure inlet and outlet ports 324 and 326 of the second-gear position lock valve 316 and by way of the band actuating fluid circuit 330 to the brake-apply fluid chamber 76' of the band servo unit 74. The brake band 72 being applied in addition to the forward drive clutch 42 which is maintained in the coupled condition with the third line pressure outlet port 426 of the gear position selector valve 414 held in communication with the line pressure inlet port 420 of the selector valve 414, the second gear ratio is established in the transmission mechanism shown in FIG. 1. Under the condition in which the second gear ratio in the manual second forward drive range "2" is thus established, there is a line pressure developed in the fourth line pressure outlet port 428 of the gear position selector valve 414. The line pressure in the port 428 of the gear position selector valve 414 is directed through the fluid passageway 464 to the second line pressure port 204 of the throttle back-up valve 198, which is as a consequence conditioned to develop in the port 206 thereof a throttle back-up pressure higher than the throttle pressure Pt normally produced by the transmission throttle valve 198. The throttle back-up pressure is passed to the transmission throttle valve 160 and through the throttle valve 160 and the throttle pressure circuit 196 to the throttle pressure port 148 of the line pressure booster valve 146 and maintains the line pressure Pl at an increased level throughout the manual second forward drive range condition. The line pressure passed to the fluid passageway 464 from the fourth line pressure outlet port 428 of the manually operated gear position selector valve 414 is further directed through the kickdown valve 394 and the fluid circuit 374 to the first-gear trigger port 292 of the first-second gear shift valve 276 and to the control port 366 of the pressure modulator valve 344. If, in this instance, the valve spool 302 of the first-second gear shift valve 276 happens to be in the second axial position thereof, the line pressure developed in the first-gear trigger port 292 of the gear shift valve 276 acts on the differential pressure acting area between the first and second circumferential lands 304 and 306 of the valve spool 302, which is as a consequence forcibly moved into the first axial position thereof. On the other hand, the line pressure developed in the control port 366 of the pressure modulator valve 344 acts on the valve spool 376 of the second-third gear shift valve 342 and the valve plunger 386 of the pressure modulator valve 344 and causes the valve spool and plunger 376 and 386 to move into or stay in their respective first axial positions. The valve plunger 386 of the pressure modulator valve 344 being thus held in the first axial position thereof, communication is established between the control port 366 and the second throttle pressure relief port 364 of the modulator valve 344 so that the line pressure introduced into the control port 366 is further passed through the second throttle pressure relief port 364 of the valve 344 and through the passageway 375 to the first-gear holding port 294 of the first-second gear shift valve 276 having the valve spool 302 maintained in the first axial position or moved into the first axial position thereof by the line pressure developed in the first-gear trigger port 292 as above described. The line pressure developed in the first-gear holding port 294 of the first-second gear shift valve 276 thus acts on the differential pressure acting area between the first and second circumferential lands 304 and 306 of the valve spool 302, which is therefore maintained in the first axial position thereof. When the transmission gear shift lever is in the manual second forward drive range position "2", both of the first-second and second-third gear shift valves 276 and 342 are maintained in their respective first and second gear ratio conditions without respect to the governor pressure Pg in the respective governor pressure ports 280 and 348 of the gear shift valves 276 and 342 or, in other words, independently of the road speed of the vehicle.

If the transmission gear shift lever is moved to the manual first forward drive range position "1" under these conditions, the manually operated gear position selector valve 414 is moved into the corresponding axial position causing the second line pressure outlet port 424 as well as the first line pressure outlet port 422 to be drained off through the first drain port 438 and permitting not only the third and fourth line pressure outlet ports 426 and 428 but the fifth line pressure outlet port 430 to communicate with the line pressure inlet port 420 of the gear position selector valve 414. The second line pressure outlet port 424 of the gear position selector valve 414 being drained off, the line pressure which has been developed in the second line pressure inlet port 324 of the second-gear position lock valve 316 is discharged through the passageway 460 and the ports 424 and 438 of the gear position selector valve 414. The valve spool 332 of the second-gear position lock valve 316 is therefore released from the line pressure which has been acting on the differential pressure acting area between the lands 336 and 338 of the valve spool 332 and is allowed to restore the first axial position thereof by the force of the spring 340, providing communication between the first line pressure inlet port 322 and the line pressure outlet port 326 of the valve 316. The line pressure which has been developed in the brake-apply fluid chamber 76 of the band servo unit 74 is not discharged through the band actuating fluid passageway 330, the ports 326 and 322 of the second-gear position lock valve 316, the passageway 328, and the second line pressure outlet port 288 and the drain port 308 of the first-second gear shift valve 276 which is held in the first gear ratio condition having the valve spool 302 in the first axial position providing communication between the ports 288 and 308. The line pressure having been discharged from the brakeapply fluid chamber 76 of the band servo unit 74, the brake band 72 is released and makes the transmission mechanism ready to produce the first gear ratio condition therein. The fourth line pressure outlet port 428 of the manually operated gear position selector valve 414 being kept open to the line pressure inlet port 420, the line pressure developed in the first-gear trigger and holding ports 292 and 294 of the first-second gear shift valve 276 and the control port 366 and the throttle pressure relief ports 362 and 364 of the second-third gear shift valve 342 is maintained.

Under the manual first forward drive range condition, the line pressure is developed in the fifth line pressure outlet port 430 in addition to the third and fourth line pressure outlet ports 426 and 428 of the manually operated gear position selector valve 414 and is directed through the passageway 466 to the first line pressure inlet port 282 of the first-second gear shift valve 276. The valve spool 302 of the first-second gear shift valve 276 being held in the first axial position thereof, communication is established between the first line pressure inlet and outlet ports 282 and 284 of the first-second gear shift valve 276 so that the line pressure developed in the first line pressure inlet port 282 is directed on the one hand into the line pressure feedback port 290 of the gear shift valve 276 and on the other hand through the low-and-reverse brake actuating fluid circuit 300 to the first line pressure inlet port 202 of the throttle back-up valve 198 and to the fluid chamber of the low-and-reverse brake 68. The line pressure developed in the line pressure feedback port 290 of the first-second gear shift valve 276 acts on the valve spool 302 of the valve 276 and holds the valve spool in the first axial position thereof so as to maintain the communication between the first line pressure inlet and outlet ports 282 and 284 of the first-second gear shift valve 276. The force thus urging the valve spool 302 of the first-second gear shift valve 276 to stay in the first axial position thereof by the line pressure developed in the line pressure feedback port 290 of the gear shift valve 276 is reinforced by the force of the spring 314, the line pressure acting on the differential pressure acting area between the first and second circumferential lands 304 and 306 of the valve spool 302 from the first-gear holding port 294 and the line pressure acting on the differential pressure acting area between the fourth and fifth circumferential lands 310 and 312 of the valve spool 302 from the second line pressure inlet port 286 of the first-second gear shift valve 276, which is thus maintained in the first gear ratio condition without respect to the governor pressure Pg in the governor pressure port 280 of the valve 276 or, in other words, independently of the vehicle speed. On the other hand, the line pressure developed in the first line pressure inlet port 202 of the throttle backup valve 198 is admitted into one end portion of the valve chamber 200 of the throttle back-up valve 198 through the previously mentioned radial and axial passageways formed in the valve spool 212 and acts on the outer axial end of the first circumferential land 214 of the valve spool 212. The result is that the valve spool 212 which has been held in the previously mentioned equilibrium axial position producing the throttle back-up pressure in the port 206 is forcibly moved into the second axial position thereof against the force of the spring 220 and initially further against the force produced by the fluid pressure acting on the differential pressure acting area between the second and third circumferential lands 216 and 218 of the valve spool 212. The throttle back-up pressure port 206 of the valve 198 is now isolated from the second line pressure port 204 and is made open to the drain port 208 of the valve 198 and, at the same time, the radial port formed in the valve spool 212 is brought into communication with the second line pressure inlet port 204. The line pressure in the second line pressure inlet port 204 of the throttle back-up valve 198 being maintained with the fourth line pressure outlet port 428 of the manually operated gear position selector valve 414 kept open to the line pressure inlet port 420 of the gear position selector valve 414, the valve spool 212 of the throttle back-up valve 198 is enabled to stay in the second axial position thereof by the line pressure developed in the second line pressure inlet port 204 of the valve 198 as indicated by the right half of the valve spool 212. The line pressure developed in the fluid chamber of the low-and-reverse brake 68 causes the brake 68 to apply and produce the first forward drive gear ratio in the transmission mechanism in cooperation with the forward drive clutch 42 which is maintained in the coupled condition. In contrast to the condition in which the first gear ratio ($D_1$) in the automatic forward drive range "D" is produced by the combination of the forward drive clutch 42 and the one-way clutch 70 (FIG. 1), the first gear ratio condition in the manual first forward drive range "1" is produced by the combination of the forward drive clutch 42 and the low-and-reverse brake 68 as above described so that the transmission mechanism is permitted to transmit therethrough a driving torque from the transmission output shaft backwardly to the transmission input shaft when the engine is to be braked upon by the vehicle inertia.

When, now, the transmission gear shift lever is moved from the neutral gear position "N" to the reverse drive gear position "R", the first, second and third line pressure outlet ports 422, 424 and 426 of the manually operated gear position selector valve 414 are drained off through the first drain port 438 of the selector valve 414 and, at the same time, the fourth, fifth and sixth line pressure outlet ports 428, 430 and 432 of the gear position selector valve 414 are permitted to be in communication with the line pressure inlet port 420 of the gear position selector valve 414. With the third line pressure outlet port 426 of the gear position selector valve 414 drained off, there is no fluid pressure developed in the forward drive clutch actuating fluid circuit 298 so that the forward drive clutch 42 is maintained in the uncoupled condition. In the absence of a fluid pressure developed at the fluid inlet port 258 of the secondary governor valve 86′, furthermore, the transmission governor assembly 84 is maintained inoperative to deliver the governor pressure Pg so that there is no force urging the valve spools 302 and 376 of the first-second and second-third gear shift valves 276 and 342 to move away from their respective first axial positions. With the fourth and fifth line pressure ports 428 and 430 brought into play in the manually operated gear position selector valve 414, there is developed a line pressure Pl in each of the first and second line pressure inlet ports 202 and 204 of the throttle back-up valve 198, the control port 366 and the first and second throttle pressure relief ports 362 and 364 of the pressure modulator valve 344, and the first line pressure inlet and outlet ports 282 and 284, the line pressure feedback port 290 and the first-gear trigger and holding ports 292 and 294 of the first-second gear shift valve 276 with the result that the first-second and second-third gear shift valves 276 and 342 are maintained in their respective first and second gear ratio conditions as under the above described manual first forward drive range conditions. The line pressure developed in the fifth line pressure outlet port 430 of the manually operated gear position selector valve 414 is also directed by way of the first line pressure inlet and outlet ports 282 and 284 of the first-second gear shift valve 276 and through the fluid circuit 300 to the fluid chamber of the low-and-reverse brake 68 and causes the brake 68 to apply.

The sixth line pressure outlet port 432 of the manually operated gear position selector valve 414 being open to the line pressure inlet port 420 of the valve 414, the line pressure is directed by way of the fluid circuit 368 to the line pressure port 150 of the line pressure booster valve 146 and to the first line pressure inlet port 350 of the second-third gear shift valve 342. The line pressure developed in the line pressure port 150 of the line pressure booster valve 146 acts on the differential pressure acting area between the lands 156 and 158 of the valve spool 154 and, in cooperation with the throttle pressure Pt acting on the outer end face of the first circumferential land 156 of the valve spool 154, urges the valve spool 154 to move away from the first axial position thereof and accordingly urges the valve spool 114 of the pressure regulator valve 94 to move toward the first axial position thereof, thereby giving rise to an increase in the line pressure Pl being developed by the pressure regulator valve 94. On the other hand, the second-third gear shift valve 342 being maintained in a condition establishing communication between the first line pressure inlet port 350 and the line pressure outlet port 354 of the valve 342 having the valve spool 376 held in the first axial position thereof, the line pressure developed in the first line pressure inlet port 350 of the gear shift valve 342 as above described is passed through the line pressure outlet port 354 of the valve 342 to the band releasing fluid circuit 370. The transmission governor assembly 84 being held inoperative to develope a governor pressure Pg, there is no fluid pressure in the governor pressure port 476 of the second-third gearshift timing valve 472, which is as a consequence maintained in a condition having the valve spool 490 held in the first axial position thereof by the force of the spring 498 and the throttle pressure Pt developed in the port 478, thereby establishing communication between the line pressure inlet and outlet ports 480 and 482 of the gearshift timing valve 472. The fluid pressure developed in the band releasing fluid circuit 370 is therefore allowed to bypass the orifice 488 through these ports 480 and 482 of the second-third gearshift timing valve 472 and is directed at a relatively high rate into the fluid chamber of the high-and-reverse clutch 40.

With both of the high-and-reverse clutch 40 and the low-and-reverse brake 68 put into operation, the respective sun gears 52a and 54a of the first and second planetary gear assemblies 52 and 54 in the transmission mechanism shown in FIG. 1 are driven to rotate in the forward direction and the pinion carrier 60 for the second planetary gear assembly 54 is held locked. The transmission output shaft 64 is driven by the ring gear 54b of the second planetary gear assembly 54 for rotation in the reverse direction about the center axis of the shaft, producing the reverse drive gear condition in the transmission mechanism. The high-and-reverse clutch 40 and the low-and-reverse brake 68 thus actuated are acted upon by the line pressure which is boosted by the line pressure introduced into the line pressure port 150 of the line pressure booster valve 146 as previously described and are accordingly enabled to be maintained in the coupled and applied conditions, respectively, with adequate forces throughout the reverse drive condition of the vehicle.

Principal Features of the Invention

In accordance with the present invention, the hydraulic transmission control system thus constructed and arranged is provided with a shock control arrangement adapted to eliminate or reduce shocks which tend to be created during shifting to any of the forward and reverse drive gear positions and between the gear ratios in the automatic forward drive range "D" of the transmission system.

FIGS. 2A and 2B, such a shock control arrangement proposed by the present invention is shown schematically as comprising a pressure accumulator unit 500 and a pressure reducing valve 529. The pressure accumulator unit 500 is operative to control the fluid pressure to couple the high-and-reverse clutch 40 during shifting to the reverse drive gear position "R", the fluid pressure to couple the forward drive clutch 42 during shifting from the neutral gear position "N" to the automatic forward drive range position "D" or the fluid pressure to apply the brake band 72 during shifting from the first gear ratio ($D_1$) to the second gear ratio ($D_2$) in the automatic forward drive range "D" or from the manual first forward drive range "1" to the manual second forward drive range "2".

The pressure accumulator unit 500 comprises a wall portion 502 which forms part of the body structure of the transmission control valve assembly and which is formed with a cavity 504. The cavity 504 consists of two portions having different cross sectional areas defined by laterally or radially stepped internal peripheral wall surfaces which are laterally or radially joined by an annular or otherwise shaped internal end face 506 located at the inner axial end of the cavity portion having the larger cross section. Within such a cavity 504 is mounted a piston 508 having a smaller flange portion 510 formed at or adjacent one axial end of the piston, a larger flange portion 512 which is axially spaced apart from the smaller flange portion 510 and which is formed at or adjacent the other axial end of the piston, and a hollow cylindrical portion 514 which is closed at its end adjacent the smaller flange portion 510 and open at its end adjacent the larger flange portion 512 as shown. The piston 508 thus constructed is accommodated in the cavity 504 in such a manner that the smaller and larger flange portions 510 and 512 are axially slidably received on the respective internal peripheral surfaces defining the cavity portions having the smaller and larger cross sectional areas, respectively. Thus, a generally cylindrical portion 514 is closed in the cavity portion with the smaller cross sectional area and is open in the cavity portion with the larger cross sectional area. The slidable contact between the flange portion 510 and the internal peripheral surface defining the cavity portion with the smaller cross sectional area and the slidable contact between the larger flange portion 512 and the internal peripheral surface defining the cavity portion with the larger cross sectional area are hermetically sealed off by suitable sealing elements 516 and 518, respectively. The cylindrical portion 514 axially extending between the flange portion 510 and 512 has a cross sectional area which is smaller than the cross sectional area of the cavity portion having the smaller cross sectional area so that the piston 508 mounted in the cavity 504 forms within the cavity a first variable-volume fluid chamber 520 formed between the smaller flange portion 510 of the piston 508 and the closed, outer axial end of the cavity portion with the smaller cross sectional area, a second variable-volume fluid chamber 522 formed in part between the annular outer face of the larger flange portion 512 and the closed, outer axial end of the cavity portion with the larger cross sectional area and in part by the axial blind bore in the cylindrical portion 514 of the piston 508, and a third or intermediate variable-volume fluid chamber 524 axially extending between the smaller and larger flange portions 510 and 512 of the piston 508. Between the smaller and larger flange portions 510 and 512 of the piston 508 is provided a differential pressure acting area so that, when there is a fluid pressure in the third or intermediate variable-volume fluid chamber 524 formed between the flange portions 510 and 512 as above described, the piston 508 is urged to axially move in a direction to expand the first variable volume fluid chamber 520 and contract the second variable-volume fluid chamber 522. The piston 508 is urged to axially move in a direction to contract the first variable-volume chamber 520 and expand the second variable-volume fluid chamber 522 by suitable biasing means which is shown comprising a preloaded helical compression spring 526 which is seated at one end on a closed inner face of the smaller flange portion 510 and at the other end on the axial end of the cavity portion with the larger cross sectional area. The first variable-volume chamber 520 is in constant communication with the high-and-reverse clutch actuating fluid circuit 486 through a passageway 528. The second variable-volume fluid chamber 522 is communicable with the band actuating fluid circuit 330 through the pressure reducing valve 529. The third or intermediate variable-volume fluid chamber 524 is in constant communication with the forward drive clutch actuating fluid circuit 298 through a passageway 530.

On the other hand, the pressure reducing valve 529 of the shock control arrangement embodyung the present invention is adapted to drain the second variable-volume fluid chamber 522 of the above described pressure accumulator unit 500 during shifting from the second gear ratio ($D_2$) to the third gear ratio ($D_3$) in the automatic forward drive range condition of the transmission system and comprises a wall portion 532 forming part of the body structure of the transmission control valve body. The wall portion 532 is formed with an elongated valve chamber 534 closed at the opposite axial ends thereof and having a control port 536, a fluid inlet port 538, a fluid outlet part 540 and first and second drain ports 542 and 544. The control port 536 and the second drain port 544 are open adjacent the opposite closed axial ends, respectively, of the valve chamber 534 and the fluid inlet and outlet ports 538 and 540 and the first drain port 542 are located in this sequence away from the control port 536 toward the second drain port 544, as shown. The control port 536 is in constant communication through a passageway 546 with the passageway 528 providing communication between the high- and-reverse clutch actuating fluid circuit 486 and the first variable-volume fluid chamber 520 of the pressure accumulator unit 500. The fluid inlet port 538 of the pressure reducing valve 529 is in constant communication through a passageway 548 with the band actuating fluid fluid circuit 330, while the fluid outlet port 540 of the valve 529 is in constant communication through a passageway 550 with the second variable-volume fluid chamber 522 of the pressure accumulator unit 500.

Within the valve chamber 534 thus arranged is axially movable a valve spool 552 having first and second circumferential lands 554 and 556 which are axially spaced apart from each other so as to form a circumferential groove therebetween and which have substantially equal cross sectional areas. The groove between the lands 554 and 556 of the valve spool 552 is constantly open to the fluid outlet port 540 without respect to the axial position of the valve spool 552 within the valve chamber 534 and is open to the fluid inlet port 538 or the first drain port 542 depending upon the axial position of the valve spool 552 within the valve chamber 534. The valve spool 552 is thus axially movable between the valve chamber 534 between a first axial position closing the first drain port 542 by the second circumferential land 556 thereof and providing communication between the fluid inlet and outlet ports 538 and 540 through the groove between the circumferential lands 554 and 556 of the valve spool 552 as indicated by the upper half of the valve spool, and a second axial position closing the fluid inlet port 538 by the first circumferential land 554 of the valve spool 552 and providing communication between the fluid outlet port 540 and the first drain port 542 through the groove between the lands 554 and 556 of the valve spool 552 as indicated by the lower half of the spool 552. The valve spool 552 is urged to move toward the first axial position thereof by suitable biasing means such as a preloaded helical compression spring 558 which is shown seated at one end on the outer end face of the second circumferential land 556 of the valve spool 552 and at the other end on an internal wall surface at the axial end of the valve chamber 534 adjacent the second drain port 544. The first and second drain ports 542 and 544 are open to the transmission oil reservoir 90.

The hydraulic control system thus provided with the shock control arrangement further comprises a calibrated orifice 560 disposed in the forward drive clutch actuating circuit 298, and a calibrated orifice 562 disposed in the band actuating fluid circuit 330. The passageway 530 providing communication between the fluid circuit 298 and the third or intermediate variable-volume fluid chamber 524 of the pressure accumulator 500 is open to the fluid circuit 298 intermediate between the above mentioned orifice 560 and the fluid chamber of the forward drive clutch 42. Likewise, the passageway 548 providing communication between the band actuating fluid circuit 330 and the fluid inlet port 538 of the pressure reducing valve 529 is open to the fluid circuit 330 intermediate between the above mentioned orifice 562 and the brake-apply fluid chamber 76 of the band servo unit 74, as shown.

When, in operation, the transmission gear shift lever is moved by the vehicle driver from the neutral gear position "N" to the automatic forward drive range position "D", the line pressure developed in the third line pressure outlet port 426 of the manually operated gear position selector valve 414 in the hydraulic control system illustrated in FIG. 2B is directed by way of the passageway 462 and the forward drive clutch actuating fluid circuit 298 to the fluid chamber of the forward drive clutch 42. The fluid thus delivered to the fluid chamber of the forward drive clutch 42 is passed through the orifice 560 provided in the fluid circuit 298 so that the fluid pressure to be developed in the fluid chamber of the forward drive clutch 42 increases toward the level of the line pressure Pl at an initially limited, relatively low and thereafter steeply increasing rate which is dictated by the flow rate of fluid through the orifice 560. The fluid pressure to be directed to the fluid chamber of the forward drive clutch 42 through the orifice 560 is also directed past the orifice 560 to the third or intermediate variable-volume fluid chamber 524 of the pressure accumulator unit 500 and acts on the differential pressure acting area between the smaller and larger flange portions 510 and 512 of the piston 508, which is accordingly urged to axially move within the cavity 504 in the direction to expand the first variable-volume fluid chamber 520 and contract the second variable-volume fluid chamber 522 against the force of the spring 526. When, in the meantime, the fluid pressure developed in the fluid chamber of the forward drive clutch 42 and accordingly in the third or intermediate variable-volume fluid chamber 524 of the pressure accumulator unit 500 is increased to such a value that the force resulting from the fluid pressure acting on the differential pressure acting area between the flange portion 510 and 512 of the piston 508, the piston 508 of the pressure accumulator unit 500 is caused to axially move in the above mentioned direction against the force of the spring 526. While the piston 508 is being thus moved by the fluid pressure developed in the third or intermediate fluid chamber 524 of the pressure accumulator unit 500, the fluid pressure to act on the piston of the forward drive clutch 42 is partially taken up by the compression of the spring 526 of the pressure accumulator unit 500. For this reason, the forward drive clutch 42 is caused to couple at a certain restricted rate determined by the force of the spring 526 while the piston 508 is being moved within the cavity 504 of the pressure accumulator unit 500. The forward drive clutch 52 is in these manners brought into a fully coupled condition without creating shocks until the piston 508 is moved into a certain limit axial position within the cavity 504 of the pressure accumulator unit 500. The forward drive clutch 42 being thus coupled with the other frictional units 40, 68 and 72 remaining in their respective inoperative conditions, the first gear ratio ($D_1$) in the automatic forward drive range "D" is produced in the transmission mechanism shown in FIG. 1. The vehicle is now enabled to start from a halt.

As the vehicle speed thereafter increases with the accelerator pedal kept depressed, the governor pressure developed in the governor pressure port 280 of the first-second gear shift valve 276 causes the valve spool 302 of the shift valve 276 to move from the first axial position to the second axial position thereof against the force of the spring 314 and provides communication between the second line pressure inlet and outlet ports 286 and 288 of the shift valve 276. The line pressure which has been developed in the fluid circuit 298 leading to the pressure inlet port 286 of the valve 276 is permitted to pass through the ports 286 and 288 of the shift valve 276 and is directed through the passageway 328, the line pressure inlet and outlet ports 322 and 326 of the second-gear position lock valve 316 and the band actuating fluid circuit 330 to the brake-apply fluid chamber 76 of the band servo unit 74. The fluid thus delivered to the brake-apply fluid chamber 76 of the band servo unit 74 is passed through the orifice 562 provided in the band actuating fluid circuit 330 so that there is developed in the fluid chamber 76 of the band servo unit 74 a fluid pressure which increases toward the level of the line pressure Pl initially at an initially limited and relatively low and thereafter steeply increasing rate dictated by the flow rate of fluid through the orifice 562. During shifting between the first and second gear ratios ($D_1$) and ($D_2$) in the automatic forward drive range "D", there is no fluid pressure developed in the high-and-reverse clutch actuating fluid circuit 486 and accordingly in the control port 536 of the pressure reducing valve 529 having the control port 536 communicating with the fluid circuit 486 through the passageways 546 and 548 as previously described. The valve spool 552 of the pressure reducing valve 529 is therefore held in the first axial position thereof by the force of the spring 558 so that communication is maintained between the fluid inlet and outlet ports 538 and 540 of the pressure reducing valve 529 and accordingly between the passageway 548 leading to the fluid inlet port 538 from the band actuating fluid circuit 330 and the passageway 550 leading from the fluid outlet port 540 of the pressure reducing valve 529 to the second variable-volume fluid chamber 522 of the pressure accumulator unit 500. The fluid pressure to be directed to the brake-apply fluid chamber 76 of the band servo unit 74 through the orifice 562 is, therefore, also directed past the orifice 562 and by way of the passageway 548, the ports 538 and 540 of the pressure reducing valve 529 and the passageway 550 to the second variable-volume fluid chamber 522 of the pressure accumulator unit 500 and acts on the outer end face of the larger flange portion 512 of the piston 508, urging the piston 508 to axially move within the cavity 504 in the direction to contract the first variable-volume fluid chamber 520 and expand the second variable-volume fluid chamber 522 in cooperation of the spring 526 against the line pressure which has been established in the third or intermediate variable-volume fluid chamber 524 communicating with the fluid chamber of the forward drive clutch 42. When the fluid pressure thus developed in the brake-apply fluid chamber 76 of the band servo unit 74 and accordingly in the second variable-volume fluid chamber 522 of the pressure accumulator unit 500 is increased beyond such a value that the sum of the force of the spring 526 and the force resulting from the fluid pressure acting on the outer end face of the larger flange portion 512 of the piston 508 is larger than the force being exerted on the differential pressure acting area between the smaller and larger flange portions 510 and 512 of the piston by the line pressure in the third or intermediate variable-volume chamber 522 of the pressure accumulator unit 500, the piston 508 of the accumulator unit 500 is caused to axially move in the aforesaid direction to cause expansion of the second variable-volume fluid chamber 522. While the piston 508 of the pressure accumulator unit 500 is being thus moved by the fluid pressure developed in the second variable-volume chamber 522 of the unit 500, the fluid pressure to act on the piston 78 of the band servo unit 74 from the brake-apply fluid chamber 76 of the servo unit 74 is partially taken up by the axial movement of the piston 508 of the pressure accumulator unit 500 with the result that the piston 78 of the band servo unit 74 is moved and accordingly the brake band 72 is applied at certain restricted rates which are determined by the force of the spring 526 and the differential pressure acting area between the flange portions 510 and 512 of the piston 508 of the pressure accumulator unit 500 and which is variable with the line pressure Pl acting on the differential pressure acting area between the flange portions 510 and 512. Since, in this instance, the line pressure Pl developed by the pressure regulator valve 94 of the hydraulic control system shown in FIGS. 2A and 2B is continuously variable with the throttle pressure Pt as previously explained and accordingly with the opening degree of the carburetor throttle valve (not shown) as previously described, the fluid pressure which initiates the piston 508 of the pressure accumulator unit 500 into motion to move against the force resulting from the line pressure acting on the differential pressure acting area between the flange portions 510 and 512 of the piston 508 is also variable with the opening degree of the carburetor throttle valve. The brake band 72 is for this reason caused to apply at a rate which continuously varies with a fluid pressure lower than the line pressure Pl and continuously variable with the opening degree of the carburetor throttle valve and accordingly with the amount of load being exerted on the engine with the accelerator pedal kept depressed. With the brake band 72 now applied with the forward drive clutch 42 kept coupled, shift is made in the transmission mechanism from the first gear ratio ($D_1$) to the second gear ratio ($D_2$) in the automatic forward drive range "D". The shift is effected softly and smoothly without producing shocks and slides between the brake band 72 and the connecting shell 58 in the transmission mechanism shown in FIG. 1 under any operating load conditions of the engine.

As the vehicle speed is further increased thereafter, the governor pressure Pg developed in the governor pressure port 348 of the second-third gear shift valve 342 causes the valve spool 376 of the shift valve 342 to move from the first axial position to the second axial position thereof against the force of the spring 392 and the throttle pressure Pt developed in the throttle pressure port 360 of the pressure modulator valve 344 and initially further against the line pressure acting on the differential pressure acting area between the second and third circumferential lands 380 and 382 of the valve spool 376 of the second-third gear shift valve 342 as previously described in detail. Communication is thus provided between the second line pressure inlet port 352 and the line pressure outlet port 354 of the second-third gear shift valve 342 so that the line pressure which has been directed from the first line pressure outlet port 422 of the manually operated gear position selector valve 414 to the second line pressure inlet port 352 of the shift valve 342 through the fluid circuit 458 and the one-way orifice check valve 468 is permitted to pass through the line pressure outlet port 354 of the second-third gear shift valve 342 to the band releasing fluid circuit 370 at a rate which is dictated by the flow rate of fluid through the one-way orifice check valve 468. The fluid pressure thus appearing in the band releasing fluid circuit 370 is directed on the one hand to the brake-release fluid chamber 76' of the band servo unit 74 and on the other hand to the orifice 488 in the high-and-reverse clutch actuating fluid circuit 486 and the line pressure inlet port 480 of the second-third gearshift timing valve 472. If, in this instance, the vehicle speed being produced is low as compared with the opening degree of the carburetor throttle valve with respect to the previously described predetermined relationship between the vehicle speed and the opening degree of the carburetor throttle valve and accordingly between the governor and throttle pressure Pg and Pt appearing in the governor and throttle pressure ports 476 and 478, respectively, of the second-third gearshift timing valve 472, the force exerted on the valve spool 490 of the timing valve 472 by the governor pressure Pg in the port 476 is overcome by the sum of the force of the spring 498 and the force exerted on the valve spool 490 by the throttle pressure Pt in the port 478 and thus allows the valve spool 490 to stay in the first axial position thereof maintaining the communication between the line pressure inlet and outlet ports 480 and 482 of the timing valve 472. Under these conditions, the fluid pressure developed in the line pressure inlet port 480 of the second-third gearshift timing valve 472 is passed through the line pressure outlet port 482 of the valve 472 to the high-and-reverse clutch actuating circuit 486 by way of the high-and-reverse clutch actuating circuit 486. Under conditions in which the vehicle speed is low relative to the opening degree of the carburetor throttle valve, therefore, the flow of the fluid to be directed to the fluid chamber of the high-and-reverse clutch 40 is not subjected to the flow restriction by the orifice 488 provided in the high-and-reverse clutch actuating fluid circuit 486 and is restricted only by the flow restriction exercised by the one-way orifice check valve 468 provided upstream of the second-third gear shift valve 342 and as a consequence there is developed in the fluid chamber of the high-and-reverse clutch 40 a fluid pressure which increases toward the level of the line pressure Pl at a rate determined by the flow rate of fluid through the one-way orifice check valve 468. If, on the other hand, the vehicle speed is high relative to the opening degree of the carburetor throttle valve, the valve spool 490 of the second-third gearshift timing valve 472 is held in the second axial position thereof and closes the line pressure inlet port 480 by the second circumferential land 494 thereof. The bypass passageway between the line pressure inlet and outlet ports 480 and 482 of the second-third gearshift valve 472 being thus closed, the fluid to be fed from the band releasing fluid circuit 370 to the high-and-reverse clutch actuating circuit 486 and further through the passageway 486 to the fluid chamber of the high-and-reverse clutch 40 is compelled to pass through the orifice 488 in the fluid circuit 486 with the result that there is developed in the fluid chamber of the clutch 40 a fluid pressure which increases toward the level of the line pressure Pl at an initially limited, relatively low and thereafter steeply increasing rate dictated by the flow rate of fluid through the orifice 488 in the high-and-reverse clutch actuating fluid circuit 486. Thus, the high-and-reverse clutch 40 is caused to couple either at a relatively high rate if the vehicle speed is low as compared with the load on the engine or at a relatively low rate dictated primarily by the flow rate or fluid through the orifice 488 if the load on the engine is low as compared with the vehicle speed. On the other hand, the fluid pressure directed into the brake-release fluid chamber 76' of the band servo unit 74 causes the brake band 72 to release against the force resulting from the line pressure established in the brake-release fluid chamber 76' of the servo unit 74. The high-and-reverse clutch 40 as well as the forward drive clutch 42 being thus put into operation with the brake band 72 released, shift is made in the transmission mechanism from the second gear ratio ($D_2$) to the third gear ratio ($D_3$) in the automatic forward drive range "D" of the transmission system.

During shifting from the second gear ratio ($D_2$) to the third gear ratio ($D_3$) in the automatic forward drive range "D", the fluid pressure developed in the high-and-reverse clutch actuating fluid circuit 486 is passed through the orifice 488 or the second-third gearshift timing valve 472 not only to the fluid chamber of the high-and-reverse clutch 40 but through the passageway 528 to the first variable volume fluid chamber 520 of the pressure acculumator unit 500 and through the passageways 528 and 546 to the control port 536 of the pressure reducing valve 529. The fluid pressure introduced into the first variable-volume fluid chamber 520 of the pressure accumulator unit 500 acts on the outer end face of the smaller flange portion 510 of the piston 508 and urges the piston to move in the direction to expand the first variable-volume fluid chamber 520 and contract the second variable-volume fluid chamber 522 against the force of the spring 526 and the force which is produced by the line pressure developed by the line pressure obtaining in the second variable-volume fluid chamber 522 and thus acting on the larger flange portion 512 of the piston 508. On the other hand, the fluid pressure developed in the control port 536 of the pressure reducing valve 529 acts on the outer end face of the first circumferential land 554 of the valve spool 552 of the pressure reducing valve 529 and causes the valve spool 552 to move from the first axial position to the second axial position thereof against the force of the compression spring 558 as indicated by the lower half of the valve spool 552, thereby closing the fluid inlet port 538 by the first circumferential land 554 of the valve spool 552 and providing communication between the fluid outlet port 540 and the first drain port 542 through the groove between the lands 554 and 556 of the valve spool 552. The second variable-volume fluid chamber 522 of the pressure accumulator unit 500 is now isolated from the forward drive clutch actuating fluid circuit 298 and is permitted to be in communication with the first drain port 542 of the pressure reducing valve 529 through the passageway 550 and the fluid outlet port 540 of the valve 502. The line pressure which has been established in the second variable-volume fluid chamber 522 of the pressure accumulator unit 500 is therefore discharged therefrom through the passageway 550 and the ports 540 and 542 of the pressure reducing valve 529. The fluid pressure acting on the smaller flange portion 510 of the pressure accumulator unit 500 is, thus, opposed only by the force of the compression spring 526 and the force resulting from the line pressure developed in the third or intermediate variable-volume fluid chamber 524 and acting on the differential pressure acting area between the smaller and larger flange portions 510 and 512 of the piston 508. The piston 508 of the pressure accumulator unit 500 is in this fashion permitted to commence movement in the direction to expand the first variable-volume fluid chamber 520 at a point of time when the fluid pressure developed in the chamber 520 is increased to a value which is determined by the force of the spring 526 and the force resulting from the line pressure acting on the differential pressure acting area between the flange portions 510 and 512 of the piston 508. Upon movement of the piston 508 thus caused against the force of the spring 526 and the force resulting from the line pressure developed in the third or intermediate variable-volume fluid chamber 524, the fluid pressure actuating the high-and-reverse clutch 40 is partially taken up by the movement of the piston 508 and enables the clutch 40 to establish the third gear ratio (D₃) in the automatic forward drive range "D" in cooperation with the forward drive clutch 42 smoothly without producing shocks in the transmission mechanism in which the clutches 40 and 42 are incorporated.

When, on the other hand, the transmission gear shift lever is moved by the vehicle driver from the neutral gear position "N" to the reverse drive gear position "R", the line pressure developed in the sixth line pressure outlet port 432 of the manually operated gear position selector valve 414 is directed through the passageway 368 and the first line pressure inlet port 350 and the line pressure outlet port 354 of the second-third gear shift valve 342 to the band releasing fluid circuit 370. There being no fluid pressure developed in the governor pressure port 476 of the second-third gearshift timing valve 472 during shifting to the reverse drive gear position "R", the valve spool 490 of the timing valve 472 is held in the first axial position thereof providing communication between the line pressure inlet and outlet ports 480 and 482 of the valve 472. The line pressure which has been directed to the band actuating fluid circuit 370 is therefore passed through the ports 480 of the second-third gearshift timing valve 472 and is directed by way of the high-and-reverse clutch actuating fluid circuit 486 to the fluid chamber of the high-and-reverse clutch 40 and further by way of the passageway 528 to the first variable-volume fluid chamber 520 of the pressure accumulator unit 500 and the control port 536 of the pressure reducing valve 529. During an incipient stage after the reverse drive gear position "R" is selected, therefore, the high-and-reverse clutch 40 is actuated to couple by a fluid pressure which is partially taken up by the forced movement of the piston 508 of the pressure accumulator unit 500 and is therefore allowed to couple without producing shocks in the transmission mechanism as under conditions in which a shift is to be made from the second gear ratio to the third gear ratio in the automatic forward drive range.

Figure 3:
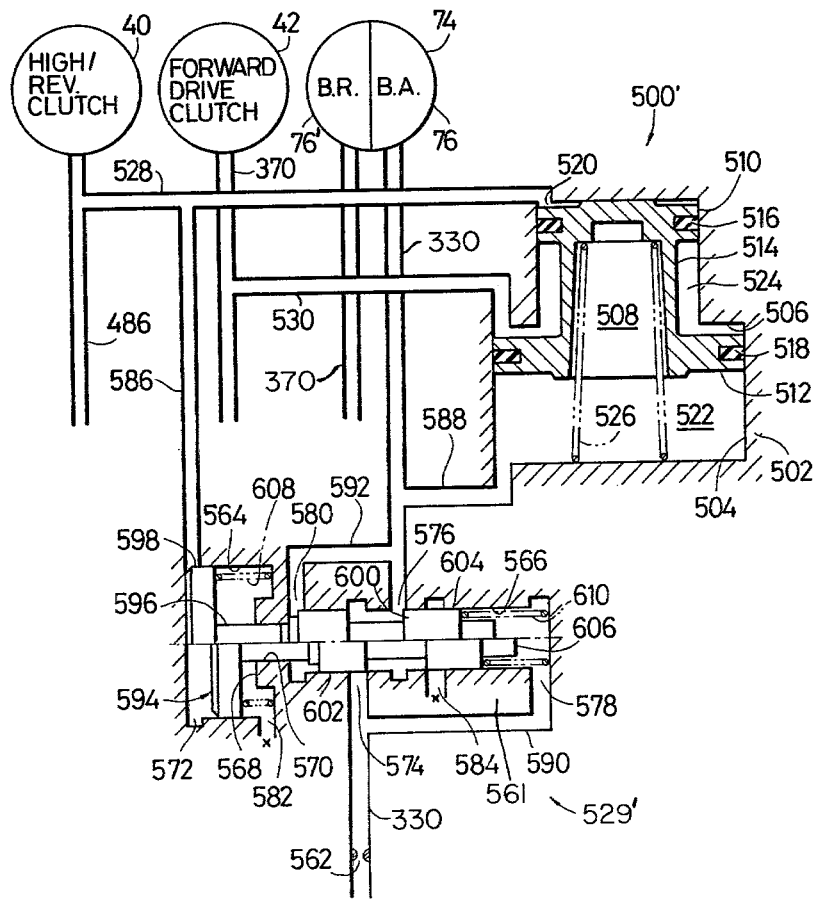
FIG. 3 is a schematic view showing, partly in section, another preferred embodiment of a shock control arrangement according to the present invention.

FIG. 3 illustrates a modification of the shock control arrangement hereinbefore described with reference to FIGS. 2A and 2B. The shock control arrangement illustrated in FIG. 3 comprises a pressure accumulator unit 500' which per se is similarly to the pressure accumulator unit 500 included in the shock control arrangement in the hydraulic control system shown in FIGS. 2A and 2B. In FIG. 3, those elements, members and portions of the pressure accumulator unit 500' which are respectively similar to those of the pressure accumulator unit 500 shown in FIGS. 2A and 2B are designated by like reference numerals.

In the shock control arrangement illustrated in FIG. 3, the pressure accumulator unit 500' is arranged in combination with a pressure reducing valve 529' which comprises a wall portion 561 formed with a first valve chamber 564 and a second valve chamber 566. The wall portion 561 forms part of the body structure of the transmission control valve assembly which is assumed to include a hydraulic control system arranged similarly to the system illustrated in FIGS. 2A and 2B except for the pressure reducing valve 529' provided therein. The first and second valve chambers 564 and 566 are arranged in series with each other across an intermediate wall 568 formed with an axial bore 570 which is open at one end to the first valve chamber 564 and at the other end to the second valve chamber 566. The first valve chamber 564 is larger in cross sectional area than the second valve chamber 566, which is axially elongated as compared with the first valve chamber 564. The wall portion 561 is further formed with a control port 572, a fluid inlet port 574, a fluid outlet port 576, an incoming fluid feedback port 578, an outgoing fluid feedback port 580, and first and second drain ports 582 and 584. The control port 572 is open to the first valve chamber 564 and is located adjacent to the outer axial end of the first valve chamber 564. The fluid inlet and outlet ports 574 and 576 are open to the second valve chamber 566 and are located intermediate between and respectively closer than each other to the inner and outer axial ends of the second valve chamber 566. The incoming and outgoing fluid feedback ports 578 and 580 are open to the second valve chamber 566 and are located adjacent the inner and outer axial ends, respectively, of the second valve chamber 566. The first drain port 582 is open to the first valve chamber 564 and is located adjacent the inner axial end of the first valve chamber 564, while the second drain port 584 is open to the second valve chamber 566 and is located intermediate between the fluid outlet port 576 and the incoming fluid feedback port 578, as shown. The control port 572 is in constant communication with the high-and-reverse clutch actuating fluid circuit 486 through a passageway 586 which is open to the fluid circuit 486 intermediate between the fluid chamber of the high-and-reverse clutch 40 and the orifice 488 provided in the fluid circuit 486, the passageway 586 being shown as leading from the passageway 528 providing communication between the high-and-reverse clutch actuating circuit 486 and the first variable-volume fluid chamber 520 of the pressure accumulator unit 500'. The fluid inlet and outlet ports 574 and 576 of the pressure reducing valve 529' are open to the band actuating fluid circuit 330 and are in constant communication respectively with the orifice 562 provided in the fluid circuit 330 and with the brake-apply fluid chamber 76 of the band servo unit 74. The fluid outlet port 576 is further in constant communication through a passageway 588 with the second variable-volume fluid chamber 522 of the pressure accumulator unit 500'. The incoming fluid feedback port 578 is in constant communication with the fluid inlet port 574 through a feedback passageway 590 and, likewise, the outgoing fluid feedback port 580 is in constant communication with the fluid outlet port 576 through a feedback passageway 592. The drain ports 582 and 584 are constantly open to the transmission oil reservoir 90 (FIG. 2A).

Within the first valve chamber 564 is axially movable a valve piston 594 consisting of a stem portion 596 axially slidable through the axial bore 570 in the intermediate wall 568 between the first and second valve chambers 564 and 566 as previously described and a circumferential land 598 formed adjacent the outer axial end of the stem portion 596. Within the second valve chamber 566 is likewise axially movable a valve spool 600 having first and second circumferential lands 602 and 604 which have substantially equal cross sectional areas and which are arranged in this sequence away from the intermediate wall 568 between the valve chambers 564 and 566. The lands 602 and 604 of the valve spool 600 are axially spaced apart from each other so as to form a circumferential groove therebetween. The valve spool 600 further has an axial extension 606 projecting from the second circumferential land 604 toward the internal wall surface at the outer axial end of the second valve chamber 566 so that the groove between the lands 602 and 604 is constantly open to the fluid outlet port 576 without respect to the axial position of the valve spool 600 within the second valve chamber 566 and open selectively to the fluid inlet port 574 or the second drain port 584 depending upon the axial position of the valve spool 600 within the valve chamber 566. The valve spool 600 of the pressure reducing valve 529' is axially movable within the second valve chamber 566 into and out of a limit axial position closing the second drain port 584 by the second circumferential land 604 thereof and providing communication between the fluid inlet and outlet port 574 and 576 through the groove between the lands 602 and 604 of the valve spool 600 as indicated by the upper half of the valve spool 600. When the valve spool 600 is in this limit axial position thereof, the valve spool 600 bears at the outer axial end of the first circumferential land 602 against one end face of the intermediate wall 568 between the valve chambers 564 and 566. Similarly, the valve piston 594 has a limit axial position bearing at the outer axial end of the circumferential land 598 thereof against the internal wall surface at the outer axial end of the first valve chamber 564 as indicated by the upper half of the valve piston 594. When the valve piston 594 and the valve spool 600 are in their respective limit axial positions concurrently, the stem portion 596 of the former is slightly spaced apart from the outer axial end of the first circumferential land 602 of the latter through the bore 570. The valve piston 594 is urged to stay in or move toward the limit axial position thereof by biasing means such as a preloaded helical compression spring 608 which is shown seated at one end on the inner end face of the circumferential land 598 of the valve piston 594 and at the other end on the intermediate wall 568 between the valve chambers 564 and 566. Likewise, the valve spool 600 within the second valve chamber 566 is urged to stay in or move toward the limit axial position thereof by suitable biasing means such as a preloaded helical compression spring 610 which is shown seated at one end on the outer end face of the second circumferential land 604 of the valve spool 600 and at the other end on the internal end surface which the wall portion has formed at the outer axial end of the second valve chamber 566.

When, in operation, there is no fluid pressure developed in the high-and-reverse clutch actuating fluid circuit 486, the valve piston 594 of the pressure reducing valve 529' thus constructed and arranged is held in the above mentioned limit axial position thereof within the first valve chamber 564 by the force of the compression spring 608 in the absence of a fluid pressure in the control port 572. If, in this instance, there is no fluid pressure developed in the fluid inlet port 574 and accordingly in any of the ports 576, 578 and 580 of the pressure reducing valve 529', the valve spool 600 is also held in the limit axial position thereof by the force of the compression spring 610, providing communication between the fluid inlet and outlet ports 574 and 576 and closing the second drain port 584 by the second circumferential land 604 of the valve spool 600. When a fluid pressure is developed in the fluid inlet port 574, the fluid pressure is passed through the feedback passageway 590 to the incoming fluid feedback port 578 and acts on the end face of the axial extension 606 and the outer end face of the second circumferential land 604 of the valve spool 600, urging the valve spool 600 to stay in the limit axial position thereof. The valve spool 600 being held in the limit axial position thereof, the communication between the fluid inlet and outlet ports 574 and 576 is maintained so that the fluid pressure developed in the fluid inlet port 574 is further passed to the fluid outlet port 576 and through the feedback passageway 592 to the outgoing fluid feedback port 580 and acts on the outer end face of the first circumferential land 602 of the valve spool 600, thereby urging the valve spool 600 to move away from the limit axial position thereof. Since, however, the first and second circumferential lands 602 and 604 are substantially equal in cross sectional area as previously described, the forces thus produced by the fluid pressure developed in the incoming and outgoing fluid feedback ports 578 and 580 and urging the valve spool 600 to move in the opposite axial directions are cancelled by each other so that the valve spool 600 is maintained in situ by the force of the compression spring 610. During shifting from the first gear ratio ($D_1$) to the second gear ratio ($D_2$) in the automatic forward drive range "D", the fluid pressure developed in the band actuating fluid circuit 330 is directed past the orifice 562 and thereafter past the fluid inlet and outlet ports 574 and 576 of the pressure reducing valve 529' to the brake-apply fluid chamber 76 of the band servo unit 74 and actuates the brake band 72 to apply by a fluid pressure which increases toward the level of the line pressure Pl at an initially limited, relatively low and thereafter steeply increasing rate dictated by the flow rate of fluid through the orifice 562 provided in the band actuating fluid circuit 370. The fluid pressure to be directed through the orifice 562 and the pressure reducing valve 529' to the brake-apply fluid chamber 76 of the band servo unit 74 is also fed through the passageway 588 into the second variable-volume fluid chamber 566 of the pressure accumulator unit 500' with the result that the fluid pressure to actuate the brake band 72 is partially taken up by the movement of the piston 508 of the pressure accumulator unit 500 during an incipient stage of the gear shifting, as in the case of the shock control arrangement previously described with reference to FIGS. 2A and 2B.

During shifting from the second gear ratio ($D_2$) to the third gear ratio ($D_3$) in the automatic forward drive range "D", a fluid pressure is developed in the high-and-reverse clutch actuating fluid circuit 370 and is directed past or across the orifice 488 to the fluid chamber of the high-and-reverse clutch 40 through the passageway 486 and further through the passageway 528 to the first variable-volume fluid chamber 520 of the pressure accumulator unit 500'. The fluid pressure thus developed in the first variable-volume fluid chamber 520 of the pressure accumulator unit 500' acts on the smaller flange portion 510 of the piston 508, which is accordingly urged to axially move in a direction to expand the variable-volume fluid chamber 520. The fluid pressure directed to the passageway 528 leading to the first variable-volume fluid chamber 520 of the pressure accumulator unit 500' is also distributed to the control port 572 of the pressure reducing valve 529' and acts on the outer end face of the circumferential land 598 of the valve piston 594 and urges the valve piston 594 to move away from the limit axial position thereof with a force which varies with the rate at which the high-and-reverse clutch 40 is to be actuated to couple by the fluid pressure being fed to the fluid chamber thereof. After the fluid pressure thus developed in the control port 572 of the pressure reducing valve 529' is beyond a value determined by the force of the compression spring 608, the valve piston 594 is caused to move away from the limit axial position thereof toward the intermediate wall 568 between the valve chambers 564 and 566 and is brought into pressing contact at the leading end of the stem portion 596 thereof with the outer end face of the first circumferential land 602 of the valve spool 600 in the second valve chamber 566. The valve piston 594 and the valve spool 600 are thereafter moved as a single unit away from their respective limit axial positions against the forces of the compression springs 608 and 610. During upshifting between the second and third gear ratios ($D_2$) and ($D_3$) in the automatic forward drive range "D", there is a line pressure developed in the band releasing fluid circuit 330 leading to the brake-release fluid chamber 76' of the band servo unit 74. The line pressure thus introduced into the brake-release fluid chamber 76' of the band servo unit 74 forces the piston 78 (FIG. 2A) of the band servo unit 74 against the force exerted on the piston by the line pressure established in the brake-apply fluid chamber 76 of the band servo unit 74 as previously described. This causes the fluid which has been introduced into the brake-apply fluid chamber 76 of the band servo unit 74 to be partially displaced or withdrawn from the fluid chamber 76 backwardly into the band actuating fluid circuit 330 communicating with the second variable-volume fluid chamber 522 of the pressure accumulator unit 500' and the outgoing fluid feedback port 580 of the pressure reducing valve 529'.

Upon movement of the valve spool 600 of the pressure reducing valve 529' to an axial position closing the fluid inlet port 574 by the first circumferential land 602, the fluid outlet port 576 and accordingly the outgoing fluid feedback port 580 of the pressure reducing valve 529' are isolated from the fluid inlet port 574 of the valve 529' so that the fluid pressure confined between the brake-apply fluid chamber 76 of the band servo unit 74 and the fluid outlet port 576 of the pressure reducing valve 529' is caused to rise as the brake-apply fluid chamber 76 of the band servo unit 74 is forced to contract by the line pressure developed in the brake-release fluid chamber 76' of the servo unit 74. Such an increased fluid pressure through the outgoing fluid feedback port 580 of the pressure reducing valve 529' on the outer end face of the first circumferential land 602 of the reducing valve spool 600 forces the valve spool 600 to further move away from the limit axial position thereof. The first and second circumferential lands 602 and 604 of the valve spool 600 are axially spaced apart a distance such that, when the first circumferential land 602 is on the point of fully closing the fluid inlet port 574, the second circumferential land 604 is on the point of opening up the second drain port 584. At an instant the valve spool 600 reaches an axial position fully closing the fluid inlet port 574 by the first circumferential land 602 thereof, therefore, there is a slight clearance between the fluid outlet port 576 and the second drain port 584 past the circumferential edge on the trailing side of the second circumferential land 604. When this occurs, the fluid in the fluid outlet port 576 and accordingly the outgoing fluid feedback port 580 is partially discharged through the second drain port 584 and gives rise to a decrease in the fluid pressure acting on the outer end face of the first circumferential land 602 of the valve spool 600 through the outgoing fluid feedback port 580 and accordingly a decrease in the force urging the valve spool 600 to advance away from the limit axial position thereof. In these manners, the valve spool 600 of the pressure reducing valve 600 attains a certain equilibrium axial position permitting the second drain port 584 to slightly open so that the forces urging the valve spool 600 to move in the opposite axial directions are equally balanced, such an equilibrium axial position being indicated by the lower half of the valve spool 600 in FIG. 3.

In the meantime, the fluid pressure in the high-and-reverse clutch actuating circuit 486 continues to rise toward the level of the line pressure urges the valve spool 600 to move away from the limit position thereof with an increasing force. Since the fluid pressure developed in the outgoing fluid feedback port 580 urges the valve spool 600 to move in the same direction as the direction in which the fluid pressure developed in the control port 572 urges the valve piston 594 and valve spool 600 to move and since, furthermore, the forces of the springs 608 and 610 and the force resulting from the line pressure developed in the incoming fluid feedback port 578 and acting on the outer end face of the second circumferential land 604 of the valve spool 600 are substantially constant, the fluid pressure developed in the outgoing fluid feedback port 580 by the valve spool 600 attempting to stay in the equilibrium axial position decreases as the fluid pressure in the control port 572 rises toward the level of the line pressure Pl. The fluid pressure in the second variable-volume fluid chamber 522 of the pressure accumulator unit 500' is thus reduced as the fluid pressure in the fluid chamber of the high-and-reverse clutch 40 and accordingly the fluid pressure in the first variable-volume fluid chamber 520 of the pressure accumulator unit 500' rises toward the level of the line pressure. The piston 508 of the pressure accumulator unit 500' is therefore moves in the direction to cause expansion of the first variable-volume fluid chamber 520 and contraction of the second variable-volume fluid chamber 522 at a rate which varies continuously with the rate of decrease in the fluid pressure in the brake-apply fluid chamber 76 of the band servo unit 74 or, in other words, at the rate at which the brake band 72 is caused to release by the fluid pressure developed in the brake-release fluid chamber 76' of the servo unit 74. It follows that the high-and-reverse clutch 40 is actuated to couple initially at a rate determined by the flow rate of fluid through the one-way orifice check valve 468 (FIG. 2) or the flow rates of fluid through the one-way orifice check valve 468 and the orifice 488 in the high-and-reverse clutch actuating fluid circuit 486 and thereafter at a rate which is not only determined by the flow rate or rates of fluid through the orifice check valve 468 or both of the orifice check valve 468 and the orifice 488 but retarded by the expansion of the first variable-volume fluid chamber 520 of the pressure accumulator 500' until the brake band 72 is caused to release and the high-and-reverse clutch 40 is caused to fully couple. An upshift is in this fashion made from the second gear ratio ($D_2$) to the third gear ratio ($D_3$) in the automatic forward drive range "D" smoothly and without producing shocks in the transmission mechanism.

From the foregoing description it will have been understood that, since the shock control arrangement according to the present invention uses only one pressure accumulator unit for reducing the shocks to be produced during selection of the automatic forward drive range "D" or the reverse drive gear position "R" or upshifting between the gear ratios in the automatic forward drive range "D", the transmission control valve assembly including such a shock control arrangement can be constructed with sufficient compactness as compared with a conventional hydraulic transmission control valve assembly using a plurality of accumulator units each allocated to each of the shifts from the neutral gear position "N" to the automatic forward drive range and the reverse drive gear position and the upshifts between the gear ratios in the automatic forward drive range.

What is claimed is:

1. In an automatic power transmission having an automatic forward drive range condition, a reverse drive gear condition and first, second and third gear ratios in the automatic forward drive range condition and including a transmission mechanism having incorporated therein a fluid operated first frictional unit contributive to the selection of the reverse drive gear condition and the shifting from the second gear ratio to the third gear ratio in the automatic forward drive range, a fluid operated second frictional unit contributive to the shifting from the first gear ratio to the second gear ratio in the automatic forward drive range condition and a fluid operated third frictional unit contributive to the selection of the automatic forward drive range condition, and a hydraulic control system including control fluid pressure generating means for producing a control fluid pressure throughout the automatic forward drive range and reverse drive range conditions, a shock control arrangement for reducing shocks to be produced during selection of any of the automatic forward drive range and reverse drive gear conditions or upshifting between any two of the first, second and third gear ratios in the automatic forward drive range condition, comprising a pressure accumulator unit operatively intervening between the control fluid generating means and each of the first, second and third frictional units and including a fluid operated piston having a first pressure acting area to be acted upon by a fluid pressure and urge the piston to move in a first direction when the first frictional unit is to be actuated, a second pressure acting area to be acted upon by a fluid pressure and urge the piston to move in a second direction opposite to the first direction when the second frictional unit is to be actuated and a third pressure acting area to be acted upon by a fluid pressure and urge the piston to move in the first direction when the third frictional unit is to be actuated, and biasing means for constantly urging the piston to move in the second direction;

passageway means for discharging the fluid pressure to act on the second pressure acting area;

valve means operatively intervening between the second frictional unit and the control pressure generating means and responsive to the fluid pressure to actuate the first frictional unit and act on the first pressure acting area, said valve means including a valve element which is movable into and out of a limit position providing communication between the second frictional unit and the control pressure generating means and closing said passageway means and which is responsive to the fluid pressure to actuate the first frictional unit for being urged to move away from said limit position thereof, and biasing means for constantly urging the valve element toward the limit position thereof.

2. A shock control arrangement as set forth in claim 1, in which said hydraulic control system further includes first circuit means for providing communication between said control pressure generating means and said first frictional unit, second circuit means for providing communication between said control pressure generating means and said second frictional unit and third circuit means for providing communication between said control pressure generating means and said third frictional unit, said shock control arrangement further comprising a first fluid passageway constantly communicating with said first circuit means and open to said first pressure acting area, a second fluid passageway constantly communicating with said second frictional unit and open to said second pressure acting area, the second fluid passageway forming part of said passageway means communicable with said control pressure generating means across said valve means and through said second circuit means, a third fluid passageway constantly communicating with said third circuit means and open to said third pressure acting area, and a fourth passageway providing constant communication between said first conduit means and said valve means.

3. A shock control arrangement as set forth in claim 2, in which said valve element has a pressure acting area and in which said fourth passageway is constantly open to said pressure acting area of the valve element for urging the valve element away from said limit position thereof when a fluid pressure is developed in the fourth passageway.

4. A shock control arrangement as set forth in claim 2, in which said valve means comprises, in addition to said valve element as a first valve element, a second valve element arranged in series with said first valve element and having a pressure acting area, the second valve element being movable into and out of a limit position and engageable at one end with said first valve element when moved out of the limit position thereof, the biasing means of said valve means being operative to urge both of the first and second valve elements toward the respective limit positions thereof.

5. A shock control arrangement as set forth in claim 4, in which said first valve element has a first pressure acting area to be acted upon by fluid pressure in said second fluid passageway and urge the first valve element to move away from the limit position thereof when a fluid pressure is developed in the second fluid passageway, and a second pressure acting area to be acted upon by fluid pressure in said second circuit means and urge the first valve element to move toward the limit position thereof when a fluid pressure is developed in the second circuit means.

6. A shock control arrangement as set forth in claim 5, in which said valve means comprises a fluid inlet port constantly communicating with said second circuit means, a fluid outlet port constantly communicating with said second passageway and said second frictional unit and a drain port and in which said first valve element comprises first and second lands forming said first and second pressure actings areas, respectively, of the first valve element and arranged to allow said fluid outlet port selectively to the fluid inlet port or said drain port depending upon the position of said first valve element and to provide communication between the fluid inlet and outlet ports when the first valve element is in said limit position thereof, said first and second lands being further arranged so that one of the lands is on the point of one of the fluid inlet and drain ports when the other of the lands is on the point of opening up the other of the ports.

7. A hydraulic control system for an automatic power transmission having a first frictional unit and a second frictional unit, the control system comprising:
- a servo motor for the first frictional unit;
- a servo motor for the second frictional unit including an apply-side chamber, a release-side chamber and a pressure responsive piston which takes a brake apply position when said apply-side chamber is pressurized with said release-side chamber being drained and takes a brake release position when said release-side chamber is pressurized;
- a source of fluid pressure adapted to be used for operating the first and second frictional units;
- a single pressure accumulator unit including a bore, a fluid operated piston movably disposed in said bore to form within said bore a first chamber and a second chamber, said fluid operated piston having a small surface area exposed to said first chamber and a large surface area exposed to said second chamber and movable in one direction to increase the volume of said first chamber and to contract the volume of said second chamber and movable in the opposite direction to increase the volume of said second chamber and to contract the volume of said first chamber, said pressure accumulator unit including biasing means disposed in said second chamber for biasing said piston in a direction to maximize the volume of said second chamber;
- a first passageway communicating with said servo motor for the first frictional unit, said release-side chamber of said servo motor for the second frictional unit and said first chamber of said pressure accumulator unit;
- a second passageway communicating with said apply-side chamber of said servo motor for the second frictional unit;
- a valve including a pressure control chamber communicating with said second chamber of said pressure accumulator unit, an inlet port communicating with said second passageway and a drain port;
- said valve including a valve element movable to a predetermined position wherein said inlet port is uncovered to open into said pressure control chamber and said drain port is covered so that the pressure in said second passageway is modulated to a level lower than the maximum pressure which prevails therein;
- said valve including first means for urging said valve element, in one direction, toward said predetermined position, and second means for urging said valve element, in an opposite direction to said one direction, in response to pressure within said first passageway.

8. A hydraulic control system as claimed in claim 7, in which said valve includes third means for urging said valve element in said opposite direction in response to pressure within said control chamber.

9. A hydraulic control system as claimed in claim 8, in which said second urging means of said valve includes a differential area piston having a large surface area exposed to the pressure within said first passageway and a small surface area exposed to the pressure within said pressure control chamber of said valve.

10. A hydraulic control system as claimed in claim 9, in which said first urging means of said valve includes a chamber, other than said control chamber, communicating with said inlet port and a spring disposed therein.

11. A hydraulic control system as claimed in claim 7, further comprising:
- a third frictional unit having a servo-motor;
- means defining a third chamber in said pressure accumulator intermediate of said first and second chamber;
- a third passageway providing fluid communication between said servo-motor of said third frictional unit and said third chamber;
- the arrangement of the foregoing being such that upon introduction of pressurized hydraulic fluid into said third passageway, said piston of said accumulator unit is moved against the bias of said biasing means in said second chamber.

* * * * *